(12) United States Patent
Hoevenaar et al.

(10) Patent No.: US 11,070,763 B2
(45) Date of Patent: Jul. 20, 2021

(54) METHOD AND SYSTEM FOR DISPLAYING IMAGES CAPTURED BY A COMPUTING DEVICE INCLUDING A VISIBLE LIGHT CAMERA AND A THERMAL CAMERA

(71) Applicant: Snap-on Incorporated, Kenosha, WI (US)

(72) Inventors: Robert Hoevenaar, De Weere (NL); Joshua C. Covington, San Juan Bautista, CA (US); Oswaldo Neri, Los Banos, CA (US); Roy S. Brozovich, Campbell, CA (US); Timothy G. Ruther, Carpentersville, IL (US); Michael D. LaFerle, Shelvy Township, MI (US)

(73) Assignee: Snap-on Incorporated, Kenosha, WI (US)

( * ) Notice: Subject to any disclaimer, the term of this patent is extended or adjusted under 35 U.S.C. 154(b) by 244 days.

(21) Appl. No.: 16/020,970

(22) Filed: Jun. 27, 2018

(65) Prior Publication Data
US 2020/0007810 A1    Jan. 2, 2020

(51) Int. Cl.
*H04N 5/33*     (2006.01)
*H04N 5/445*    (2011.01)
(Continued)

(52) U.S. Cl.
CPC ......... *H04N 5/44504* (2013.01); *H04N 5/247* (2013.01); *H04N 5/265* (2013.01);
(Continued)

(58) Field of Classification Search
CPC . G06T 2207/10048; G06T 2207/10024; G06T 2207/20221; G06T 7/0002; H04N 5/33; H04N 5/332; H04N 5/2258
See application file for complete search history.

(56) References Cited

U.S. PATENT DOCUMENTS

| 4,942,103 A * | 7/1990 | Reithel | ................. G03F 7/0007 257/E31.121 |
| 6,232,602 B1 * | 5/2001 | Kerr | ...................... B64D 43/00 250/330 |

(Continued)

FOREIGN PATENT DOCUMENTS

WO    2014/100787 A1    6/2014

OTHER PUBLICATIONS

FLIR Systems AB; GenICam ICD FLIR AX5 Camera—PC; Jul. 3, 2014.

(Continued)

*Primary Examiner* — Daniel Chang
(74) *Attorney, Agent, or Firm* — McDonnell Boehnen Hulbert & Berghoff LLP

(57) ABSTRACT

A system includes a processor and a memory storing program instructions. The instructions are executable by the processor to generate a first image file representing a thermal image and a second image file representing a visible light image. The instructions are executable to generate a first blended image based on the thermal image, the visible light image, and a display setting. Furthermore, the instructions are executable to display the first blended image on a display and to transmit, via a network interface to a server having an application for serving an image file generated by the processor, an image file upload. The image file upload includes: the first and second image files and a third image file representing the first blended image or the display setting for generating a second blended image based on the thermal and visible light images and the display setting.

30 Claims, 26 Drawing Sheets

(51) Int. Cl.
*H04N 5/247* (2006.01)
*H04N 5/262* (2006.01)
*H04N 5/265* (2006.01)
*H04N 21/47* (2011.01)
*H04N 21/431* (2011.01)
*H04L 29/08* (2006.01)
*H04N 5/45* (2011.01)
*G06F 3/0481* (2013.01)
*H04N 21/422* (2011.01)

(52) U.S. Cl.
CPC ....... *H04N 5/2628* (2013.01); *H04N 21/4316* (2013.01); *H04N 21/47* (2013.01); *G06F 3/04817* (2013.01); *H04L 67/10* (2013.01); *H04N 5/45* (2013.01); *H04N 21/42204* (2013.01)

(56) References Cited

U.S. PATENT DOCUMENTS

| | | | |
|---|---|---|---|
| 6,246,321 B1* | 6/2001 | Rechsteiner | G08B 13/19602 250/338.1 |
| 6,484,101 B1* | 11/2002 | Lucas | G06T 17/05 702/5 |
| 6,876,767 B1* | 4/2005 | Crossling | A61B 5/1174 382/190 |
| 7,096,038 B1* | 8/2006 | Perrella | H04N 1/2179 348/207.1 |
| 7,196,805 B1* | 3/2007 | Toebes | G06Q 50/10 348/211.1 |
| 8,374,438 B1* | 2/2013 | Wagner | G06T 7/001 382/209 |
| 9,616,568 B1 | 4/2017 | Russell | |
| 9,773,413 B1* | 9/2017 | Li | G08G 1/144 |
| 9,971,792 B2 | 5/2018 | Solli | |
| 10,375,325 B2* | 8/2019 | Schmidt | G01J 5/10 |
| 10,380,694 B1* | 8/2019 | Grant | G08G 1/205 |
| 10,691,943 B1* | 6/2020 | Ferstl | G06N 3/0445 |
| 10,832,330 B1* | 11/2020 | Grant | G05D 1/0094 |
| 2002/0065844 A1* | 5/2002 | Robinson | H04N 1/00132 715/201 |
| 2002/0140822 A1* | 10/2002 | Kahn | H04N 9/045 348/207.99 |
| 2004/0022444 A1* | 2/2004 | Rhoads | G06K 9/222 382/232 |
| 2004/0039848 A1* | 2/2004 | Estrada | G06F 8/71 719/315 |
| 2004/0230550 A1* | 11/2004 | Simpson | G06F 40/143 |
| 2006/0114531 A1* | 6/2006 | Webb | G01N 21/8851 359/15 |
| 2006/0249679 A1* | 11/2006 | Johnson | G01C 3/08 250/332 |
| 2008/0099678 A1* | 5/2008 | Johnson | G01J 5/025 250/332 |
| 2008/0143338 A1* | 6/2008 | Sekine | H05B 3/84 324/503 |
| 2008/0144905 A1* | 6/2008 | Tallman | G06F 3/04847 382/131 |
| 2009/0002475 A1* | 1/2009 | Jelley | H04N 7/142 348/14.01 |
| 2009/0172129 A1 | 7/2009 | Singh et al. | |
| 2009/0324015 A1* | 12/2009 | Way | G06K 9/4661 382/103 |
| 2010/0281475 A1* | 11/2010 | Jain | G06F 8/658 717/172 |
| 2010/0309315 A1* | 12/2010 | Hogasten | H04N 5/332 348/164 |
| 2011/0040191 A1* | 2/2011 | Kyle | A61B 5/015 600/473 |
| 2011/0196916 A1* | 8/2011 | Seong | H04N 21/8583 709/203 |
| 2011/0228096 A1* | 9/2011 | Friel | H04N 5/33 348/164 |
| 2012/0062766 A1* | 3/2012 | Park | H04N 1/00464 348/231.5 |
| 2012/0224067 A1* | 9/2012 | Stuart | G06F 16/58 348/164 |
| 2013/0050453 A1* | 2/2013 | Bergstrom | G01J 5/0275 348/61 |
| 2013/0107072 A1* | 5/2013 | Kumar | H04N 5/2258 348/222.1 |
| 2013/0110344 A1 | 5/2013 | Merg et al. | |
| 2013/0155248 A1* | 6/2013 | Neeley | H04N 5/332 348/159 |
| 2013/0155249 A1* | 6/2013 | Neeley | H04N 5/33 348/159 |
| 2013/0307992 A1* | 11/2013 | Erlandsson | H04N 5/332 348/164 |
| 2014/0042319 A1* | 2/2014 | Pickett | H04N 5/33 250/330 |
| 2014/0071294 A1* | 3/2014 | Lavoie | G02B 23/125 348/164 |
| 2014/0164349 A1* | 6/2014 | Cudak | G06F 16/00 707/709 |
| 2014/0218520 A1* | 8/2014 | Teich | H04N 5/2354 348/143 |
| 2014/0240512 A1* | 8/2014 | Hogasten | G06K 9/40 348/164 |
| 2014/0247365 A1 | 9/2014 | Gardner et al. | |
| 2014/0253735 A1* | 9/2014 | Fox | H04M 1/0264 348/164 |
| 2014/0267353 A1* | 9/2014 | Schmidt | G06T 11/001 345/589 |
| 2014/0267633 A1 | 9/2014 | Venkataraman et al. | |
| 2014/0267757 A1* | 9/2014 | Abramson | G02B 7/28 348/164 |
| 2014/0267765 A1* | 9/2014 | Stuart | G01D 1/00 348/164 |
| 2015/0009325 A1* | 1/2015 | Kardashov | H04N 7/183 348/143 |
| 2015/0022667 A1* | 1/2015 | McManus | H04N 5/23216 348/164 |
| 2015/0026719 A1* | 1/2015 | Menon | H04N 21/812 725/34 |
| 2015/0098663 A1 | 4/2015 | Heinke | |
| 2015/0187144 A1* | 7/2015 | Roth | G06T 19/006 345/633 |
| 2015/0379361 A1* | 12/2015 | Boulanger | H04N 5/33 701/2 |
| 2016/0014133 A1* | 1/2016 | Kanga | G06K 9/00771 726/4 |
| 2016/0041039 A1 | 2/2016 | Olsson | |
| 2016/0100764 A1* | 4/2016 | Teich | A61B 5/6898 348/77 |
| 2016/0178593 A1* | 6/2016 | Miller | G06T 7/33 382/191 |
| 2016/0300375 A1* | 10/2016 | Beckett | G06T 3/4092 |
| 2016/0343118 A1* | 11/2016 | Olsen | G06T 5/40 |
| 2016/0364629 A1 | 12/2016 | Solli | |
| 2017/0017846 A1* | 1/2017 | Felemban | G06K 9/4642 |
| 2017/0116725 A1* | 4/2017 | Stuart | G01B 11/272 |
| 2018/0213156 A1* | 7/2018 | Boulanger | G06T 17/00 |
| 2018/0239784 A1 | 8/2018 | Solli et al. | |
| 2018/0260793 A1* | 9/2018 | Li | G06T 7/001 |
| 2018/0300906 A1* | 10/2018 | Lu | G06T 5/50 |
| 2018/0335380 A1* | 11/2018 | Schmidt | G06T 5/50 |
| 2018/0338082 A1 | 11/2018 | Baqai et al. | |
| 2019/0005673 A1* | 1/2019 | Anderson | G06F 3/013 |
| 2019/0043201 A1* | 2/2019 | Strong | G06K 9/00624 |

OTHER PUBLICATIONS

FLIR Systems, Inc.; FLIR Lepton 80×60 Radiometric Longwave Infrared (LWIR) Camera Module; Jun. 19, 2017.
Security Electronics and Networks; FLIR Develops Muon Thermal Imaging Camera Core for OEMs; Sep. 10, 2014.
IR Tools, Master your thermal camera's Automatic Gain Control (AGS), Mar. 27, 2015.

(56) References Cited

OTHER PUBLICATIONS

Fluke Corporation, Thermal imaging terminology—explained, Jul. 2009.
FLIR Systems AB; FLIR One, User Guide second generation for Apple iOS, Nov. 9, 2015.
Jimenez, Castro et al.; "Thermal Image Sensing Model for Robotic Planning and Search", (14248220) Aug. 2016, vol. 16, Issue 8, Abstract, 1 page.
Kumar, Mathan B. et al.; "Multiple kernel scale invariant feature transform and cross indexing for image search and retrieval", Mar. 2018, vol. 66, Issue 2, Abstract, 1 page.
Matteoli, Sara et al.; "A novel image processing procedure for thermographic image analysis", Medical & Biological Engineering & Computing, Oct. 2018, vol. 56, Issue 10, Abstract, 1 page.
Azari, Milad Niaz et al.; "Intelligent Fault Detection in Power Distribution Systems Using Thermos-grams by Ensemble Classifiers", Automatika: Journal for Control, Measurement, Electronics, Computing & Communications, Oct.-Dec. 2016, vol. 57, Issue 4, Abstract, 1 page.
USPTO Patent Applications Database; abstract of U.S. Appl. No. 15/960,453; title: Image retrieval and processing systems and methods; applicant: FLIR Systems AB; inventors; Martin Solli and Stefan Bergstrom; published on Aug. 23, 2018, 1 page.
De Oliveira, Duilhio Candido et al.; "Using Deep Learning and Low-Cost RGB and Thermal Cameras to Detect Pedestrians in Aerial Images Captured by Multirotor UAV", (14248220) Jul. 1, 2018, vol. 18, Issue 7, abstract., 2 pages.
Marell, James et al.; "A comparison of image inspection modes for a visual search and rescue task", Behaviour & Information Technology, Sep. 2014, vol. 33, Issue 9, abstract, 1 page.
Wang, Z. et al.; "Stream Line-Based Pattern Search in Flows", Computer Graphics Forum, Dec. 2017, vol. 36, Issue 8, abstract, 1 page.
USPTO Patent Applications Database; abstract of U.S. Pat. No. 9,971,792; title: Image retrieval and processing systems and methods; applicant: FLIR Systems AB; inventor: Martin Solli; filed Jun. 9, 2016, issued May 15, 2018, 1 page.
Raza, Shan-E-Ahmed et al.; "Automatic Detection of Diseased Tomato Plants Using Thermal and Stereo Visible Light Images", M. PLos One, Apr. 2015, vol. 10, Issue 4, abstract, 1 page.
Barcelos, Emilio Z. et al.; "A Combined Method for segmentation and registration for an advance and progressive evaluation of thermal images", Sensors (14248220) 2014, vol. 14, Issue 11, abstract, 1 page.
Basurto, Chantal et al.; "Multi-criteria analysis for the integrated performance assessment of complex fenestration systems", Building Research & Information, Nov. 2017, vol. 45, Issue 8, abstract, 1 page.
Riaz, Irfan et al.; "Human Detection by Using Centrist Features for Thermal Images", IADIS International Journal on Computer Science & Information Systems, 2013, vol. 8, Issue 2, abstract., 1 page.
Lin, Dong et al"Automatic Spatio-Temporal Flow Velocity Measurement in Small Rivers Using Thermal Image Sequences", ISPRS Annals of Photogrammetry, Remote Sensing & Spatial Information Sciences, 2018, vol. 4, Issue 2, Publisher: Copernicus Gesellschaft mbH; abstract, 1 page.
Kremis, I.I. et al.; "Scanning Thermal Imaging Device Based on a Domestic Photodetector Device", Journal of Communications Technology and Electronics, Mar. 2018, vol. 63, Issue 3, abstract, 1 page.
Trivedi, Indraji N. et al.; "An economic load dispatch and multiple environmental dispatch problem solution with microgrids using interior search algorithm", Neural Computing & Applications, Oct. 2018, vol. 30, Issue 7, abstract, 1 page.
Chaudhry, F.A. et al.; "A novel chaotic differential evolution hybridized with quadratic programming for short-term hydrothermal coordination", Neural Computing & Applications, Dec. 2018, vol. 30, Issue 11, abstract, 1 page.
USPTO Patent Applications Database; abstract of U.S. Pat. No. 9,616,568; title: Generating a grasp affordance for an object based on a thermal image of the object that is captured following human manipulation of the object; applicant: X Development LLC; inventor: Jared Stephan Russell; issued Apr. 11, 2017, abstract, 1 page.
Kong, Seong et al.; "Multiscale Fusion of Visible and Thermal IR Images for Illumination-Invariant Face Recognition", International Journal of Computer Vision, Feb. 2007, vol. 71, Issue 2, abstract, 1 page.
Oettershagen, Philipp et al.; "Robotic technologies for solar-powered UAVs: Fully autonomous updraft-aware aerial sensing for multiday search-and-rescue missions", Journal of Field Robotics, Jun. 2018, vol. 35, Issue 4, abstract, 1 page.
Jamrozik, Wojciech et al.; "Application of fused visual and thermal images in monitoring and evaluation of welding processes", Welding International, Jun. 2015, vol. 29, Issue 6, abstract, 1 page.
Liao, Qixiang et al.; "Parameter Estimation of Nonlinear Systems by Dynamic Cuckoo Search", Neural Computation, Apr. 2017, vol. 29, Issue 4, abstract, 1 page.
Hermosilla, Gabriel et al.; "Fusion of Visible and Thermal Descriptors Using Genetic Algorithms for Face Recognition Systems", Sensors (14248220), Aug. 2015, vol. 15, Issue 8, abstract, 1 page.
Shunzhi, Zhu et al.; "Image feature detection algorithm based on the spread of Hessian source", Multimedia Systems, Feb. 2017, vol. 23, Issue 1, abstract, 1 page.
Zhu, J. et al.; "Interfacial Residual Stress Analysis of Thermal Spray Coatings by Miniature Ring-Core Cutting Combined with DIC Method", Experimental Mechanics, Feb. 2014, vol. 54, Issue 2, abstract, 1 page.
USPTO Patent Applications Database; abstract of U.S. Appl. No. 15/178,513; title: image retrieval and processing systems and methods; applicant: FLIR Systems AB; inventor: Martin Solli; filed Jun. 9, 2016, 1 page.
Scott, Spencer M. et al.; "The thermal stability and consolidation of perovskite variant Cs2SnCl6 using spark plasma sintering", Journal of the American Ceramic Society; May 2018, vol. 101, Issue 5, abstract, 1 page.
Zhang, Hu et al.; "Theoretical accuracy of anisotropic thermal conductivity determined by transient plane source method", International Journal of Heat and Mass Transfer; May 2017, 108 Part B; abstract, 1 page.
Valdramidis, Vasilis P. et al.; "Novel Thermal and Non-Thermal Technologies for Fluid Foods"; Food Science and Technology, International Series Amsterdam: Academic Press, 2012, abstract 1 page.
Dupre, Jean-Christophe et al.; "Detection of cracks in refractory materials by an enhanced digital image correlation technique", Journal of Materials Science, Jan. 2018, vol. 53, Issue 2, abstract, 1 page.
Jimenez, Castro et al.; "Thermal Image Sensing Model for Robotic Planning and Search", Sensors; published Aug. 8, 2016; vol. 16, 1253; doi 10.3390/s16081253; 27 pages.
Avisynth Wiki; FAQ YV12; Apr. 7, 2016.
Sullivan, Gary and Estrop, Stephen; Recommended 8-Bit YUV Formats for Video Rendering; Nov. 2008.
NXP Semiconductors Inc.; i.MX 7Solo Applications Processor Reference Manual; Aug. 2016 (submitted via five PDF files).
FLIR Systems, Inc.; User's manual FLIR GF3xx series; T559157; Oct. 23, 2017.
Snap-On Incorporated; Diagnostic Thermal Imager, User Manual; ZEETH3006 Rev. A 6-K-16 NAGBAU; Oct. 2016.
FLIR Systems, Inc.; FLIR Systems introduces Multi Spectral Dynamic Imaging (MSX); Innovative feature for extremely detail rich thermal images; downloaded from the world wide web at http://www.flir.co.uk/cs/display/?d=56012 on Apr. 30, 2018.
Fluke Corporation; Development Insider; How patent-pending technology blends thermal and visible light; Oct. 2006.
Segger Microcontroller GmbH & Co. KG; emWin; Graphic Library with Graphical User Interface; User & Reference Guide; Document UM03001; Mar. 6, 2017.
Navico Holdings AS; Lowrance; HDS Gen3; Operator Manual; Apr. 25, 2017.
FLIR Systems, Inc.; FLIR C3; Dec. 29, 2016.
FLIR Systems, Inc, User's manual FLIR Cx series; Publication T559918; May 2, 2017.
Fluke Corporation; SmartView 3.2.1; Feb. 22, 2012.

(56) References Cited

OTHER PUBLICATIONS

Fluke Corporation; Fluke SmartView IR analysis and reporting software; Aug. 2007.
Fluke Corporation; Technical Data; Fluke Connect SmartView Desktop software; Apr. 2017.
FLIR Muon, FLIR Systems, 5 pages, http://www.flir.co.uk/, Apr. 16, 2018.
FLIR Exx-Series, Advanced Thermal Imaging, 7 pages, www.flir.com, Mar. 7, 2018.
FLIR, Lepton Engineering Datasheet, 74 pages, Document No. 500-0763-01-09 Rev 110, Dec. 7, 2016.
U.S. Appl. No. 16/020,694, filed Jun. 27, 2018, inventors: Robert Hoevenaar and Timothy G. Ruther.
U.S. Appl. No. 16/020,867, filed Jun. 27, 2018, inventors: Robert Hoevenaar, Timothy G. Ruther, and Oswaldo Neri.
U.S. Appl. No. 16/020,976, filed Jun. 27, 2018, inventors: Joshua C. Covington, Oswaldo Neri, Roy S. Brozovich, Timothy G. Ruther, and Michael D. LaFerle.

\* cited by examiner

| Image File | Tag-1 | Tag-2 | Tag-3 | Tag-4 | Tag-5 | Tag-6 |
|---|---|---|---|---|---|---|
| 300 | VIN | CD 70 | 18-Feb-2018 | 8:30:34 | Tech ID 555 | |
| 302 | LP | CD 70 | 18-Feb-2018 | 8:31:15 | Tech ID 555 | |
| 304 | VL | CD 70 | 18-Feb-2018 | 8:40:02 | Tech ID 555 | |
| 306 | TH | CD 70 | 18-Feb-2018 | 8:40:02 | Tech ID 555 | |
| 308 | BL | CD 70 | 18-Feb-2018 | 8:40:02 | Tech ID 555 | |

↑ 350

| Image File | Tag-1 | Tag-2 | Tag-3 | Tag-4 | Tag-5 | Tag-6 |
|---|---|---|---|---|---|---|
| 300 | VIN | CD 70 | 18-Feb-2018 | 8:30:34 | Tech ID 555 | VIN 1G1FP33K64068359 |
| 302 | LP | CD 70 | 18-Feb-2018 | 8:31:15 | Tech ID 555 | LP-CB-SOI333 |
| 304 | VL | CD 70 | 18-Feb-2018 | 8:40:02 | Tech ID 555 | |
| 306 | TH | CD 70 | 18-Feb-2018 | 8:40:02 | Tech ID 555 | |
| 308 | BL | CD 70 | 18-Feb-2018 | 8:40:02 | Tech ID 555 | |

↑ 352

| Image File | Tag-1 | Tag-2 | Tag-3 | Tag-4 | Tag-5 | Tag-6 |
|---|---|---|---|---|---|---|
| 300 | VIN | CD 70 | 18-Feb-2018 | 8:30:34 | Tech ID 555 | VIN 1G1FP33K64068359 |
| 302 | LP | CD 70 | 18-Feb-2018 | 8:31:15 | Tech ID 555 | LP-CB-SOI333 |
| 304 | VL | CD 70 | 18-Feb-2018 | 8:40:02 | Tech ID 555 | 2003 Chevrolet Silverado |
| 306 | TH | CD 70 | 18-Feb-2018 | 8:40:02 | Tech ID 555 | 2003 Chevrolet Silverado |
| 308 | BL | CD 70 | 18-Feb-2018 | 8:40:02 | Tech ID 555 | 2003 Chevrolet Silverado |

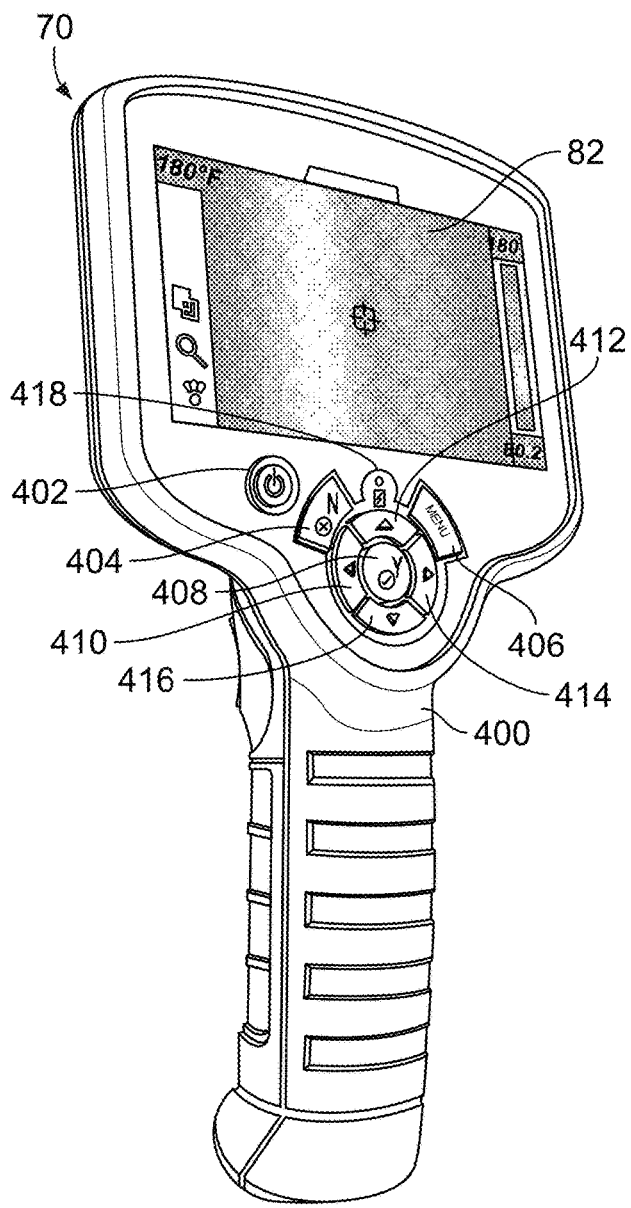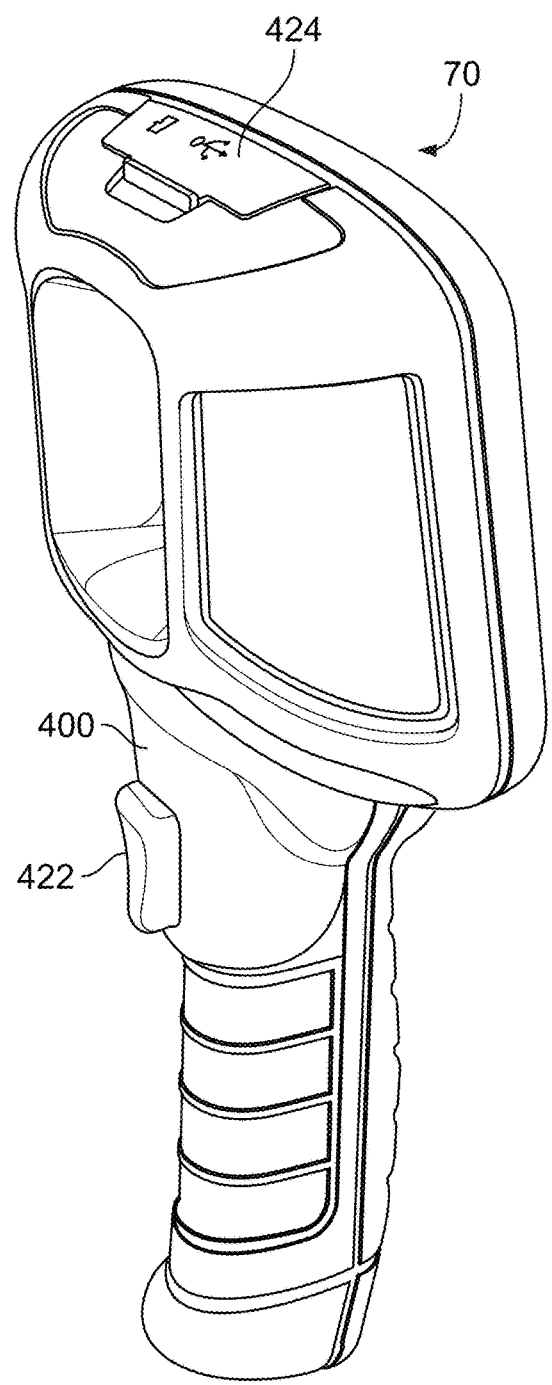
FIG. 8
FIG. 9

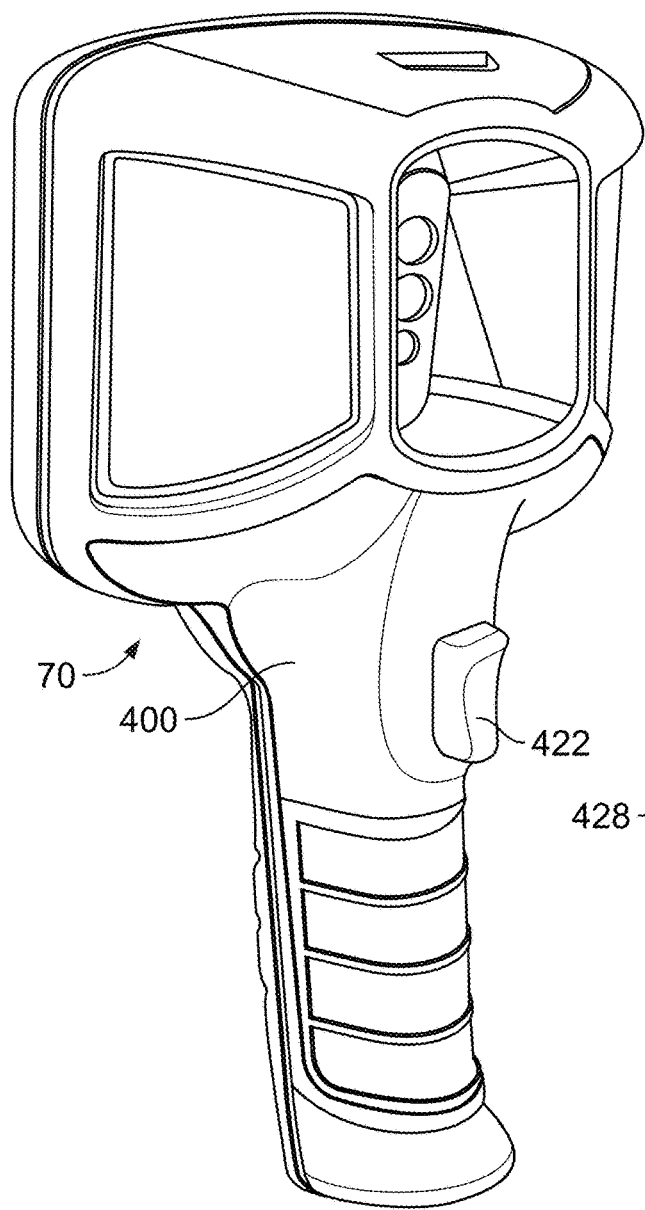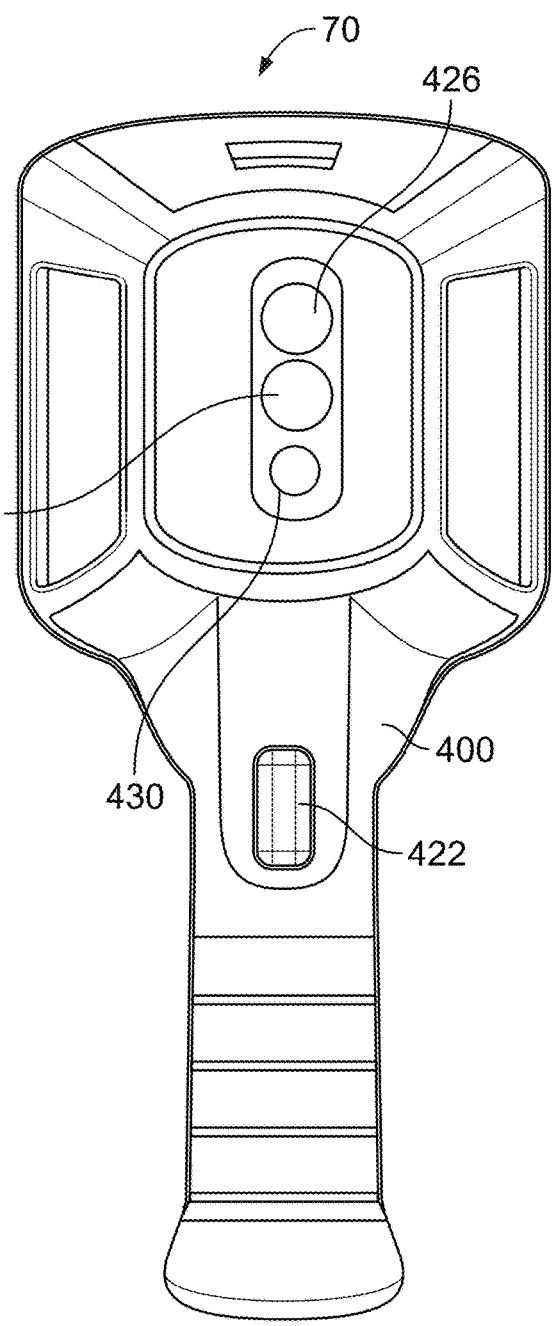
FIG. 10
FIG. 11

370

| Opacity Setting | 1st Button | 2nd Button |
|---|---|---|
| 0% | 25% | 0% |
| 25% | 50% | 0% |
| 50% | 75% | 25% |
| 75% | 100% | 50% |
| 100% | 100% | 75% |

372

| Opacity Setting | 1st Button |
|---|---|
| 0% | 25% |
| 25% | 50% |
| 50% | 75% |
| 75% | 100% |
| 100% | 0% |

374

| Opacity Setting | 1st Button | 2nd Button |
|---|---|---|
| 0% | 20% | 100% |
| 20% | 40% | 0% |
| 40% | 60% | 20% |
| 60% | 80% | 40% |
| 80% | 100% | 60% |
| 100% | 0% | 80% |

376

| Zoom Setting | 1st Button |
|---|---|
| 1X | 2X |
| 2X | 3X |
| 3X | 1X |

378

| Zoom Setting | 1st Button | 2nd Button |
|---|---|---|
| 1X | 1X | 2X |
| 2X | 1X | 3X |
| 3X | 2X | 3X |

FIG. 12

| Date | Time | Destination | Source | PID | PID Data Value | VDM # |
|---|---|---|---|---|---|---|
| 18-Feb-2018 | 09:00:011 | 10 | F1 | A1 | | 1 |
| 18-Feb-2018 | 09:00:012 | F1 | 10 | A2 | 13081310 | 2 |
| 18-Feb-2018 | 09:00:013 | 20 | F1 | A1 | | 3 |
| 18-Feb-2018 | 09:00:014 | F1 | 20 | A2 | 0000 | 4 |
| 18-Feb-2018 | 09:00:015 | 30 | F1 | A1 | | 5 |
| 18-Feb-2018 | 09:00:016 | F1 | 30 | A2 | 1255 | 6 |
| 18-Feb-2018 | 09:00:017 | 40 | F1 | A1 | | 7 |
| 18-Feb-2018 | 09:00:018 | F1 | 40 | A2 | 0000 | 8 |
| 18-Feb-2018 | 09:00:019 | 50 | F1 | A1 | | 9 |
| 18-Feb-2018 | 09:00:020 | F1 | 50 | A2 | 0000 | 10 |
| 18-Feb-2018 | 09:00:021 | 10 | F1 | 01 | | 11 |
| 18-Feb-2018 | 09:00:022 | F1 | 10 | 02 | B4 | 12 |
| 18-Feb-2018 | 09:00:023 | 10 | F1 | 45 | | 13 |
| 18-Feb-2018 | 09:00:024 | F1 | 10 | 46 | 00 | 14 |
| 18-Feb-2018 | 09:00:025 | 10 | F1 | 3C | | 15 |
| 18-Feb-2018 | 09:00:026 | F1 | 10 | 3D | F2 | 16 |
| 18-Feb-2018 | 09:00:027 | 10 | F1 | 2E | | 17 |
| 18-Feb-2018 | 09:00:028 | F1 | 10 | 2F | 00 | 18 |
| 18-Feb-2018 | 09:00:029 | 10 | F1 | B0 | | 19 |
| 18-Feb-2018 | 09:00:030 | F1 | 10 | B1 | 01 | 20 |
| 18-Feb-2018 | 09:00:031 | 10 | F1 | 45 | | 21 |
| 18-Feb-2018 | 09:00:032 | F1 | 10 | 46 | 01 | 22 |
| 18-Feb-2018 | 09:00:033 | 10 | F1 | 2E | | 23 |
| 18-Feb-2018 | 09:00:034 | F1 | 10 | 2F | 06 | 24 |
380
382
FIG. 13

```
┌─────────────────────────────────┐
│ IMAGE_1_TH.EXT                  │
│ IMAGE_1_VL.EXT                  │
│ IMAGE_1_BL.EXT                  │
│ DEVICE SERIAL NO. 123HTM123456  │
│ DATE: 4-JUL-2019                │
│ TIME: 09:03.04                  │
└─────────────────────────────────┘
      IMAGE_1_A_TAGS.XML
                                    790

┌─────────────────────────────────┐
│ IMAGE_1_TH.EXT                  │
│ IMAGE_1_VL.EXT                  │
│ OPACITY: 50%                    │
│ DEVICE SERIAL NO. 123HTM123456  │
│ DATE: 4-JUL-2019                │
│ TIME: 09:03.04                  │
└─────────────────────────────────┘
      IMAGE_1_B_TAGS.XML
                                    791

792
┌─────────────────────────────────┐
│ IMAGE_1_TH.EXT                  │
│ DEVICE SERIAL NO. 123HTM123456  │
│ DATE: 4-JUL-2019                │
│ TIME: 09:03.04                  │
└─────────────────────────────────┘
      IMAGE_1_C_TAGS.XML

795
┌─────────────────────────────────┐
│ IMAGE_1_TH.EXT                  │
│ OPACITY: 50%                    │
│ DEVICE SERIAL NO. 123HTM123456  │
│ DATE: 4-JUL-2019                │
│ TIME: 09:03.04                  │
└─────────────────────────────────┘
      IMAGE_1_F_TAGS.XML

┌─────────────────────────────────┐
│ IMAGE_1_VL.EXT                  │
│ DEVICE SERIAL NO. 123HTM123456  │
│ DATE: 4-JUL-2019                │
│ TIME: 09:03.04                  │
└─────────────────────────────────┘     793
      IMAGE_1_D_TAGS.XML

┌─────────────────────────────────┐
│ IMAGE_1_BL.EXT                  │
│ DEVICE SERIAL NO. 123HTM123456  │
│ DATE: 4-JUL-2019                │
│ TIME: 09:03.04                  │
└─────────────────────────────────┘     794
      IMAGE_1_E_TAGS.XML
```

FIG. 27

METHOD AND SYSTEM FOR DISPLAYING IMAGES CAPTURED BY A COMPUTING DEVICE INCLUDING A VISIBLE LIGHT CAMERA AND A THERMAL CAMERA

BACKGROUND

Technicians use a variety of tools to diagnose various items, such as a vehicle, a house, a building, or a component or system on or in one of those items, such as a window or a heating, ventilation, and air conditioning (HVAC) system. In some instances the diagnosis pertains to a temperature of the item. Under those and other circumstances, the technician may use a thermal imager device to capture a thermal image of the item under diagnosis. Over time the thermal imager device can accumulate a large quantity of thermal images in its data storage. In some instances, a user can connect the thermal imager device to a personal computer using a universal serial bus (USB) cable. Using Windows Explorer, for example, on the personal computer, a user can select an image file to be transferred from the thermal imager device to the personal computer via the USB cable. After the personal computer receives the thermal image file over the USB cable, a user of the personal computer can subsequently access the thermal image file on the personal computer using the Windows Explorer and then transmit the thermal image file to another computing device using a messaging application, such as an e-mail application.

Requiring a technician to upload a thermal image file to another computing device in order to have the thermal image file accessible via the other computing device can be a burden to the technician. Providing a method for uploading a thermal image file to another computing device automatically can eliminate the technician's burden in making a thermal image file accessible via a computing device other than the thermal imager that captured the thermal image represented by the thermal image file.

Moreover, once a thermal image file is transferred to the personal computer from the thermal imager device, a user of the other computing device may be unable to search for the thermal imager file on the personal computer. Furthermore, the thermal imager device may have limited display modes for display the thermal image based on the thermal image file or at least may not have a display mode for displaying the thermal image based on the thermal image file and a visible light image captured by the thermal imager device in a split-screen mode that shows the thermal image based on the thermal image file and the visible light image adjacent to one another without any overlap or in a picture-in-picture mode.

OVERVIEW

Several example implementations that relate to an imaging system that captures and/or displays images including an image captured by a visible light camera, an image captured by a thermal camera, or a blended imaged based on the images captured by the visible light and thermal cameras are described herein.

In a first implementation, a method is provided. The method includes: generating, by at least one processor, a first image file representing a thermal image captured by a thermal camera operatively coupled to the at least one processor; generating, by the at least one processor, a second image file representing a visible light image captured by a visible light camera operatively coupled to the at least one processor; generating, by the at least one processor, a first blended image based on the thermal image, the visible light image, and a display setting; displaying, by the at least one processor on a display operatively coupled to the at least one processor, the first blended image; and transmitting, by the at least one processor via a network interface to a server having an application for serving an image file generated by the at least one processor, an image file upload, wherein the image file upload includes: (i) the first image file, (ii) the second image file, and (iii) a third image file representing the first blended image, or the display setting for generating a second blended image based on the thermal image, the visible light image, and the display setting.

In a second implementation, a system is provided. The system includes: at least one processor; and a non-transitory computer memory storing computer-readable program instructions, wherein the computer-readable program instructions are executable by the at least one processor to: generate, by at least one processor, a first image file representing a thermal image captured by a thermal camera operatively coupled to the at least one processor; generate, by the at least one processor, a second image file representing a visible light image captured by a visible light camera operatively coupled to the at least one processor; generate, by the at least one processor, a first blended image based on the thermal image, the visible light image, and a display setting; display, by the at least one processor on a display operatively coupled to the at least one processor, the first blended image; and transmit, by the at least one processor via a network interface to a server having an application for serving an image file generated by the at least one processor, an image file upload, wherein the image file upload includes: (i) the first image file, (ii) the second image file, and (iii) a third image file representing the first blended image, or the display setting for generating a second blended image based on the thermal image, the visible light image, and the display setting.

In a third implementation, a non-transitory computer-readable memory is provided. The memory has instructions stored thereon. A computing can execute the program instructions to perform functions that include: generating a first image file representing a thermal image captured by a thermal camera operatively coupled to the at least one processor; generating a second image file representing a visible light image captured by a visible light camera operatively coupled to the at least one processor; generating a first blended image based on the thermal image, the visible light image, and a display setting; displaying, on a display operatively coupled to the at least one processor, the first blended image; and transmitting, via a network interface to a server having an application for serving an image file generated by the at least one processor, an image file upload, wherein the image file upload includes: (i) the first image file, (ii) the second image file, and (iii) a third image file representing the first blended image, or the display setting for generating a second blended image based on the thermal image, the visible light image, and the display setting.

Other implementations will become apparent to those of ordinary skill in the art by reading the following detailed description, with reference where appropriate to the accompanying drawings.

BRIEF DESCRIPTION OF THE DRAWINGS

FIG. 7 shows tables of example tags in accordance with an example implementation.

FIG. 8, FIG. 9, FIG. 10, and FIG. 11 are conceptual illustrations of a computing device in accordance with an example implementation.

FIG. 12 shows tables of example opacity setting selections in accordance with an example implementation.

FIG. 13 shows an example of raw vehicle data messages in accordance with an example implementation.

FIG. 27 shows tag files in accordance with an example implementation.

DETAILED DESCRIPTION

I. Introduction

Figure 1:
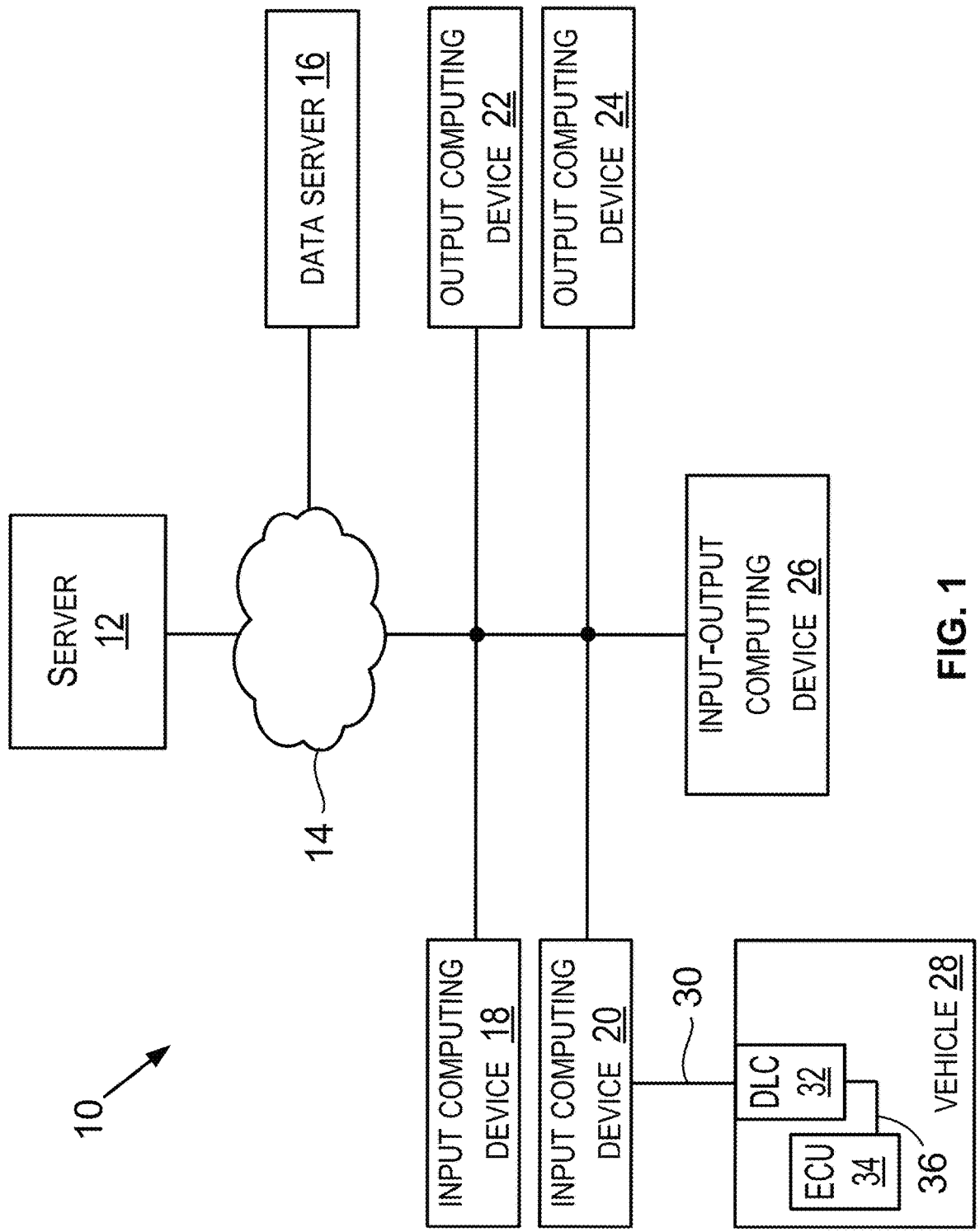
FIG. 1 is a block diagram of an operating environment in accordance with an example implementation.

This description pertains to an imaging system that that captures and/or displays images including an image captured by a visible light camera, an image captured by a thermal camera, or a blended imaged based on the images captured by the visible light and thermal cameras are described herein. The imaging system can automatically upload the image file and one or more other files related to the image file to a first server having an application for serving the image file to another computing device. The first server can receive other files, such as a vehicle data file, from a computing device having a vehicle interface and/or from another server. The other server can automatically upload the vehicle data file to the first server. A single computing device can include the first server and the other server. Alternatively, the first and other servers can be contained in two or more separate computing devices.

Automatically uploading the image file can improve the efficiency of a technician using the imaging system. Moreover, the automatically uploading the image file can simplify a user interface of the imaging system as the imaging system would not necessarily need a user interface to manually cause the imaging system to transmit the image file to the first server.

In an example implementation, the imaging system continues to store the image file in a memory until a user manually deletes the image file. In another example implementation, the imaging system automatically deletes the image file from its memory after uploading the image file to the first server. In yet another example implementation, the imaging system automatically deletes the image file from its memory in response to receiving a communication from the first server indicating the image files was received.

In those or other example implementations, the imaging system can automatically generate tags corresponding to the image file. As an example, the imaging system can perform optical character recognition on another image captured by the imaging system to determine a vehicle identifier of a vehicle to which the image file relates. The vehicle identifier can, but need not necessarily, include a vehicle identification number and/or a license plate number. The imaging system can store the tag in a tag file associated with the image file. The imaging system can automatically store the image file, one or more other image files, and/or the tag file including the tag using a naming convention that allows a computing device to determine those files are related to one another.

In an example implementation, the first server is configured to serve a client computing device executing an application of the first server. The first server can carry out a web session with the client computing device to identify a user accessing the application and to determine which files the user is permitted to access. Those files can include image files the user captured via the imaging system, a vehicle data file the user captured using a computing device with a vehicle interface, an image file or vehicle data file captured by another user of the application but shared with user, and/or a vehicle report the first server requests from the other server on behalf of the user.

Furthermore, the client computing device can receive and display web pages served by the first server. In an example implementation, a first web page can include a field for entering search criteria to be used by the first server to locate the image file and/or any related files. As an example, the search criteria can include a tag. In that or another example implementation, the second web page can include an image represented by the image file. The client computing system can include user controls to allow a user to annotate the image while displayed on the second web page. As an example, the annotations can be saved as part of the image file, as part of the tag file, and/or as part of another file, such as a vehicle report in which the image is displayed.

II. Example Operating Environment

FIG. 1 is a block diagram of an operating environment 10. In an example implementation, the operating environment 10 include the following items: a server 12 (which can be referred to as a "web application hub" (or more simply "hub"), a communication network (or more simply "network") 14, a data server 16, input computing devices 18, 20, output computing devices 22, 24, an input-output computing device 26, a vehicle 28, and a communication link 30. The output computing devices 22, 24 and/or the input-output computing device 26 can operate as and/or be the client computing device described above. The input computing device 18, 20 are configured to provide content, such as an image file, a tag file, or a vehicle data file to the server 12 such that the server 12 can serve at least a portion of that content to the output computing devices 22, 24. The input-output computing device 26 is a computing device configured to provide content, such as an image file, a tag file, or a vehicle data file to the server 12 such that the server 12 can serve at least a portion of that content to the output computing devices 22, 24 and/or to the input-output computing device 26. Any function described as being performed by the input computing device 18, 20 and/or any function described as being performed by the output computing device 22, 24 can be performed by the input-output computing device 26.

A. Server

The server 12 includes a device and/or system that can receive a communication from at least one of the input computing device 18, 20. That communication can, but need not necessarily, include a file generated by the input computing device 18, 20, such as an image file or a vehicle data file. The server 12 includes a device and/or system that can serve an application executing at the server 12 and/or at the outputting computing device 22, 24 or the input-output computing device 26. Serving the application can include generating a web page and transmitting a communication including the web page for displaying at the outputting computing device 22, 24 or the input-output computing device 26. The web page can include the file generated by the input computing device 18, 20 or a link to the file generated by the input computing device 18, 20.

B. Communication Network

The network 14 operatively connects two or more items in the operating environment 10. The network 14 is configured to carry a communication from one item in the operating environment 10 to one or more other items in the operating environment 10. The network 14 can include various network components such as switches, modems, gateways, antennas, cables, transmitters, or receivers. The network 14 can include a wide area network (WAN). The WAN can carry data using packet-switched or circuit-switched technologies. The WAN can include an air interface or wire to carry the communication. The network 14 can include a network or at least a portion of a network that carries the communication using a Transmission Control Protocol (TCP) and the Internet Protocol (IP), such as the communication network commonly referred to as the Internet. Other examples of network configurations and protocols for carrying the communication over the network 14 are also possible.

Any communication discussed in this description can include data. The data in the communication can include a file, such as an image file. The data in the communication can include a source identifier that indicates a device that transmitted the communication and a destination identifier that indicates a device to which the communication is to be carried. A source identifier and/or a destination identifier can include an address, such as an IP address.

C. Data Server

The data server 16 includes a computing device that is configured to transmit communications to the server 12, the input computing device 18, 20, the output computing device 22, 24, and/or the input-output computing device 26. The data server 16 can include a network interface to transmit the communication onto the network 14, and a memory containing the data to be transmitted via the communication. In an example implementation, the server 12 includes the data server 16. In another example implementation, the server 12 does not include the data server 16. In this latter implementation, the server 12 and the data server 16 can operatively connect to one another via the network 14.

As an example, the data server 16 can transmit a communication including a repair order associated with the vehicle 28. As another example, the data server 16 can transmit a communication including service information regarding the vehicle 28. The service information can, but need not necessarily, include a diagnostic flow chart, a repair tip, a technical service bulletin from a vehicle manufacturer, a maintenance schedule, or an identifier of a functional test, reset, or calibration executable by the input computing device 20 to the vehicle 28. As yet another example, the data server 16 can transmit a server report, such as a service report including a vehicle data file.

D. Computing Devices

Each of the input computing device 18, 20, the output computing device 22, 24, and the input-output computing device 26 includes a computing device and can more simply be referred to as a "computing device." The input computing device 18, 20 is configured to transmit a communication to the server 12. That communication can include data the server 12 transmits to the output computing device 22, 24 by executing the application the server 12 serves. The data in that communication can include a web page and/or a file, such as an image file or a vehicle data file. The output computing device 22, 24 can display the data received in a communication from the server 12.

The input-output computing device 26 is configured to transmit to the server 12 a communication with data the server 12 can transmit to the output computing device 22, 24 and/or the input-output computing device 26. The input-output computing device 26 can display the data received in a communication from the server 12.

E. Vehicle

A vehicle, such as the vehicle 28, is a mobile machine that can be used to transport a person, people, and/or cargo. A vehicle can be driven or otherwise guided along a path (e.g., a paved road or otherwise) on land, in water, or in the air or outer space. A vehicle can be wheeled, tracked, railed, or skied. A vehicle can be guided by a user within the vehicle or by a user outside of the vehicle by use of a remote control. A vehicle can be guide at least partially autonomously. In the case of an autonomous vehicle, the vehicle can at least sometimes be guided along a path without any person or cargo inside or on the vehicle. A vehicle can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, a farm machine, a van (such as a dry or refrigerated van), a tank trailer, a platform trailer, a drone, or an automobile carrier. A vehicle can include or use any appropriate voltage or current source, such as a battery, an alternator, a fuel cell, and the like. A vehicle can include or use any desired drive system or engine. That drive system or engine can include items that use fossil fuels, such as gasoline, natural gas, propane, and the like, electricity, such as that generated by a battery, magneto, fuel cell, solar cell and the like, wind and hybrids or combinations thereof. A vehicle can include an electronic control unit (ECU) 34, a data link connector (DLC) 32, and a vehicle communication link 36 that connects the DLC 32 to the ECU 34. The ECU 34 can detect a malfunction in the vehicle and set a diagnostic trouble code (DTC) to an active status.

A vehicle manufacturer can build various quantities of vehicles each calendar year (i.e., January $1^{st}$ to December $31^{st}$). In some instances, a vehicle manufacturer defines a model year for a particular vehicle model to be built. The model year can start on a date other than January $1^{st}$ and/or can end on a date other than December $31^{st}$. The model year can span portions of two calendar years. A vehicle manufacturer can build one vehicle model or multiple different vehicle models. Two or more different vehicle models built by a vehicle manufacturer during a particular calendar year can have the same of different defined model years. The vehicle manufacturer can build vehicles of a vehicle model with different vehicle options. For example, the particular vehicle model can include vehicles with six-cylinder engines and vehicles with eight-cylinder engines. The vehicle manufacturer or another entity can define vehicle identifying information for each vehicle built by the vehicle manufacturer. Particular vehicle identifying information identifies particular sets of vehicles (e.g., all vehicles of a particular vehicle model for a particular vehicle model year or all vehicles of a particular vehicle model for a particular vehicle model year with a particular set of one or more vehicle options).

As an example, the particular vehicle identifying information can include indicators of characteristics of the vehicle such as when the vehicle was built (e.g., a vehicle model year), who built the vehicle (e.g., a vehicle make (i.e., vehicle manufacturer)), marketing names associated with vehicle (e.g., a vehicle model name, or more simply "model"), and features of the vehicle (e.g., an engine type). In accordance with that example, the particular vehicle identifying information can be referred to by an abbreviation YMME or Y/M/M/E, where each letter in the order shown represents a model year identifier, vehicle make identifier, vehicle model name identifier, and engine type identifier, respectively, or an abbreviation YMM or Y/M/M, where each letter in the order shown represents a model year identifier, vehicle make identifier, and vehicle model name identifier, respectively. An example Y/M/M/E is 2004/Toyota/Camry/4Cyl, in which "2004" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine (ICE)) within the vehicle. A person skilled in the art will understand that other features (such as a vehicle system) in addition to or as an alternative to "engine type" can be used to identify a vehicle using particular vehicle identifying information, and for some purposes, a vehicle could be identified by its make and model M/M or YMMS or YMMES, where the "S" represents the vehicle system. These other features can be identified in various manners, such as a regular production option (RPO) code, such as the RPO codes defined by the General Motors Company LLC, Detroit Mich.

Furthermore, the vehicle identifying information can be combined and displayed as a vehicle identification number (VIN). The VIN can be displayed on a VIN label, a VIN plate, vehicle glass, and/or another vehicle component. The displayed VIN can be represented as a code, such as a bar code or a matrix code (e.g., a QR® code). Furthermore still, the vehicle 22 can include one or more license plates, such as a license plate issued by a government agency (e.g., a department of motor vehicles in California, United States).

A vehicle communication link within the vehicle 28 can include one or more conductors (e.g., copper wire conductors) or can be wireless. As an example, the vehicle communication link can include one or more conductors for carrying vehicle data messages in accordance with a vehicle data message (VDM) protocol. A VDM protocol can include a Society of Automotive Engineers (SAE)® J1850 (PWM or VPW) VDM protocol, an International Organization of Standardization (ISO)® 15764-4 controller area network (CAN) VDM protocol, an ISO® 9141-2 K-Line VDM protocol, an ISO® 14230-4 KWP2000 K-Line VDM protocol, an ISO® 17458 (e.g., parts 1-5) FlexRay VDM protocol, an ISO® 17987 local interconnect network (LIN) VDM protocol, a MOST® Cooperation VDM protocol (such as the MOST Specification Rev. 3.0 E2, or the MOST® Dynamic Specification, Rev. 3.0.2), or some other VDM protocol defined for performing communications with or within the vehicle 28. Each and every VDM discussed in this description is arranged according to a VDM protocol. The vehicle communication link 36 can be connected to one or more ECU 34 and to the DLC 32.

The ECU 34 can control various aspects of vehicle operation or components within a vehicle. For example, the ECU 34 can include a powertrain (PT) system ECU, an engine control module (ECM) ECU, a powertrain control module (PCM) ECU, a supplemental inflatable restraint (SIR) system (i.e., an air bag system) ECU, an entertainment system ECU, or some other ECU. The ECU 34 can receive inputs (e.g., a sensor input), control output devices (e.g., a solenoid), generate a vehicle data message (VDM) (such as a VDM based on a received input or a controlled output), and set a diagnostic trouble code (DTC) as being active or history for a detected fault or failure condition within a vehicle. The ECU 34 can perform a functional test or a reset procedure in response to receiving a VDM requesting performance of the functional test or the reset procedure. A VDM received by the ECU 34 can include a parameter request that includes a parameter identifier (PID). A VDM transmitted by the ECU 34 can include a response including the PID and a PID data value for the PID. The ECU 34 can be connected to a vehicle component, such as a vehicle battery, a sensor, a vehicle chassis, a solenoid, a fuel injector, a fuel pump, or some other vehicle component via a circuit.

The DLC 32 can include a connector such as an on-board diagnostics (OBD) I connector, an OBD II connector, or some other connector. An OBD II connector can include slots for retaining up to sixteen connector terminals, but can include a different number of slots or no slots at all. As an example, the DLC 32 can include an OBD II connector that meets the SAE J1962 specification such as a connector 16M, part number 12110252, available from Delphi Automotive LLP of Troy, Mich. The DLC 32 can include conductor terminals that connect to a conductor in the vehicle 28. For instance, the DLC 32 can include connector terminals that connect to conductors that respectively connect to positive and negative terminals of a vehicle battery. The DLC 32 can include one or more conductor terminals that connect to a conductor of the vehicle communication link such that the DLC 32 is communicatively connected to the ECU.

F. Communication Link

In an example implementation, the communication link 30 can include a wired communication link that is removably connectable to both the input computing device 20 and the vehicle 28. The communication link 30 can be used to removably connect the input computing device 20 to the vehicle 28. Likewise, the communication link 30 can be used to removably connect the vehicle 28 to the input computing device 20. A connection of the communication link 30 and the vehicle 28 can occur at the DLC 32 in the vehicle 28. In the foregoing implementation or in another implementation, the communication link 30 can include a wireless communication link.

II. Example Systems and Devices

A. Server

Figure 2:
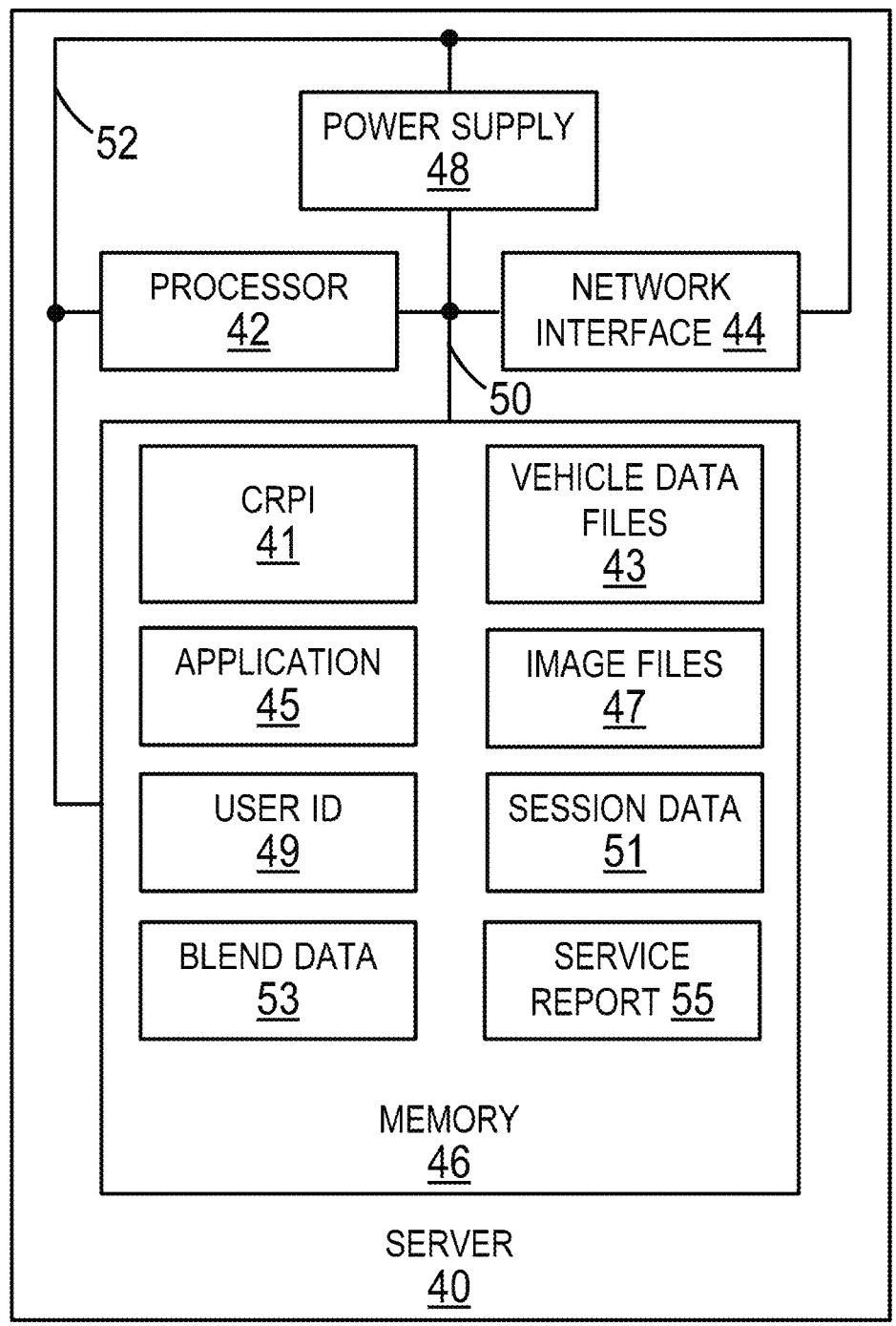
FIG. 2 is a block diagram of a server in accordance with an example implementation.

Next, FIG. 2 is a block diagram of a server 40 (e.g., an application server) according to an example implementation. As shown in FIG. 2, the server 40 includes a processor 42, a network interface 44, a memory 46, a power supply 48, a data bus 50, and a power bus 52. The data bus 50 operatively connects the processor 42, the network interface 44, and/or the memory 46. The server 12 shown in FIG. 1 can be arranged like the server 40. The server 40 can operate in the operating environment 10 in place of the server 12. The data bus 50 can include a serial data bus and/or a parallel data bus. As an example, the data bus 50 can include a copper foil trace of a printed circuit board, a wire, or some other electrical conductor.

1. Processor

The processor 42 can include one or more processors. The processor 42 can be programmed to perform any function or combination of functions described herein as being performed by the server 12, 40. The description of a processor in the following two paragraphs is applicable to the processor 42 and any other processor discussed in this description.

A processor can include a general purpose processor (e.g., an INTEL® single core microprocessor or an INTEL® multicore microprocessor), or a special purpose processor (e.g., a digital signal processor, a graphics processor, an embedded processor, or an application specific integrated circuit (ASIC) processor). A processor can be configured to execute computer-readable program instructions (CRPI). The CRPI discussed in this description can include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a conventional procedural programming language, such as the "C" programming language. A processor can be configured to execute hard-coded functionality in addition to or as an alternative to software-coded functionality (e.g., via CRPI).

An embedded processor refers to a processor with a dedicated function or functions within a larger electronic, mechanical, pneumatic, and/or hydraulic device, and is contrasted with a general purpose computer. The embedded processor can include a central processing unit chip used in a system that is not a general-purpose workstation, laptop, or desktop computer. In some implementations, the embedded processor can execute an operating system, such as a real-time operating system (RTOS). As an example, the RTOS can include the SMX® RTOS developed by Micro Digital, Inc., such that the processor can, but need not necessarily, include (a) an advanced RISC (reduced instruction set computer) machine (ARM) processor (e.g., an AT91SAM4E ARM processor provided by the Atmel Corporation, San Jose, Calif.), or (b) a COLDFIRE® processor (e.g., a 52259 processor) provided by NXP Semiconductors N.V., Eindhoven, Netherlands. A general purpose processor, a special purpose processor, and/or an embedded processor can perform analog signal processing and/or digital signal processing.

Depending on a desired implementation, a processor of the computing devices described in this description can be of any type including but not limited to a microprocessor (μP), a microcontroller (μC), a digital signal processor (DSP), or any combination thereof. A memory controller (not shown) can also be used with a processor, or in some implementations, the memory controller can be an internal part of the processor.

2. Network Interface

A network interface, such as the network interface 44 or any other network interface discussed in this description, can operatively connect a system or device including the network interface to a communication network, such as the network 14. For example, the network interface 44 can operatively connect the server 40 to the network 14. The description of a network interface in the following seven paragraphs is applicable to the network interface 44 and any other network interface discussed in this description.

A network interface can include one or more network transceivers. Each network transceiver includes one or more transmitters configured to transmit a communication onto a network, such as the network 14. Each network transceiver includes one or more receivers configured to receive a communication carried over a network, such as the network 14.

A transmitter, such as a transmitter in a network interface or in a vehicle interface 108 (shown in FIG. 4) can transmit radio signals carrying a communication, and a receiver, such as a receiver in a network interface or in the vehicle interface 108, can receive radio signals carrying a communication. A transceiver with a radio transmitter and radio receiver can include one or more antennas and can be referred to as a "radio transceiver," an "RF transceiver," or a "wireless transceiver."

A radio signal transmitted or received by a radio transceiver can be arranged in accordance with one or more wireless communication standards or protocols such as an Institute of Electrical and Electronics Engineers (IEEE) standard, such as (i) an IEEE 802.11 standard for wireless local area networks (wireless LAN) (which is sometimes referred to as a WI-FI® standard) (e.g., 802.11a, 802.11b, 802.11g, 802.11n, 802.11ac, 802.11ad, 802.11af, 802.11ag, 802.11ah, 802.11ai, 802.11aj, 802.11aq, 802.11ax, or 802.11ay), (ii) an IEEE 802.15 standard (e.g., 802.15.1, 802.15.3, 802.15.4 (ZigBee), or 802.15.5) for wireless personal area networks (PANs), (iii) a BLUETOOTH® version 4.1 or 4.2 standard developed by the Bluetooth Special Interest Group (SIG) of Kirkland, Wash., (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoWPAN standard, (xiv) a Thread networking protocol, (xv) an International Organization for Standardization (ISO/International Electrotechnical Commission (IEC) standard such as the ISO/IEC 18000-3 standard for Near Field Communication (NFC), (xvi) the Sigfox communication standard, (xvii) the Neul communication standard, or (xviii) the LoRaWAN communication standard. Other examples of the wireless communication standards or protocols are possible.

Additionally or alternatively, a transmitter, such as a transmitter in a network interface or in the vehicle interface 108, can transmit a signal (e.g., one or more signals or one or more electrical waves) carrying or representing a communication onto a wire (e.g., one or more wires) and a receiver, such as a receiver in network interface or in the vehicle interface 108, can receive via a wire a signal carrying or representing a communication over the wire. The wire can be part of a network, such as the network 14. The signal carried over a wire can be arranged in accordance with a wired communication standard such as a Transmission Control Protocol/Internet Protocol (TCP/IP), an IEEE 802.3 Ethernet communication standard for a LAN, a data over cable service interface specification (DOCSIS standard), such as DOCSIS 3.1, a USB specification (as previously described), or some other wired communication standard.

A communication transmitted by a network interface or a vehicle interface can include a destination identifier or address of a network device to which the communication is to be transmitted. A communication transmitted by a network interface or a vehicle interface can include a source identifier or address of the system component including the network interface. The source identifier or address can be used to send a response to the network device that includes the network interface that sent the communication.

A network interface can include at least one of the following: a modem, a network interface card, or a chip mountable on a circuit board. As an example the chip can include a CC3100 WI-FI® network processor available from Texas Instruments, Dallas, Tex., a CC256MODx BLUETOOTH® Host Controller Interface (HCI) module available from Texas instruments, or a different chip for communicating via WI-FI®, BLUETOOTH® or another communication protocol.

A device within or coupled to the network 14 or that communicates via the network 14 using a packet-switched technology can be locally configured for a next 'hop' in the network (e.g., a device or address where to send data to, and where to expect data from). As an example, a network interface configured transmitting a communication using an IEEE 802.11 standard can be configured with a network name, a network security type, and a password. Some network interfaces auto-negotiate this information through a discovery mechanism (e.g., cellular phone technology).

3. Memory

The memory 46 includes a single memory or multiple memories. Two or more of the multiple memories can be the same type of memory or different types of memories. The memory 46 is configured to store computer-readable data, such as the example content of the memory 46 discussed below.

The examples of a memory in the following five paragraphs are applicable to the memory 46 and any other memory discussed in this description.

A memory can include a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can include a volatile or non-volatile storage component, such as an optical, magnetic, organic or other memory or disc storage component. Additionally or alternatively, a non-transitory memory can include or be configured as a random-access memory (RAM), a read-only memory (ROM), a programmable read-only memory (PROM), an erasable programmable read-only memory (EPROM), an electrically erasable programmable read-only memory (EEPROM), flash memory, a hard disk drive, a Compact Disc (CD), a Digital Video Disk (DVD), a CD read-only memory (CD-ROM), or other optical storage, magnetic cassettes, magnetic tape, magnetic disk storage or other magnetic storage devices, or any other medium which can be used to store the desired information and which can be accessed by a processor and/or a memory controller. The RAM can include static RAM or dynamic RAM.

In some implementations, a non-transitory memory of one or more memories is soldered to a substrate. In those or other implementations, a non-transitory memory of one or more memories includes a semi-conductor chip removably inserted into a semi-conductor chip socket. In those or still or other implementations, a non-transitory memory of one or more memories includes a memory card removably inserted into a memory card slot. As an example, the memory card can include a microSD memory card, a micro-SDHC memory card, an SD memory card, or some other type of memory card.

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable medium." Any of those alternative terms can be preceded by the prefix "transitory" if the memory is transitory or "non-transitory" if the memory is non-transitory. For a memory including multiple memories, two or more of the multiple memories can be the same type of memory or different types of memories.

A transitory memory can include, for example, CRPI provided over a communication link, such as the network 14. The network 14 can include a digital or analog communication link. The network 14 can include a wired communication link including one or more wires or conductors, or a wireless communication link including an air interface.

4. Memory Content

The memory 46 stores computer-readable data. As an example, the memory 46 contains at least one of the following: CRPI 41, vehicle data files 43, an application 45, image files 47, user identifier 49, session data 51, blend data 53, and/or a service report 55.

In general, the CRPI 41 includes program instructions executable by the processor 42 to perform functions described in this description as being performed by the server 12, 40. Examples of some particular program instructions of the CRPI 41 are described in the following section.

The vehicle data files 43 can include a vehicle data file received from the input computing device 20 or the computing device 100. A vehicle data file can include one or more vehicle data messages transmitted by the computing device 20, 100 to the vehicle 28 over the communication link 30 and/or one or more vehicle data messages transmitted by the vehicle 28 to the computing device 20, 100 over the communication link. The vehicle data messages in a vehicle data file can include an identifier of the ECU 34, a PID, and a PID value.

Figure 5:
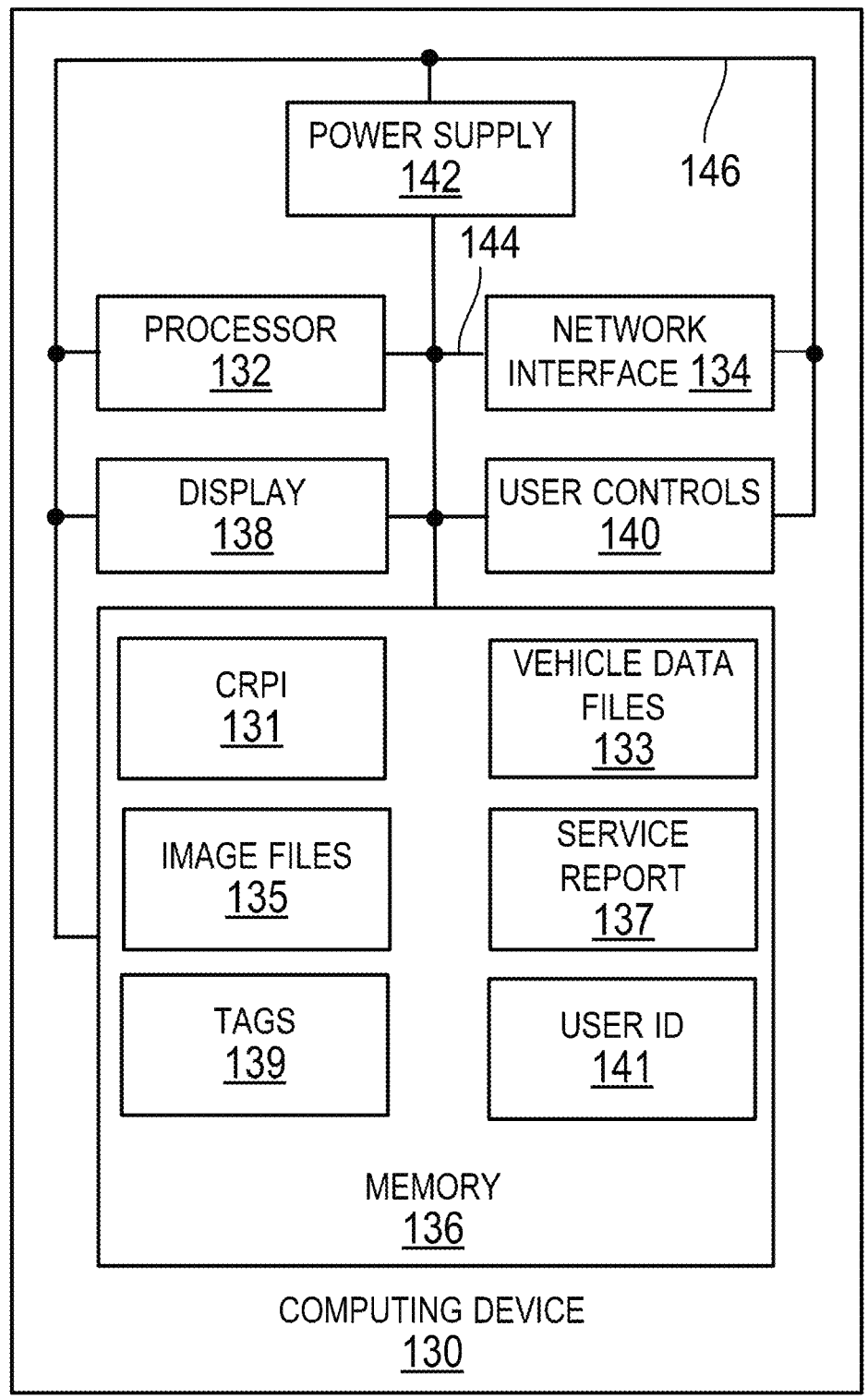
FIG. 5 is a block diagram of another computing device in accordance with an example implementation.

The application 45 can include an application executed by the processor 42 on behalf of the output computing device 22, 24, the input-output computing device 26, and/or the computing device 130 (shown in FIG. 5). Execution of the application 45 can cause the server 40 to transmit communications described as being transmitted from the server 12, 40 to the output computing device 22, 24, the input-output computing device 26, or the computing device 130. Execution of the application 45 can cause the server 12, 40 to the output computing device 22, 24, the input-output computing device 26, or the computing device 130 to display content described in this description as being provided by the server 12, 40 to the output computing device 22, 24, the input-output computing device 26, or the computing device 130.

The image files 47 can include image files the server 12 receives from the computing device 18, 70. As example, the image files 47 can include an image file 300, 302, 304, 306, and/or 308 (all shown in FIG. 6). The image files 47 can, but need not necessarily, include image files having a file extension ".BMP" or '.JPG." For instance, the image files can include image files having a file extension ".PNG," ".GIF," or a proprietary image format. Moreover, the image files 47 can include a video file having an ".AVI" file extension or a file extension for a different video format.

The user identifier (or more simply, the "user ID") 49 can, but need not necessarily, include an identifier of a computing device or a user of a computing device. The server 40 can use the user ID 49 to authenticate a device or user attempting to access the application 45 and/or attempting to input data, such as an image file or a vehicle data file, into the server 40 for storage in the memory 46.

The session data 51 includes data regarding an existing session of using the application 45. The following examples of data can, but need not necessarily, be a portion of the session data. For instance, the session data can include a user ID of the output computing device 22, 24, the input-output computing device 26, or the computing device 130, and/or an address associated with the output computing device 22, 24, the input-output computing device 26, or the computing device 130. The session data 51 can include data indicating a request within a communication transmitted by the output computing device 22, 24 or the input-output computing device 26. The session data 51 can include data (such as a tag to search for an image file) requested by the output computing device 22, 24, the input-output computing device 26, or the computing device 130 prior to, during, or after transmission of the requested data. The session data can include data requested from the data server 16, such as repair order file or a service report.

The blend data 53 includes data for blending two image files to generate a blended image and/or data indicating blend settings used to generate a blended image. The blend data 53 can, but need not necessarily include, an identifier of a first image file, such as an image file 304 shown in FIG. 6, an identifier of a second image file, such as an image file 306 shown in FIG. 6, and blend settings of the input computing device 70 at a time images of the image files 304, 306 were captured. For an implementation in which the camera 78 includes a visible light camera and the camera 80 includes a thermal camera, the blend settings could be visible light camera 100% and thermal camera 0%, or visible light camera 0% and thermal camera 100%, or a first percentage for the visible light camera within the range 0% to 100% exclusive and a second percentage for the thermal light camera within the range 0% to 100% exclusive, where a sum of the first percentage and the second percentage equals 100%.

The service report 55 can include a report regarding an item under service, such as the vehicle 28. The service report 55 can be generated using an application served by the server 12, 16, 40 to the computing system 100 and/or an application operating on the computing system 100. The service report 55 can include any of the content of the service report 966 shown in FIG. 25 or FIG. 26.

5. Example CRPI

The CRPI 41 can include program instructions to cause the processor 42 to store within the memory 46 content received from the input computing devices 18, 20 and/or the computing devices 70, 100. That content can include an image file, a vehicle data file, a tag file, and/or any other content described as being generated by and/or stored in the computing device that provides the content to the server 40.

The CRPI 41 can include program instructions to cause the processor 42 to determine a VIN tag of an image file stored in the image files 47, decode the VIN tag to determine a YMM or YMME represented by the VIN tag, and modify the image file to include a YMM tag based on the YMM represented by the VIN tag or a YMME tag based on the YMME represented by the VIN tag.

The CRPI 41 can include program instructions to cause the processor 42 to execute the application 45 to perform a service for the output computing device 22, 24 and/or the input-output computing device 26. Performing the service can, but need not necessarily, include assembling web pages for displaying by a browser application operating on the application 45 at the output computing device 22, 24, the input-output computing device 26, and/or the computing device 130.

The CRPI 41 can include program instructions to cause the processor 42 to request content, such as a vehicle report, from the data server 16, receive the requested content, and to afterwards provide the content to the output computing device 22, 24, the input-output computing device 26, and/or the computing device 130.

The CRPI 41 can include program instructions to cause the processor 42 to store a service report annotated by the computing device 130. Afterwards, the processor 42 can provide the annotated service report to any user granted access to the annotated service report by a user that generated the annotated service report.

6. Power Supply

The power supply 48 can be configured in any of a variety of configurations or combinations of the variety of configurations. As an example, the power supply 48 can include circuitry to receive AC current from an AC electrical supply (e.g., electrical circuits connected to an electrical wall outlet) and convert the AC current to a DC current for supplying to one or more of the components within the server 40. As another example, the power supply 48 can include an energy storage device, such as a battery, or be battery operated. As yet another example, the power supply 48 can include a solar cell or be solar operated. The power supply 48 can include the power bus 52 and/or electrical circuits operatively connected to power bus 48 in order to distribute electrical current for powering components of the server 40. As an example, the power bus 52 can include a copper foil trace of a printed circuit board, a wire, or some other electrical conductor. Other examples of the power supply 48 and the power bus 52 are possible.

B. Example Input Computing Devices

1. Computing Device with Dual Cameras a. Computing Device Components

Figure 3:
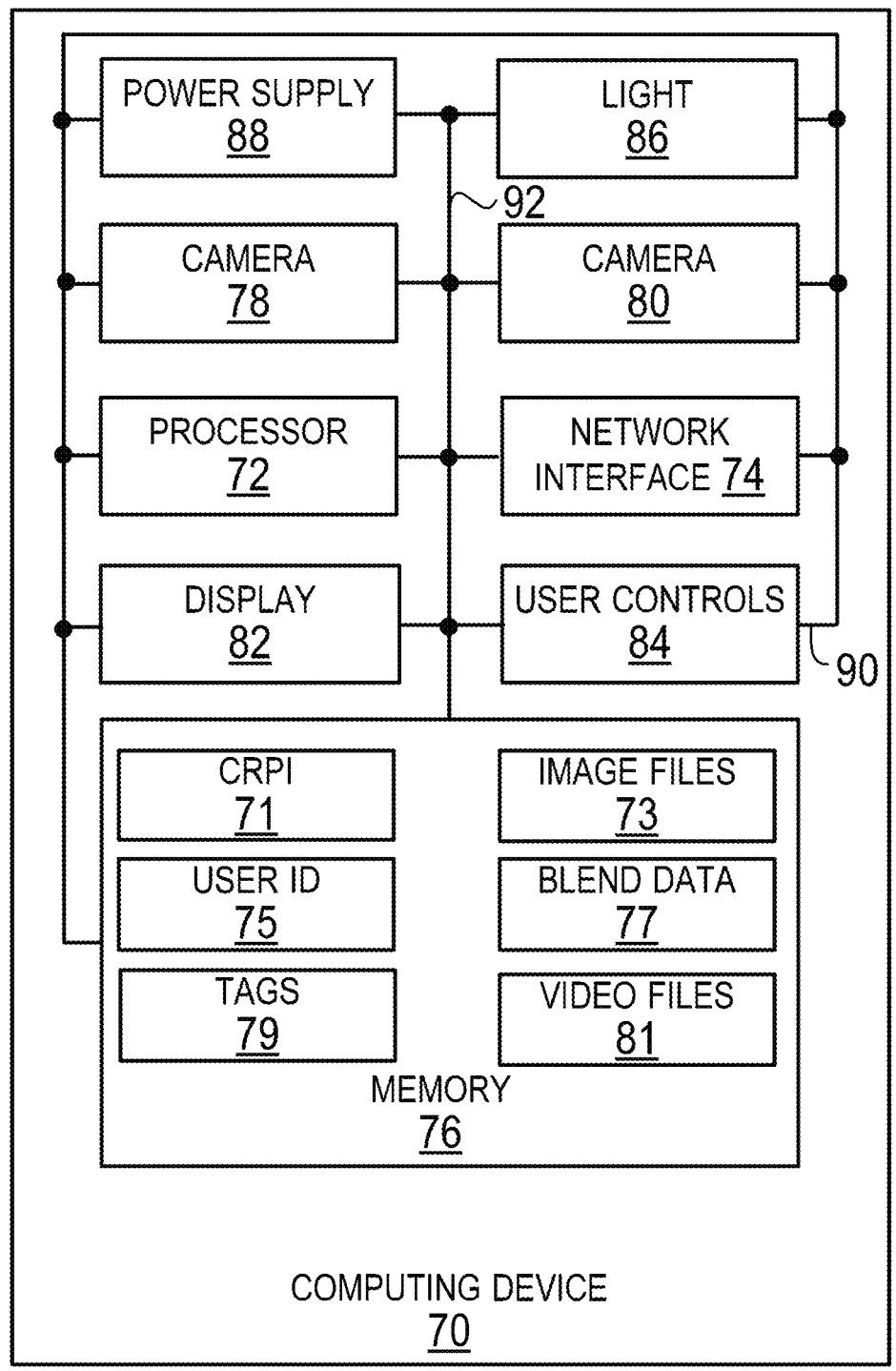
FIG. 3 is a block diagram of a computing device including two cameras in accordance with an example implementation.

Next, FIG. 3 is a block diagram of a computing device 70 according to an example implementation. FIG. 8 to FIG. 11 depict a conceptual example implementation of the computing device 70.

As shown in FIG. 3, the computing device 70 includes a processor 72, a network interface 74, a memory 76, cameras 78, 80, a display 82, user controls 84, a light 86, a power supply 88, a data bus 90, and a power bus 92.

The data bus 90 operatively connects two or more of following components of the computing device 70: the processor 72, the network interface 74, the memory 76, the cameras 78, 80, the display 82, the user controls 84, the light, and/or the power supply 88. The data bus 90 can include a serial data bus and/or a parallel data bus. As an example, the data bus 90 can include a copper foil trace of a printed circuit board, a wire, or some other electrical conductor. Moreover, the data bus 90 that operatively connects the cameras 78, 80 and the processor 72 can, but need not necessarily, includes a serial peripheral interface (SPI) bus, an inter-integrated circuit ($I^2C$) bus, a mobile industry processor interface (MIPI) bus, a universal serial bus (USB), or a digital video port (DVP) bus.

The input computing device 18 shown in FIG. 1 can be arranged like the computing device 70. The computing device 70 can operate in the operating environment 10 in place of and/or in addition to the input computing device 18.

The processor 72 can include one or more processors. The processor 72 can be programmed to perform any function or combination of functions described herein as being performed by the computing device 70 and/or the input computing device 18. Examples of a processor discussed above with respect to the processor 42 are applicable to the processor 72.

The network interface 74 operatively connects the computing device 70 to the network 14. Examples of a network interface discussed above with respect to the network interface 44 are applicable to the network interface 74. For instance, the network interface 74 can be arranged to transmit and receive radio signals according to an IEEE 802.11 standard. For convenience, a network transceiver that arranged to transmit and receive radio signals according to an IEEE 802.11 standard is sometimes referred to herein as a "WI-FI® transceiver."

The memory 76 includes a single memory or multiple memories. Two or more of the multiple memories can be the same type of memory or different types of memories. The memory 76 is configured to store computer-readable data, such as the example content of the memory 76 discussed below. Examples of a memory discussed above with respect to the memory 46 are applicable to the memory 76. Moreover, in some example implementations, the memory 76 can include a memory card, such as micro SD memory card, removably inserted into a memory card slot protected by the protective cover 424 show in FIG. 9 and/or a non-transitory memory card fixedly or removably attached to the substrate supported by the housing shown in FIG. 8.

In an example implementation, the camera 78 includes a visible light camera and the camera 80 includes a thermal camera. A thermal camera can be referred to as a "thermal imager." In this implementation, the visible light camera can include a visible sensor array to capture visible light radiation and output a visible light image, and the thermal camera can include a thermal sensor array to capture infrared radiation and output a thermal image. The thermal sensor array can output radiometry to provide a thermal image with measurements.

In an example implementation, the camera 78 is a visible light camera configured to generate visible light images having a first resolution (e.g., a first number of pixels) and the camera 80 is a thermal camera configured to generate thermal images having a second resolution, different than the first resolution. For instance, the resolution of the camera 78 can be 307,200 pixels (e.g., 640 pixels wide by 480 pixels high)(i.e., 640×480) and the resolution of the camera 80 can be 4,800 pixels (e.g., 80 pixels wide by 60 pixels high)(i.e., 80×60).

The visible light camera can include a sensor array to detect intensities and wavelengths (e.g., 380 nanometers (nm) to 750 nm) of visible light radiation that is visible to a human eye. The visible sensor array of the visible light camera can include a charge-coupled device (CCD) image sensor array, a complementary metal oxide semi-conductor (CMOS) imager sensor array, and/or one or more other optical elements that is/are known in the art.

The thermal camera can include a sensor array to detect intensities and wavelengths of infrared radiation (e.g., 750 nm to 1 millimeter (mm)). As an example, the thermal camera can include a bolometer sensor array (e.g., an uncooled micro-bolometer) or a thermopile infrared sensor array.

The display 82 includes a display for displaying images captured by the camera 78, 80 and/or menus that can be navigated using the user controls 84. The display 82 can have a resolution that differs from the resolutions of the camera 78, 80. In an example implementation, the resolution of the display 82 is 130,560 pixels (e.g., 480 pixels wide by 272 pixels high)(i.e., 480×272), and a screen of the display 82 has a diagonal length of 109 mm (4.3 inches).

The display 82 can include a capacitive touch screen display, a resistive touch screen display, a plasma display, a light emitting diode (LED) display, a cathode ray tube display, an organic light-emitting diode (OLED) display, and/or a liquid crystal display (LCD). Any OLED display discussed in this description can include an active-matrix OLED or a passive-matrix OLED. Any LCD discussed in this description can include a backlit, color LCD. The display 82 can include a touch screen display with the LCD. For instance, the display 82 can include a capacitive (such as a projective capacitive) touch screen display or a resistive touch screen display. Other examples of the display 82 are available. Examples of the display 82 displaying images or examples of images displayable on the display 82 are shown in FIGS. 6, 8, 16-19.

The user controls 84 include controls, such as one or more control buttons (or more simply, "buttons") that can be used to control operation of the computing device 70. A control button can be referred to as a "key" or a "control key." A control button can be used to enter a selection or information into the computing device 70. Any button described in this description as being configured for entering a selection can be referred to as a selector. Any control button described in this description can include a push button, such as a press-and-hold button or a press-and-release button. Multiple keys can be arranged and/or referred to as a keypad. The keypad can include a hardware keyboard with a set of numeric keys, alpha-numeric keys, and/or alphabet keys.

As an example, a control button of the user controls 84 can be operatively connected to the processor 72. In response to use of the control button (e.g., pressing the control button and/or releasing the control button while pressed), the processor 72 can detect a change in an electrical signal input to the processor 72 to detect that the control button is being used or was used, and perform a control function related to the control button at the time the control button is being used or was used. The user controls 84 can, but need not necessarily, include a control button shown in FIG. 8 and/or a camera trigger button 422 shown in at least FIG. 9. One or more control buttons of the user controls 84 can be used to navigate a menu displayed on the display 82.

In an example implementation in which the computing device 70 includes a touch screen display, one or more control functions discussed in this disclosure as being performed to the computing device 18, 70 can be performed by touching the touch screen display while displaying an applicable touch screen display control.

The light 86 can include an LED light or another light. The light 86 can be turned on and off using a button of the user controls 84, such as the yes button 408 (shown in FIG. 8). The light can have multiple light intensity levels, such as a low, medium, and high level. As an example, the low level can be 7.0 lumens, the medium level can be 12.0 lumens, and the high level can be 22.0 levels. In an example implementation, the intensity level of the light 86 can be changed by making a selection from a menu displayed on the display 82. In another example implementation, the intensity level of the light 86 can be changed using the button of the user controls 84, such as the yes button 408.

The power supply 88 can be configured in any of a variety of configurations or combinations of the variety of configurations. As an example, the power supply 88 can include circuitry to receive AC current from an AC electrical supply (e.g., electrical circuits connected to an electrical wall outlet) and convert the AC current to a DC current for supplying to one or more of the components within the computing device 70. As another example, the power supply 88 can include an energy storage device, such as a battery, or be battery operated. As yet another example, the power supply 88 can include a solar cell or be solar operated. The power supply 88 can include the power bus 92 and/or electrical circuits operatively connected to power bus 92 in order to distribute electrical current for powering components of the computing device 70. As an example, the power bus 92 can include a copper foil trace of a printed circuit board, a wire, or some other electrical conductor. Other examples of the power supply 88 and the power bus 92 are possible.

b. Memory Content

The memory 76 stores computer-readable data. As an example, the memory 76 contains at least one of the following: CRPI 71, image files 73, a user ID 75, blend data 77, tags 79, and/or video files 81. The user ID 75 can include an identifier of the computing device 70, such as "CD70," an identifier of a repair shop, such as a repair shop that owns the computing device 70 (e.g., "Embedded Creek Auto"), and/or an identifier of a user using the computing device, such as the identifier "Tech ID 555." The user ID 75 can be included with a communication the network interface 74 transmits to the server 40 along with image file(s) from the images files 73 and/or blend data associated with the image(s).

The image files 73 can include image files including images captured by the camera(s) 78, 80 and/or based on images capture by those cameras. As an example, the image files 73 can include the images files 300, 302, 304, 306, 308. In some implementations, the images files 73 can include files formatted in the BMP file format and stored as image files with the ".BMP" extension. For convenience, those files can be referred to as bitmap image files. In some implementations, the image files 73 can include converted image files based on the bitmap images. For instance, the converted image files can include files formatted according the JPEG file format and stored as image files with a ".JPG" extension.

The blend data 77 includes data for blending two image files to generate a blended image and/or data indicating blend settings used generate a blended image. The blend data 77 can, but need not necessarily include, the example blend data discussed above with respect to the blend data 53.

The tags 79 can include metadata regarding images captured by the cameras 78, 80. The tags 79 can be stored as files with an XML extension or some other file extension. FIG. 7 shows three tables of example tag files. FIG. 27 shows examples of tag files.

The video files 81 can include video files including videos captured by the camera(s) 78, 80. The video files 81 can be stored as a container file, such as a container file having an extension of "AVI," "OGG," "MKV," "MPG," "MOV," or some other container file extension. A container file in the video files 81 can include video content generated by a video CODEC. In some implementations, the computing device 70 can include a microphone for generating signals to be processed by an audio CODEC for generating audio content to be stored a container file with the video content. A video file in the video files 81 can be formatted and compressed.

As an example, the video file can be formatted and compressed according to a YV12 formatting and compression technique known to those skilled in the art.

In general, the CRPI 71 include program instructions executable by the processor 42 to perform functions described in this description as being performed by the computing device 70 and/or the input computing device 18. For example, the CRPI 71 can include program instructions to perform one or more or all of the functions of the set of functions 900 shown in FIG. 28. Examples of some particular program instructions of the CRPI 71 are described in the following fourteen paragraphs. Any one or more of the functions described in those paragraphs can be performed alone, in combination with another function described in those paragraphs, and/or in combination with the set 900.

The CRPI 71 can include program instructions to cause the processor 72 to enter a first operating mode in response to the computing device 70 powering on from the off state (which can occur in response to use of a power button 402 (shown in FIG. 8) while the computing device is powered off). For convenience, the first operating mode can be referred to as a "live mode." Entering the live mode can include cause the display 82 to transition from displaying an introductory screen to displaying an output image based on an input image generated by the camera 78 and/or an input image generated by the camera 80.

The CRPI 71 can include program instructions to cause the processor 72 to generate an image file and to store the image file in the memory 76. As an example, the processor 72 can generate the image file 300 including data that represents the image 310. An image generated by a camera can be referred to as an "input image" and an input imaged processed by the processor 72 for displaying on the display 82 can be referred to as an "output image." The image 310 can be an input image or an output image. The image file 300 can include an input image and/or an output image.

The CRPI 71 can include program instructions to cause the processor 72 to display images on the display 82. For implementations in which the display 82 and the cameras 78, 80 have different resolutions such as the example resolutions discussed above, the CRPI 71 can include program instructions to scale images generated by the cameras 78, 80 and/or cut out pixels (e.g., crop the image) to match the resolution of the display 82 or a resolution of a portion of the display 82 at which the image is to be displayed. As an example, the processor 72 can perform a bilinear upscaling algorithm to a thermal image generated by the camera 80. For instance, the processor 72 can upscale a thermal image by a factor of three, four, five or six. The upscaling factor depends on a size of the image to be displayed on the display 82. The size of the image can depend on a zoom setting of the display 82 and/or on whether a split screen or picture-in-picture mode is currently selected. As another example, processor 72 can downscale and/or crop a visible light image generated by the camera 78 so that the visible light image has the same resolution as the thermal image and the display 82.

The CRPI 71 can include program instructions to determine temperature measurements based on outputs of a sensor of the camera 89 and display the temperature measurements on the display 82 while the computing device 70 is operating in the live mode. A temperature measurement shown on the display 82 when an image is captured can be part of the captured image as well as a blended image generated from one or more images that show a temperature.

The CRPI 71 can include program instructions to turn the network transceiver 74 to the on state from the off state, and from the off state to the on state. The program instructions can of the CRPI 71 can be executed to determine (i) the computing device 70 is associated with an account at the server 12, (ii) the computing device 70 is storing an image file, captured by the computing device 70, that has not yet been uploaded to the server 12, (iii) determine the network transceiver 74 is operating in the on state, and (iv) transmit a communication to the server 12 including the image file. That communication or another communication transmitted by the network transceiver 74 to the server 12, 40 can include a tag file containing tag(s) associated with the image file. The image file transmitted via the communication can include a thermal image file, a visible light image file, and/or a blended image file.

The CRPI 71 can include program instructions to cause the processor 72 to receive a selection of a button of the user control 84 or a selection via the touch screen of the display 82 to indicate the image 310 shows a VIN plate 312 and/or a VIN 314, and to receive a selection of a camera trigger button 422 to capture the image 310. The selection of the button for these instructions can occur prior to, during, or after receiving the selection of the camera trigger button 422. The processor 72 can execute the CRPI 71 to generate the image file 300 including the image 310.

The CRPI 71 can include program instructions to cause the processor 72 to perform optical character recognition (OCR) on the image 310 to determine the VIN 314 shown on the VIN plate 312. The processor 72 can add a tag to the tag file 360 to indicate at least a portion of the VIN 314. Adding that tag to the tag file 360 can occur automatically once the processor 72 determines the VIN.

The CRPI 71 can include program instructions to cause the processor 72 to automatically add the VIN detected by OCR of the image 310 to tag files associated with subsequently captured images or a blended image based on those captured images. As an example, the processor 72 can automatically add the VIN to the tag files 364, 366, 368 associated with the images files 304, 306, 308, respectively. Moreover, the processor 72 can execute those program instructions to decode the VIN determined by OCR to determine a YMM, YMME, YMMES, or YMMS, for example, and encode that information into the tag files 364, 366, 368 instead or in addition to the VIN. The program instructions to automatically encode vehicle identification information for a particular vehicle into tag files can continue for images files generated based on multiple instances of using the camera trigger button 422 until, for example, the processor 72 determines a different vehicle identifier, the user controls 84 are used to clear the particular vehicle for use in automatically adding a vehicle identifier tag to image files, and/or the computing device 70 is powered off and/or powered off and then powered back on. The program instructions can automatically add tags with vehicle identifier information to a tag file associated with a video file.

The CRPI 71 can include program instructions to cause the processor 72 to receive a selection of a button of the user control 84 or a selection via the touch screen of the display 82 to indicate the image 316 shows the license plate 318, and to receive a selection of a camera trigger button 422 to capture the image 316. The selection of the button for these instructions can occur prior to, during, or after receiving the selection of the camera trigger button 422. The processor 72 can execute the CRPI 71 to generate the image file 302 including the image 316.

The CRPI 71 can include program instructions to cause the processor 72 to perform OCR on the image 316 to determine the license plate number 320 shown on the license plate 318. The processor 72 can add a tag to the tag file 362 to indicate at least a portion of the license plate number 320 and/or other information determined to be on the license plate 318. Adding that tag to the tag file 362 can occur automatically once the processor 72 determines the license plate number 320 and/or the other license plate information.

The CRPI 71 can include program instructions to cause the processor 72 to automatically add the license plate number 320 and/or the other license plate information detected by OCR of the image 316 to tag files associated with subsequently captured images or a blended image based on those captured images. As an example, the processor 72 can automatically add the license plate number 320 and/or the other license plate information to the tag files 364, 366, 368 associated with the images files 304, 306, 308, respectively. The program instructions to automatically encode the license plate number 320 and/or the other license plate information for a particular vehicle into tag files can continue for images files generated based on multiple instances of using the camera trigger button 422 until, for example, (i) the processor 72 determines a different license plate, (ii) the processor 72 determines different license plate information, (iii) the user controls 84 are used to clear a vehicle to which the license plate is attached, and/or (iv) the computing device 70 is powered off and/or powered off and then powered back on. The program instructions can automatically add tags with the license plate number 320 and/or the other license plate information to a tag file associated with a video file.

The CRPI 71 can include program instructions to cause the processor 72 to select an opacity setting of the camera 80. As an example, the user controls 84 can include a control button selectable to change from a first opacity setting to a second opacity setting.

The CRPI 71 can include program instructions to cause the processor 72 to generate a blended image by blending a visible light image and a thermal image.

The CRPI 71 can include program instructions to convert an image file from a first file format, such as the BMP file format, to an image file in a second file format, such as the JPEG file format. The CRPI 71 can include program instructions to execute the foregoing instructions to convert an image file in order to generate image files to be transmitted to the server 12. The image files in the first file format and/or the image files in the second file format can, but need not necessarily, be automatically deleted after transmission of the image files to the server 12. For instance, after transmitting the image files in the second file formation to the server 12, the processor 72 can delete the image files in the second file format while continuing to save the image files in the first file format for subsequent viewing on the display 82 or otherwise.

2. Computing Device with Vehicle Interface a. Computing Device Components

Figure 4:
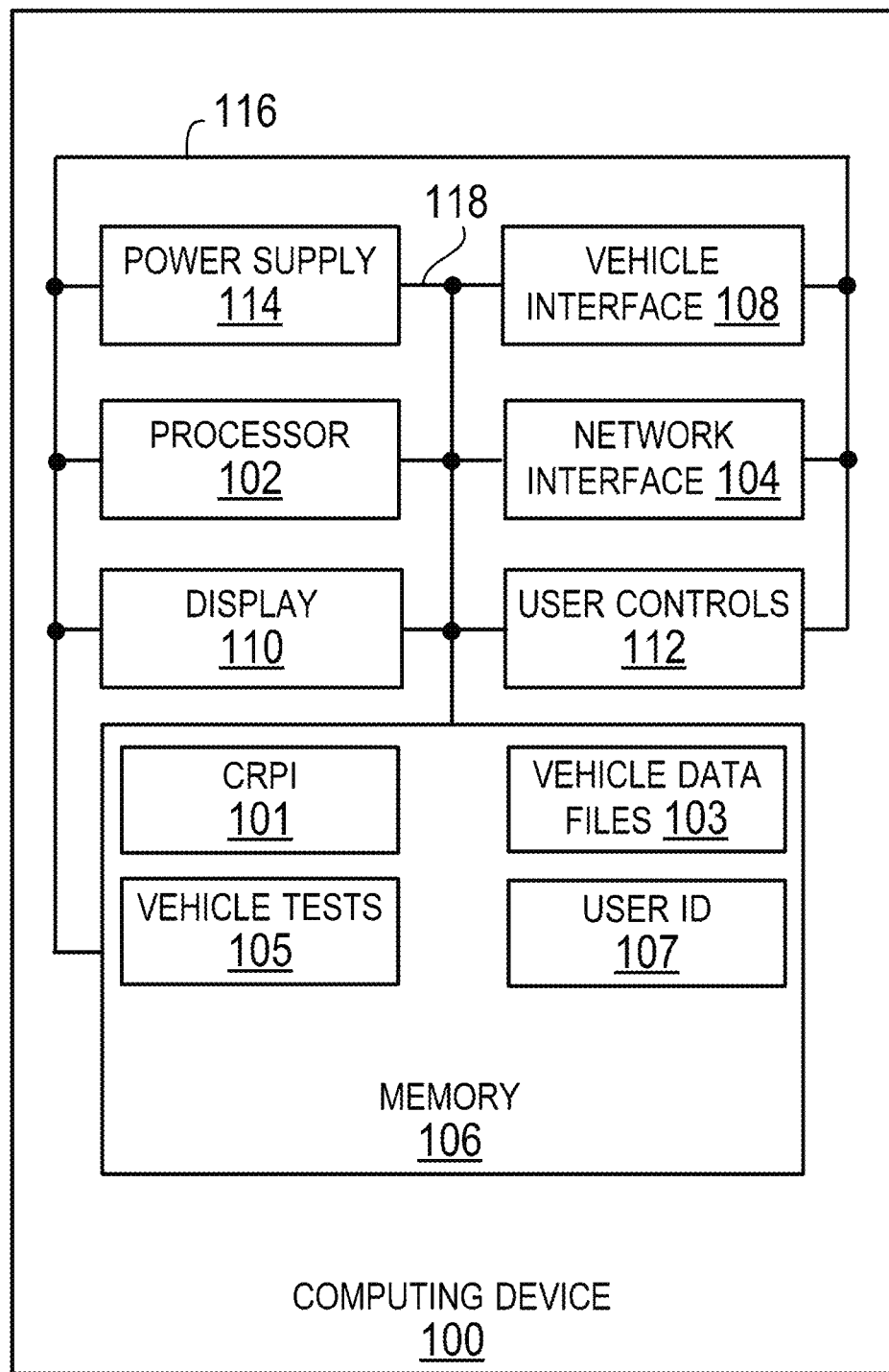
FIG. 4 is a block diagram of a computing device including a vehicle interface in accordance with an example implementation.

Next, FIG. 4 is a block diagram of a computing device 100 according an example implementation. As shown in FIG. 4, the computing device 100 includes a processor 102, a network interface 104, a memory 106, a vehicle interface 108, a display 110, user controls 112, a power supply 114, a data bus 116, and a power bus 118. A computing device with a vehicle interface, such as the computing device 100, can be referred to as a "vehicle scanner" and/or a "vehicle scan tool."

The data bus 116 operatively connects two or more of following components of the computing device 100: the processor 102, the network interface 104, the memory 106, the vehicle interface 108, the display 110, the user controls 112, and/or the power supply 114. The data bus 116 can include a serial data bus and/or a parallel data bus. As an example, the data bus 116 can include a copper foil trace of a printed circuit board, a wire, or some other electrical conductor.

The input computing device 20 shown in FIG. 1 can be arranged like the computing device 100. The computing device 100 can operate in the operating environment 10 in place of and/or in addition to the input computing device 20.

The processor 102 can include one or more processors. The processor 102 can be programmed to perform any function or combination of functions described herein as being performed by the computing device 100 and/or the input computing device 20. Examples of a processor discussed above with respect to the processor 42 are applicable to the processor 102.

The network interface 104 operatively connects the computing device 100 to the network 14. Examples of a network interface discussed above with respect to the network interface 44 are applicable to the network interface 104.

The memory 106 includes a single memory or multiple memories. Two or more of the multiple memories can be the same type of memory or different types of memories. The memory 106 is configured to store computer-readable data, such as the example content of the memory 106 discussed below. Examples of a memory discussed above with respect to the memory 46 are applicable to the memory 106.

The vehicle interface 108 is configured to transmit a communication to the vehicle 28 via the communication link 30 and to receive a communication transmitted over the communication link 30 from the vehicle 28. Each of those communications can be referred to as a vehicle data message. The communication link 30 can include multiple communication links, each of those communication links being configured for carrying a communication according to a different VDM protocol. A single communication link can include one or more electrical circuits. In an example implementation, the processor 102 can include the vehicle interface 108. In another implementation, the processor 102 does not include the vehicle interface 108. In that latter implementation, the vehicle interface 108 can include one or more semiconductor chips remote from the processor 102.

The vehicle interface 108 can include a transceiver (e.g., an integrated transmitter and receiver, or a distinct transmitter and a distinct receiver). A VDM transmitted by a transceiver of the vehicle interface 108 to the vehicle 28 via the communication link 30 can include a request for diagnostic information (such as a DTC) from the ECU 34. In response to that VDM, the receiver of the vehicle interface 108 can receive a VDM transmitted by the vehicle 28 over the communication link 30. That VDM can include diagnostic information transmitted by the ECU 34. A VDM can include a component identifier, such as an identifier of the ECU 34 that transmits the VDM. The VDM can include data indicative of a DTC set by the ECU 34. The processor 102 can select data from within a VDM and cause the selected data to be displayed by the display 110.

Figure 14:
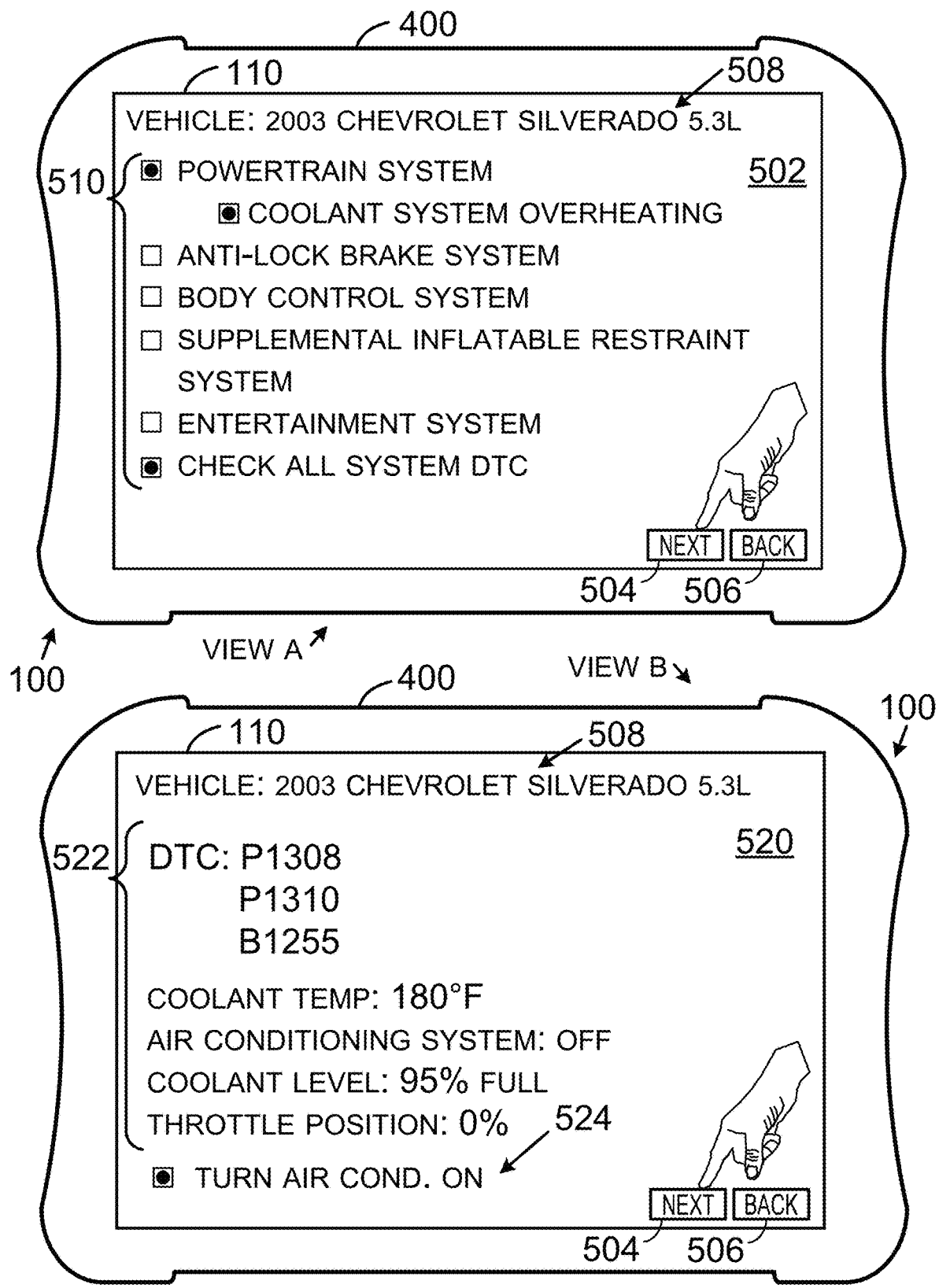
FIG. 14 and FIG. 15 are conceptual illustrations of a computing device in accordance with an example implementation.
Figure 15:
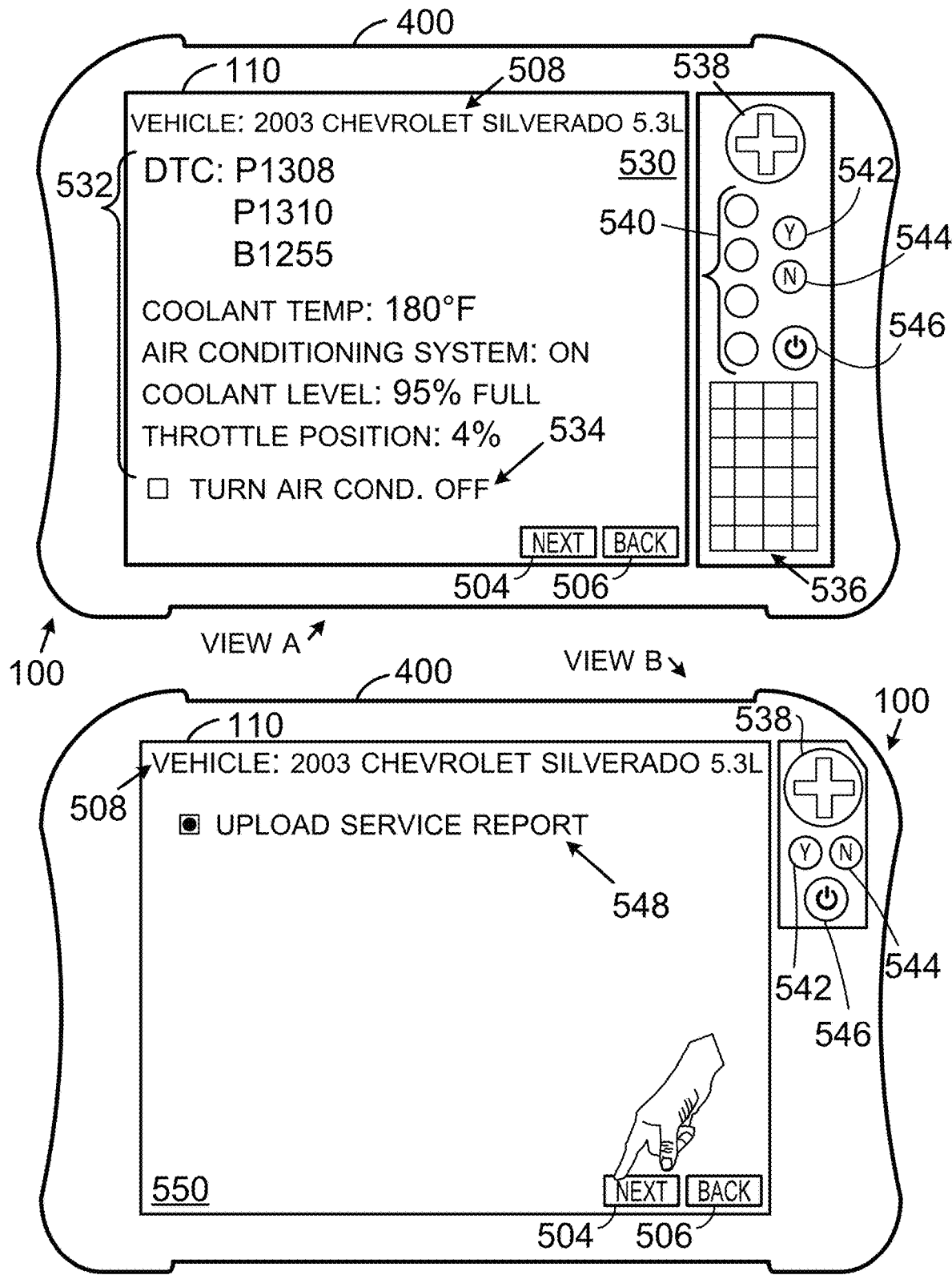

The display 110 includes a display for displaying content of a communication transmitted by the vehicle interface 108, content of a communication received by the vehicle interface 108, and/or a menu that can be navigated using the user controls 112. The display 110 can include a capacitive touch screen display, a resistive touch screen display, a plasma display, an LED display, a cathode ray tube display, an OLED display, and/or an LCD. The display 110 can include a touch screen display with the LCD. For instance, the display 110 can include a capacitive (such as a projective capacitive) touch screen display or a resistive touch screen display. Other examples of the display 110 are possible. Examples of the display 110 displaying images are shown in FIG. 14 and FIG. 15.

The user controls 112 include controls, such as one or more control buttons (or more simply, "buttons") that can be used to control operation of the computing device 100. A control button can be used to enter a selection or information into the computing device 100. Any control button described in this description can, but need not necessarily, include a push button, such as a press-and-hold button or a press-and-release button. A button, such as a push button, can be referred to as a "key." Multiple keys can be arranged and/or referred to as a keypad. A keypad can include a hardware keyboard with a set of numeric keys, alpha-numeric keys, and/or alphabet keys.

As an example, a control button of the user controls 112 can be operatively connected to the processor 102. In response to use of the control button (e.g., pressing the control button and/or releasing the control button while pressed), the processor 102 can detect a change in an electrical signal input to the processor 102 to detect that the control button is being used or was used, and perform a control function related to the control button at the time the control button is being used or was used. The user controls 112 can, but need not necessarily, include one or more of the user controls shown in FIG. 15. One or more control buttons of the user controls 112 can be used to navigate a menu displayed on the display 110.

In an example implementation in which the computing device 100 includes a touch screen display, one or more control functions discussed in this disclosure as being performed to the computing device 20, 100 can be performed by touching the touch screen display while displaying an applicable touch screen display control.

The power supply 114 can be configured in any of a variety of configurations or combinations of the variety of configurations. As an example, the power supply 114 can include circuitry to receive AC current from an AC electrical supply (e.g., electrical circuits connected to an electrical wall outlet) and convert the AC current to a DC current for supplying to one or more of the components within the computing device 100. As another example, the power supply 114 can include an energy storage device, such as a battery, or be battery operated. As yet another example, the power supply 114 can include a solar cell or be solar operated. The power supply 114 can include the power bus 118 and/or electrical circuits operatively connected to power bus 118 in order to distribute electrical current for powering components of the computing device 100. As an example, the power bus 118 can include a copper foil trace of a printed circuit board, a wire, or some other electrical conductor. Other examples of the power supply 114 and the power bus 118 are possible.

b. Memory Content

The memory 106 stores computer-readable data. As an example, the memory 106 contains at least one of the following: CRPI 101, vehicle data files 103, vehicle tests 105, and/or user ID 107.

The user ID 107 can include an identifier of the computing device 100, such as "CD100," an identifier of a repair shop, such as a repair shop that owns the computing device 100 (e.g., "Embedded Creek Auto"), and/or an identifier of a user using the computing device, such as the identifier "Tech ID 555." The user ID 107 can be included with a communication the network interface 108 transmits to the server 40 along with a vehicle data file from the vehicle data files 103.

The vehicle data files 103 can include a vehicle data file that includes data showing VDM transmitted to the vehicle 28 via the vehicle interface 108 and VDM received from the vehicle 28 at the vehicle interface 108. Furthermore, the vehicle data file can include a vehicle identifier, such as a VIN of the vehicle 28, and the user ID 107.

Turning to FIG. 13, this figure shows tables 380, 381. Table 380 shows example VDM data that can be included in a vehicle data file 103. Table 381 shows a VDM number corresponding to a VDM in a corresponding row of the Table 380. A vehicle data file 103 may not include a VDM number. As shown in FIG. 13, however, the VDM data does include a date and time a VDM was transmitted or received, a destination identifier for the VDM, a source identifier of the VDM, a PID, and a PID data value. The destination ID, the source ID, the PID, and the PID data value shown in the table 380 are hexadecimal values. In this description, the hexadecimal values are preceded by the symbol "$."

As an example, the source and destination ID $10 could identify a powertrain control system ECU in the vehicle 28, the source and destination ID $20 could identify an anti-lock brake system ECU in the vehicle 28, the source and destination ID $30 could identify an body control system ECU in the vehicle 28, the source and destination ID $20 could identify a supplemental inflatable restraint system ECU in the vehicle 28, the source and destination ID $50 could identify an audio system ECU in the vehicle 28, and the source and destination ID $F1 could identify the computing device 20, 100 removably connected to the vehicle 28.

In table 380, a VDM having an even numbered PID is a VDM with a request, and a VDM having an odd numbered PID is a VDM with a response to a VDM request. Moreover, for the example data shown in the table 380, the PID for a VDM with a response equals one plus the PID value in the VDM request to which the VDM with the response is provided.

The PID data value for VDM #2 represents two four-digit DTC for the powertrain control system ECU. The PID data value for VDM #6 represents a four-digit DTC for body control system ECU. The PID data values for VDM #4, #8, and #10 represent that no DTC are set by the ECU that sent those VDM. The PID data value for VDM #12 represents the coolant temperature detected by powertrain control system ECU is 180 degrees Fahrenheit. The PID data value for VDM #14 represents the air conditioning system in the vehicle 28 is turned off. The PID data value for VDM #16 represents a liquid cooling system in the vehicle 28 is 95% filled to capacity. The PID data value for VDM #18 represents a throttle position for the vehicle 28 is fully closed. The PID data value for VDM #20 represents a request to turn on the air condition system in the vehicle 28 completed successfully. The PID data value for VDM #22 represents the air conditioning system in the vehicle 28 is turned on. The PID data value for VDM #24 represents a throttle position for the vehicle 28 is open 4% of wide-open-throttle. Other examples of VDM are possible.

Returning to FIG. 4, the vehicle tests 105 can include communications the vehicle interface can transmit to the vehicle 28 in order to perform some test to the vehicle 28, such as a test to an ECU in the vehicle 28. The vehicle tests 105 can include vehicle tests for multiple vehicles based on different YMM, YMME, or YMMES. Moreover, the vehicle tests 105 can include functional requests that can be communicated to the vehicle 28. The functional requests can include functional requests for multiple vehicles based on different YMM, YMME, or YMMES. As an example, a functional test can include a test to activate/deactivate a component in the vehicle 28, such as an air conditioning compressor clutch, a solenoid, a horn, a window, among others. As another example, a functional request can include a request for DTC status, a request to reprogram an ECU, a request to calibrate a component in the vehicle, a request to reset a component in the vehicle, among others.

In general, the CRPI 101 include program instructions executable by the processor 102 to perform functions described in this description as being performed by the computing device 100 and/or the input computing device 20. Examples of some particular program instructions of the CRPI 101 are described in the following six paragraphs.

The CRPI 101 can include program instructions to cause the processor 102 to display on the display 110 a user interface for selecting a YMM, YMME, or YMMES to identify a particular vehicle removably connected to the vehicle interface 108.

The CRPI 101 can include program instructions to cause the processor 102 to transmit via the vehicle interface a VDM to cause the vehicle 28 to transmit a VDM including information the processor 102 can use to determine the YMM, YMME, or YMMES of the vehicle 28, and determine the YMM, YMME, or YMMES of the vehicle 28 based on the VDM the vehicle 28 transmitted to the vehicle interface 108. That VDM can include the VIN of the vehicle 28.

The CRPI 101 can include program instructions to cause the processor 102 to display on the display a menu having selections for a vehicle test and/or a functional request, determine a vehicle test and/or functional request has been selected to be performed, transmit a VDM to perform the vehicle test and/or functional request, receive a response to the vehicle test and/or functional request from the vehicle 28, and display the response on the display 110.

The CRPI 101 can include program instructions to cause the processor 102 to display on the display 110 any portion of the example content shown in FIG. 14 and/or FIG. 15.

The CRPI 101 can include program instructions to cause the processor 102 to transmit via the network interface a vehicle data file including VDM the vehicle interface 108 transmitted to the vehicle 28 and VDM the vehicle interface 108 received from the vehicle 28 in response to the VDM transmitted by the vehicle interface 108. The processor 102 can automatically transmit the vehicle data file in response to determining generation of the vehicle data file is complete.

The CRPI 101 can include program instructions to cause the processor 102 to include the user ID 107 and/or the VIN, the YMM, YMME, or YMMES in a vehicle data file including the VDM transmitted by and to the vehicle interface for the vehicle 28.

3. Computing Device (Output Computing Device)

a. Computing Device Components

Next, FIG. 5 is a block diagram of a computing device 130 according an example implementation. As shown in FIG. 5, the computing device 130 includes a processor 132, a network interface 134, a memory 136, a display 138, user controls 140, a power supply 142, a data bus 144, and a power bus 146.

The data bus 144 operatively connects two or more of following components of the computing device 130: the processor 132, the network interface 134, the memory 136, the display 138, the user controls 140, and/or the power supply 142. The data bus 144 can include a serial data bus and/or a parallel data bus. As an example, the data bus 144 can include a copper foil trace of a printed circuit board, a wire, or some other electrical conductor.

The output computing device 22, 24 and the input-output computing device 26 shown in FIG. 1 can be arranged like the computing device 130. The computing device 130 can operate in the operating environment 10 in place of and/or in addition to the output computing device 22, 24 and the input-output computing device 26.

The processor 132 can include one or more processors. The processor 132 can be programmed to perform any function or combination of functions described herein as being performed by the computing device 130, the output computing device 22, 24, and/or the input-output computing device 26. Examples of a processor discussed above with respect to the processor 42 are applicable to the processor 132.

The network interface 134 operatively connects the computing device 130 to the network 14. Examples of a network interface discussed above with respect to the network interface 44 are applicable to the network interface 134.

The memory 136 includes a single memory or multiple memories. Two or more of the multiple memories can be the same type of memory or different types of memories. The memory 136 is configured to store computer-readable data, such as the example content of the memory 136 discussed below. Examples of a memory discussed above with respect to the memory 46 are applicable to the memory 136.

The display 138 includes a display for displaying content of a communication transmitted by the server 12, 16, 40 and/or a menu that can be navigated using the user controls 140. The display 138 can include a capacitive touch screen display, a resistive touch screen display, a plasma display, an LED display, a cathode ray tube display, an OLED display, and/or an LCD. The display 138 can include a touch screen display with the LCD. For instance, the display 138 can include a capacitive (such as a projective capacitive) touch screen display or a resistive touch screen display. Other examples of the display 138 are possible. Examples of web pages, a report, and images, displayable by the display 138, are shown in FIG. 20 to FIG. 25.

The user controls 140 include controls, such as one or more control buttons (or more simply, "buttons" or "keys") that can be used to control operation of the computing device 130. A control button or key can be used to enter a selection or information into the computing device 130.

As an example, a control button of the user controls 140 can be operatively connected to the processor 132. In response to use of the control button (e.g., pressing the control button and/or releasing the control button while pressed), the processor 132 can detect a change in an electrical signal input to the processor 132 to detect that the control button is being used or was used, and perform a control function related to the control button at the time the control button is being used or was used. The user controls 140 can, but need not necessarily, include a control button shown in FIG. 15. One or more control buttons of the user controls 140 can be used to navigate a menu displayed on the display 138.

In an example implementation in which the computing device 130 includes a touch screen display, one or more control functions discussed in this disclosure as being performed to by computing device 22, 24, 26, 130 can be performed by touching the touch screen display while displaying an applicable touch screen display control.

The power supply 142 can be configured in any of a variety of configurations or combinations of the variety of configurations. As an example, the power supply 142 can include circuitry to receive AC current from an AC electrical supply (e.g., electrical circuits connected to an electrical wall outlet) and convert the AC current to a DC current for supplying to one or more of the components within the computing device 130. As another example, the power supply 142 can include an energy storage device, such as a battery, or be battery operated. As yet another example, the power supply 142 can include a solar cell or be solar operated. The power supply 142 can include the power bus 146 and/or electrical circuits operatively connected to power bus 146 in order to distribute electrical current for powering components of the computing device 130. As an example, the power bus 146 can include a copper foil trace of a printed circuit board, a wire, or some other electrical conductor. Other examples of the power supply 142 and the power bus 146 are possible.

b. Memory Content

The memory 136 stores computer-readable data. As an example, the memory 136 contains at least one of the following: CRPI 131, vehicle data files 133, image files 135, a service report 137, tags 139, and/or a user ID 141.

The vehicle data files 133 can include a vehicle data file generated by computing device 20, 100 based on VDM that computing device 20, 100 transmitted to and received from the vehicle 28. The vehicle data file can also include a vehicle identifier, such as a VIN, YMM, YMME, or YMMES associated with the vehicle 28. The vehicle data file can also include a user identifier associated with a user that operated the computing device 20, 100 to generate the vehicle data file and/or an identifier of the computing device 20, 100. As an example, the vehicle data file can include VDM like the VDM shown in the table 380 shown in FIG. 13. The vehicle data files 133 can include vehicle data files the server 12, 40 transmits to the computing device 130.

The image files 135 can include can include image files including images captured by the camera(s) 78, 80 and/or a blended image file base on images captured by those cameras. As an example, the image files 135 can include the images files 300, 302, 304, 306, 308. As another example, the image files 135 can include an image file representing any image shown in FIG. 16 to FIG. 19, FIG. 21, FIG. 22, and/or FIG. 24 to FIG. 26. In some implementations, the images files 135 can include files formatted in the JPEG file format and stored as image files with the ".JPG" extension. The image files 135 can include a video (e.g., a movie) having an ".AVI" extension or another applicable file extension. The computing device 130 can receive an image file and/or a video file, for storage in the image files 135, from the server 12, 40 in response to entering search criteria into a web page displayed on the display 138.

A service report 137 can include a report regarding an item under service, such as the vehicle 28. The service report 137 can be generated using an application served by the server 12, 16, 40 to the computing system 130 and/or an application operating on the computing system 130. The service report 137 can include any of the content of the service report 966 shown in FIG. 25 or FIG. 26.

The tags 139 can include metadata regarding images captured by the cameras 78, 80 and/or a blended image file base on images captured by those cameras. The tags 139 can be stored as files with an XML extension or some other file extension. FIG. 7 shows three tables of example tag files. The tags 139 can also include historical tags associated with the computing device 130. A historical tag can include any tag entered using the user controls 140 to search for an image file, a video file, a vehicle data file and/or a service report. The historical tags can be a proper subset of all historical tags of the computing device 130, such as a subset of the twenty-most recent tags used to search for data from the server 12, 40.

The image files 135 and/or the tags 139 can include blend data for blending images represented by two image files to generate a blended image and/or data indicating blend settings used generate a blended image. This blend data can, but need not necessarily include, the example blend data discussed above with respect to the blend data 53.

The user ID 141 can include an identifier of the computing device 130 and/or a user of the computing device 130. The server 40 can use the user ID 141 to authenticate a device or user attempting to access the application 45, an image file, a vehicle data file, and/or a service report.

In general, the CRPI 131 include program instructions executable by the processor 132 to perform functions described in this description as being performed by the computing device 130, the output computing device 22, 24, and/or the input-output computing device 26. For example, the CRPI 131 can include program instructions to perform one or more or all of the functions of the set of functions 920 shown in FIG. 29. Examples of some particular program instructions of the CRPI 131 are described in the following six paragraphs. Any one or more of the functions described in those paragraphs can be performed alone, in combination with another function described in those paragraphs, and/or in combination with the set 920.

The CRPI 131 can include program instructions to cause the processor 132 to display on the display 138 an interface to a server, such as a server 12, 16, 40. Displaying the interface (e.g., displaying a server interface) can include the processor 132 launching a browser application or an application container to execute an application client served by the server. The server interface can be at least a part of the application client. The CRPI 131 may cause the processor 132 to display on the display 138 a prompt for a user of the computing device 130 to enter a user identification and password associated with an account at the server and a computing device with two cameras that is configured to automatically upload an image file upload to the server.

The CRPI 131 can include program instructions to cause the processor 132 to display on the display 138 a default screen of the application. As an example, the default screen can include a "My Files" view that shows an image, such as a blended image based on a thermal image and a visible light image captured by computing device with two cameras. The image shown in the My Files view can include one or more images. Moreover, each image displayed in the "My Files view can be displayed within an image frame. The image frame can include the following: an image capture date, an image file name, an account user name of user that logged into the server, a share icon for a sharing the image shown in proximity to the image frame, a favorite icon, a download icon selectable to cause the processor 132 to request and responsively receive from the server the image file having the file represented on the My Files view, and a delete icon selectable to cause the processor 132 to transmit, to the sever, a request to delete the image file representing the image shown in the My Files view.

The CRPI 131 can include program instructions to cause the processor 132 to establish particular user controls of the user controls 140 on the display 138. The user controls 140 can include one of the following: a My Files view selector, a Search view selector, a Favorites view selector, a Profile view selector, and/or a Social Feed selector. The processor 132 can detect selection of one of those selectors and cause the display 138 to display, on the display 138, a screen and/or web page associated with the selected selector.

The CRPI 131 can include program instructions to cause the processor 132 select an image displayed on the display 138 and to responsively transition to operating in a detail mode for the selected image. In the detail operating mode, the display 138 displays selectors to select an alternate view of the selected image, such as a visible light image in which an opacity of a related thermal image is at 0%, a blended image in which an opacity of the related thermal image is 50% or 60%, and thermal image in which an opacity of the thermal image is 100%. Furthermore, the program instructions can be executed to show the blended image using any opacity setting between 0% and 100%. In the detail operating mode, the display 138 can display a selector to view a different size version of the blended image, such as a larger size version of the blended image. In the detail operating mode, the processor 132 can be used to change a name of an image file representing the display image, to change a description associated with the blended image, and/or edit or add a tag to edit or add text to the image file and/to add or edit a tag file associated with the blended image.

Figure 20:
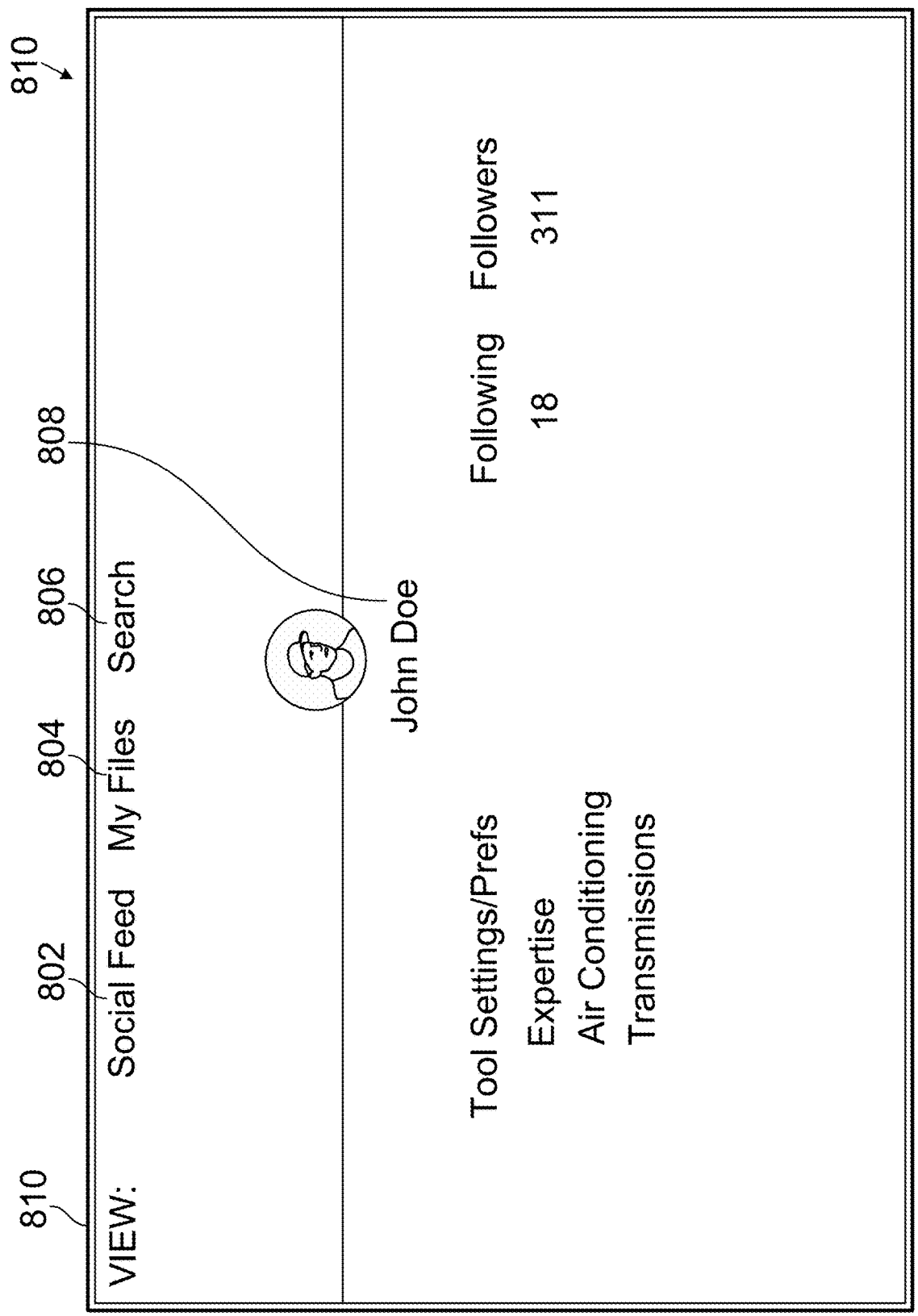
FIG. 20, FIG. 21, FIG. 22, FIG. 23, FIG. 24, FIG. 25, and FIG. 26 are screen shots of example web pages in accordance with the example implementations.

The CRPI 131 can include program instructions to cause the processor 132 to detect selection of a view selector, such as the Social Feed view selector 802, the My Files view selector 804, or the My Profile view selector 836, all of which are shown in FIG. 20, and to transition from displaying a web page associated with view selector the processor 132 detected was selected.

Figure 25:
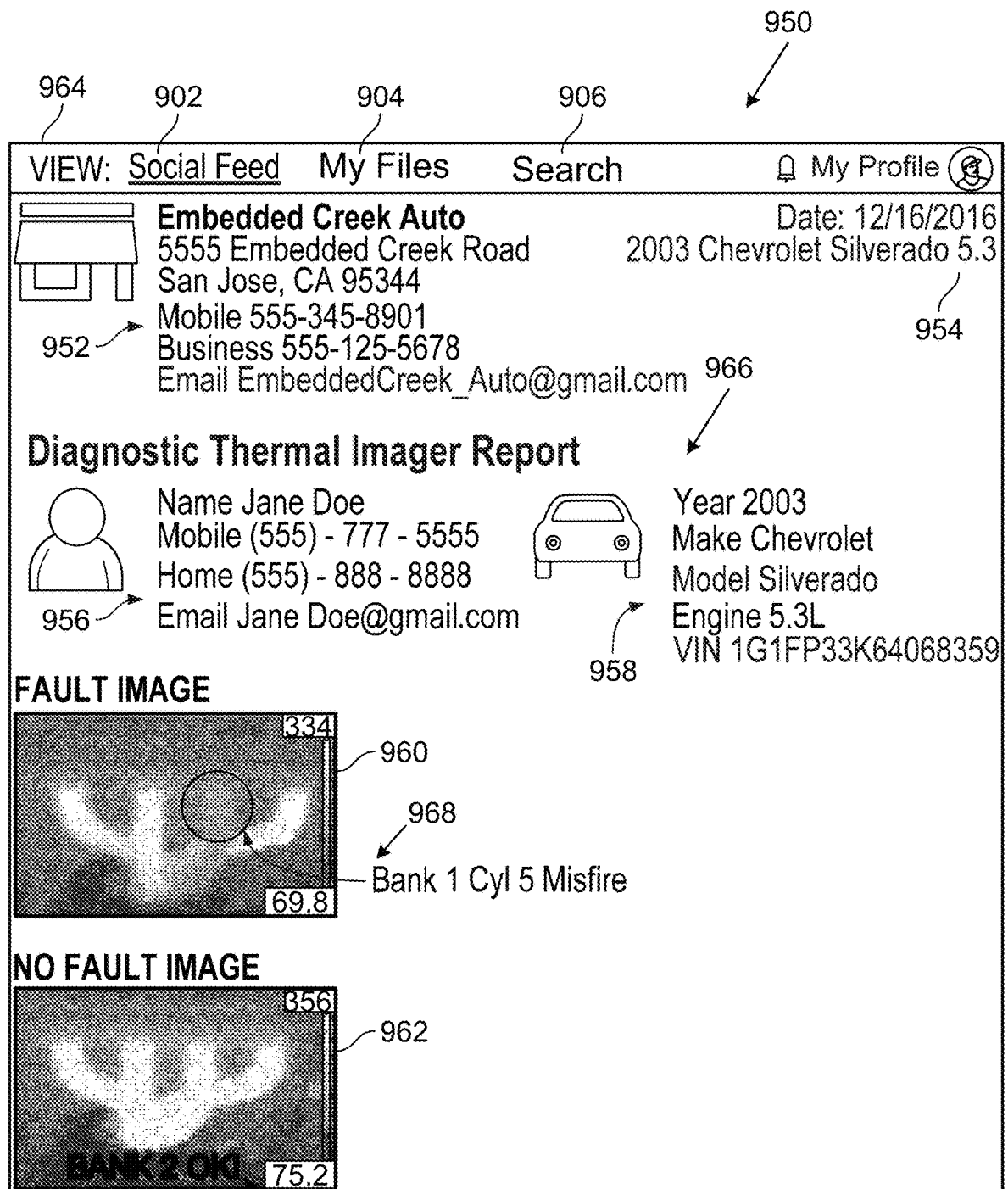

The CRPI 131 can include program instructions to cause the processor 132 to add an annotation to an image the computing device 130 receives from the server 12, 40. As an example, the processor 132 can provide a field for adding text to annotate the image. FIG. 25 shows examples of annotating a blended image using text. In FIG. 25, the annotation 968 includes adding text in proximity to a blended image displayed as part of the report 966. In contrast, the annotation 970 includes adding text "BANK 2 OK" overlaying the blended image 962. FIG. 25 also shows that a non-textual annotation can be added to an image. For instance, the annotation 968 includes a circle added to indicate a symptom of a malfunctioning vehicle and a line extending from the circle to the text of the annotation 968.

c. Example Implementations

The computing system 130 can include or be implemented as a portion of a small-form factor portable (i.e., mobile) electronic device such as a smartphone (e.g., an IPHONE® smartphone from Apple Inc. of Cupertino, Calif., or a GALAXY S® smartphone from Samsung Electronics Co., Ltd. of Maetan-Dong, Yeongtong-Gu Suwon-Si, Gyeonggi-Do, Republic of Korea), a tablet device (e.g., an IPAD® tablet device from Apple Inc., or a SAMSUNG GALAXY TAB tablet device from Samsung Electronics Co., Ltd.), or a wearable computing device (e.g., a wireless web-watch device or a personal headset device). An application for performing communication with the server 12, 14, 70 can include an application downloaded to the network interface 134 from the APP STORE® online retail store, from the GOOGLE PLAY® online retail store, or another source of an application.

The computing device 130 can include or be implemented as part of a personal computing system (including both laptop computer and non-laptop computer configurations). The computing system 130 can be configured as an embedded system in which a processor of the processor 132 includes an embedded processor and a memory of the memory 136 includes an embedded memory.

III. Example Images

Figure 6:
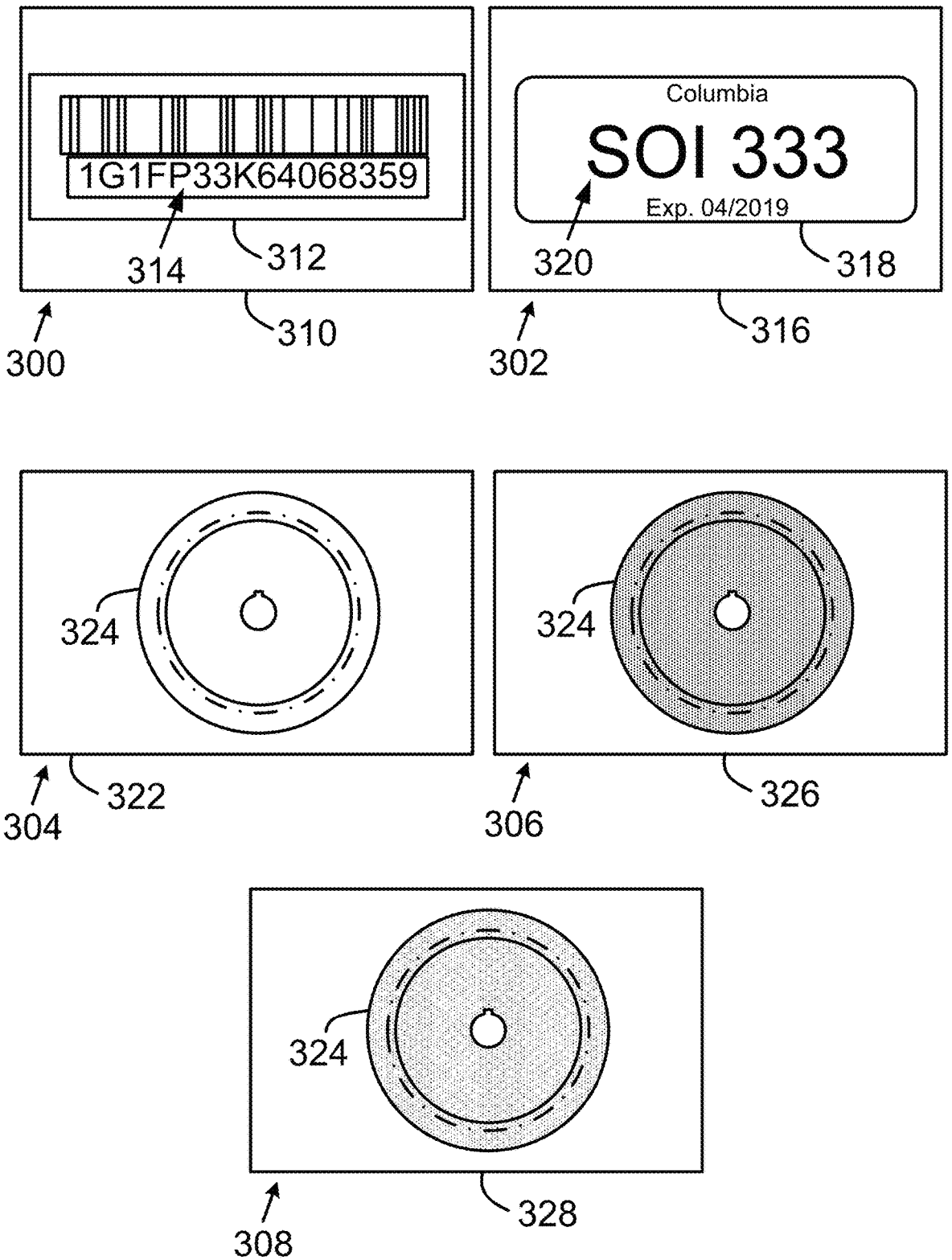
FIG. 6 shows image files and tag files in accordance with an example implementation.

Next, FIG. 6 shows image files 300, 302, 304, 306, 308. The image file 300 includes an image 310. The image 310 shows a VIN plate 312 of the vehicle 28. The VIN plate 312 shows a VIN 314 associated with the vehicle 28. The image file 302 includes an image 316. The image 316 shows a license plate 318 attached to the vehicle 28. The license plate 318 includes a license plate number 320. The image file 304 includes an image 322. The image 316 shows a gear 324 of the vehicle 28. The image file 306 includes an image 326. The image 326 shows the gear 324. The image file 308 includes an image 328. The image 328 shows the gear 324. The images 310, 316, and 322 were captured using a visible light camera, such as the camera 78. The image 326 was captured by a thermal camera, such as the camera 80. The image 328 is a blended image generated by blending the images 322, 326.

The processor 70 can store images and videos captured by cameras 78, 80 or generated by blending images or videos captured by the cameras 78, 80. The processor 70 can name the images and videos using a name to assist a computing device, such as the server 12, 40, when searching for particular types of images or videos. The filing name can indicate a media type such as IMG for image or MOV for movie/video. Following the media type, the file name can indicate an image ID number. The image ID numbers can be sequential for sequentially captured images/videos. As an example, the image ID number can be four digits. If the memory 76 can store more than 10,000 images/videos, then the image ID number can be more than four digits. Following the image ID number, the file name can indicate a view type, such as "X" to indicate a blended image view, "V" to indicate a visible light image view, or "T" to indicate a thermal image view. Following the view type indicator, the file name can include a file format, such as ".BMP," ".JPG," or ".AVI."

As an example, the image file 300 can be named "IMG0121V.BMP," the image file 302 can be named "IMG0122V.BMP," the image file 304 can be named "IMG0123V.BMP", the image file 306 can be named "IMG0123T.BMP," and the image file 308 can be named "IMG0123X.BMP." The image ID number can be the same for a visual light image and a thermal light image captured at the same time or at substantially the same time (such as within 100 milliseconds of one another). Moreover, the image ID number for a blended image can be identical to the image ID number used for the visible light image and the thermal image on which the blended image is based.

Next, FIG. 7 shows tables 350, 352, 354 showing tag files 360, 362, 364, 366, 368 associated with image files 300, 302, 304, 306, 308, respectively. In an example implementation, the tag files 360, 362, 364, 366, 368 are generated by the server 12, 40. In another example implementation, the tag files 360, 362, 364, 366, 368 are generated by computing device 70. The tag files 360, 362, 364, 366, 368 include one or more tags. The left most column in tables 350, 352, 354 indicate which image file the tag file 360, 362, 364, 366, 368 pertains to rather that a tag in the tag file 360, 362, 364, 366, 368. Alternatively, a tag file could include an identifier of an image file.

The tag "VIN" indicates the image file 300 shows at least a portion of a VIN. The tag "LP" indicates the image file 302 shows at least a portion of a license plate. The tag "VL" indicates the image file 304 represents a visible light image. The tag "TH" indicates the image file 306 represents a thermal image. The tag "BL" indicates the image file 300 represents a blended image. The tag "CD 70" indicates a device ID of the device that captured the image represented by the image file. The tags in the Tag-3 column indicate a date the images of the image files 300, 302, 304, 306, 308 were captured. The tags in the Tag-4 column indicate a time the images of the image files 300, 302, 304, 306, 308 were captured. The tag "Tech ID 555" indicates an identifier of a user using the computing device 70.

The tag "VIN 1G1FP33k64068359" indicates a VIN determined for the image file 300. The tag "LP-CB-SOI333" indicates license plate information determined for the image 302. The processor 72 could add the foregoing two tags to the tag files 360, 362 based on VIN information and license plate information entered via the user controls 84. Alternatively, the foregoing two tags could be added to the tag files 360, 362 based on VIN information and license plate information determined via OCR. In an example implementation, the processor 72 performs that OCR. In another implementation, the processor 132 performs that OCR.

The tag "2003 Chevrolet Silverado" indicates an example YMM for the vehicle 28. The processor 72 could add the foregoing tag to the tag files 364, 366, 368 based on YMM information entered via the user controls 84. Alternatively, the foregoing tag could be added to the tag files 364, 366, 368 based on YMM information a processor determines by decoding the VIN information from the image 310 represented by the image file 300. In an example implementation, the processor 72 decodes the VIN. In another implementation, the processor 132 decodes the VIN. In an alternative implementation, a tag added to the tag files 364, 366, 368 could include a YMME or YMMES of the vehicle 28.

Figure 16:
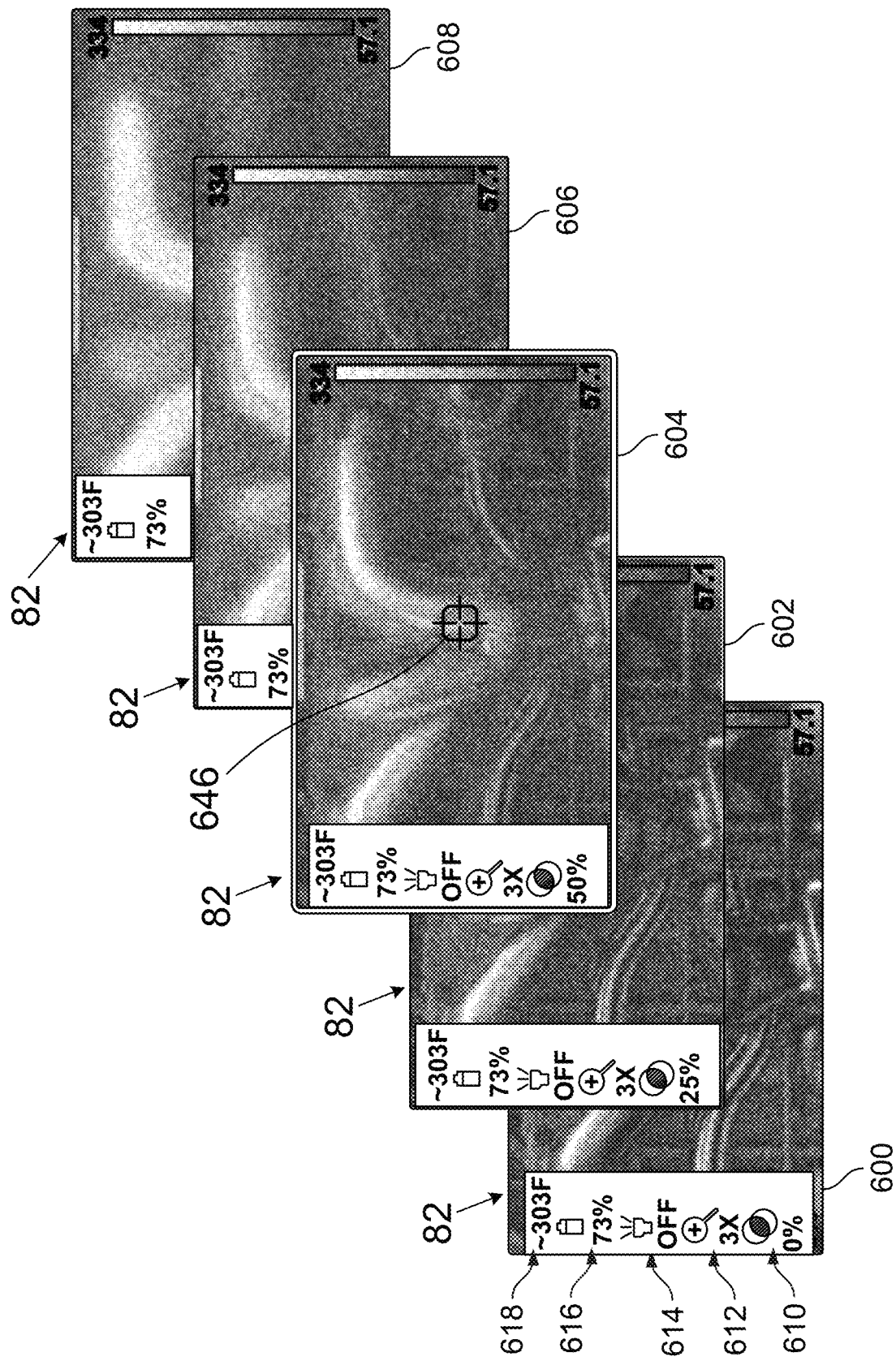
FIG. 16, FIG. 17, FIG. 18, and FIG. 19 show examples of blended images in accordance with an example implementation.

Turning to FIG. 16, this figure shows blended images 600, 602, 604, 606, 608 that are displayable by the display 82. Those blended images can be images represented by blended image files stored in the image files 73. The blended image 600 includes an opacity setting icon 610, a zoom icon 612, a light status icon 614, a battery state-of-charge icon 616, and a temperature icon 618. Similarly, the blended images 602, 604, 606, 608 can include icons like the foregoing icons. The opacity setting icon 610, the zoom icon 612, the light status icon 614, the battery state-of-charge icon 616, and the temperature icon 618 can include icons the processor 72 overlays upon a blended image displayed on the display 82.

For the blended image 600, the opacity setting icon 610 indicates 0% to represent the blended image 600 is based on 100% of a visible light image and 0% of a related thermal image. For the blended image 602, an opacity setting icon indicates 25% to represent the blended image 602 is based on 75% of a visible light image and 25% of a related thermal image. For the blended image 604, an opacity setting icon indicates 50% to represent the blended image 604 is based on 50% of a visible light image and 50% of a related thermal image. For the blended image 606, an opacity setting icon (not shown) could indicates 75% to represent the blended image 606 is based on 25% of a visible light image and 75% of a related thermal image. For the blended image 608, an opacity setting icon (not shown) could indicate 100% to represent the blended image 608 is based on 0% of a visible light image and 100% of a related thermal image. Alternatively, for an opacity value other than 0%, the opacity value can represent a percentage of the intensity detected for each pixel of the thermal image with the intensity detected for each pixel of the visible light image at 100% or another fixed percentage.

The zoom icon 612 can be switched to match the zoom setting (such as 1×, 2×, or 3×) of the cameras 78, 80. The light status icon 614 can be switched to indicate whether the light 86 is on or off. The battery state-of-charge icon 616 can be switched to indicate an integer percentage closest to a percentage value of state-of-charge of a battery of the power supply 88 with respect to when that battery is fully charged. The temperature icon 618 can indicate a temperature detected at a portion of an image subject shown at and/or within a target shown in a blended image. Moreover, the display 82 can display a target 646 in the blended image 604 to indicate a location of an object shown in the blended image whose temperature is indicated by the temperature icon 618. Likewise, the blended images 600, 602, 606, 608 can also include a target (not shown) to indicate a location of an object shown in the blended image whose temperature is indicated by the temperature icon 618.

Figure 17:
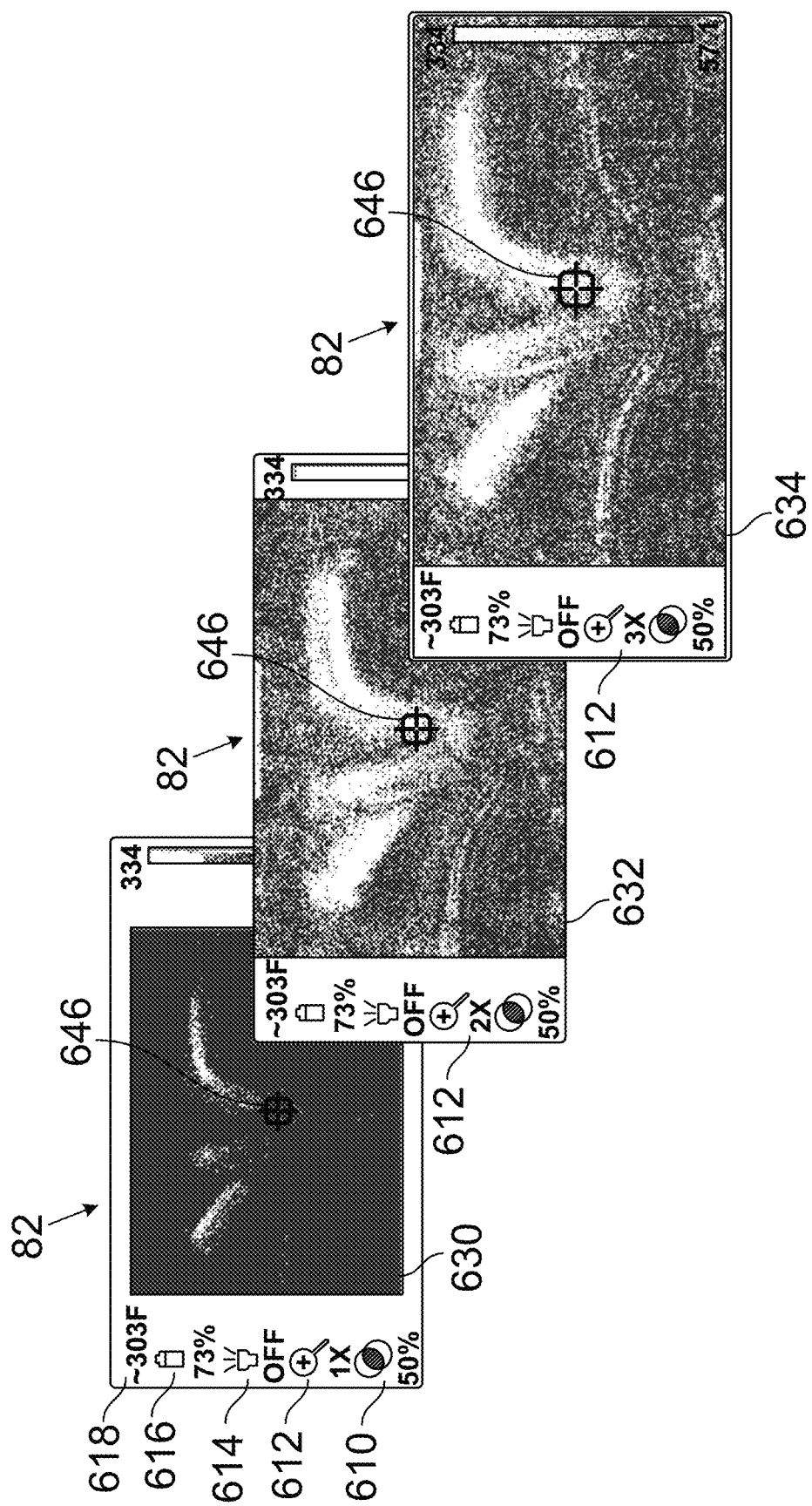

Next, FIG. 17 shows the display 82 displaying a blended image 630 at a 1× zoom setting, a blended image 632 at a 2× zoom setting, and a blended image at a 3× zoom setting. The processor 72 can switch from displaying blended images at different zoom settings by detecting a button of the user controls 84 being pressed. Table 1 shows an example configuration of using a first button of the user controls 84 (such as the left button 410) and a second button of the user controls 84 (such as the right button 414) to switch through multiple zoom settings as well as a picture-in-picture mode shown in FIG. 18 and a split screen mode shown in FIG. 19. In an alternative implementation, the use of the first and second buttons while the computing device 70 is operating in the live mode can include switching through fewer or more zoom settings, switching through zoom modes without the split screen and/or picture-in-picture mode(s), and/or switching through the view modes in a different order.

TABLE 1

| Current View | User Control | Resulting View | Current View | User Control | Resulting View |
|---|---|---|---|---|---|
| 1X Zoom | 1st button | Split Screen | 1X Zoom | 2nd button | 2X Zoom |
| Split Screen | 1st button | P-I-P | 2X Zoom | 2nd button | 3X Zoom |
| P-I-P | 1st button | 3X Zoom | 3X Zoom | 2nd button | P-I-P |
| 3X Zoom | 1st button | 2X Zoom | P-I-P | 2nd button | Split Screen |
| 2X Zoom | 1st button | 1X Zoom | Split Screen | 2nd button | 1X Zoom |

As shown in left-most image in FIG. 17, the display 82 can display the opacity setting icon 610, the zoom icon 612, the light status icon 614, the battery state-of-charge icon 616, and the temperature icon 618 while displaying the blended image 630. FIG. 17 shows that the display 82 displays those same icons on the blended images 632, 634, however, the zoom icon 612 is shown as 2× for the blended image 632 and 3× for the blended image 634. The processor 72 can display the foregoing icons overlaid upon a blended image, such as the blended image 634 such that the blended image can be seen behind portions of the icons. Moreover, the display 82 can display a target 646 to indicate a location of an object shown in the blended image whose temperature is indicated by the temperature icon 618.

Figure 18:
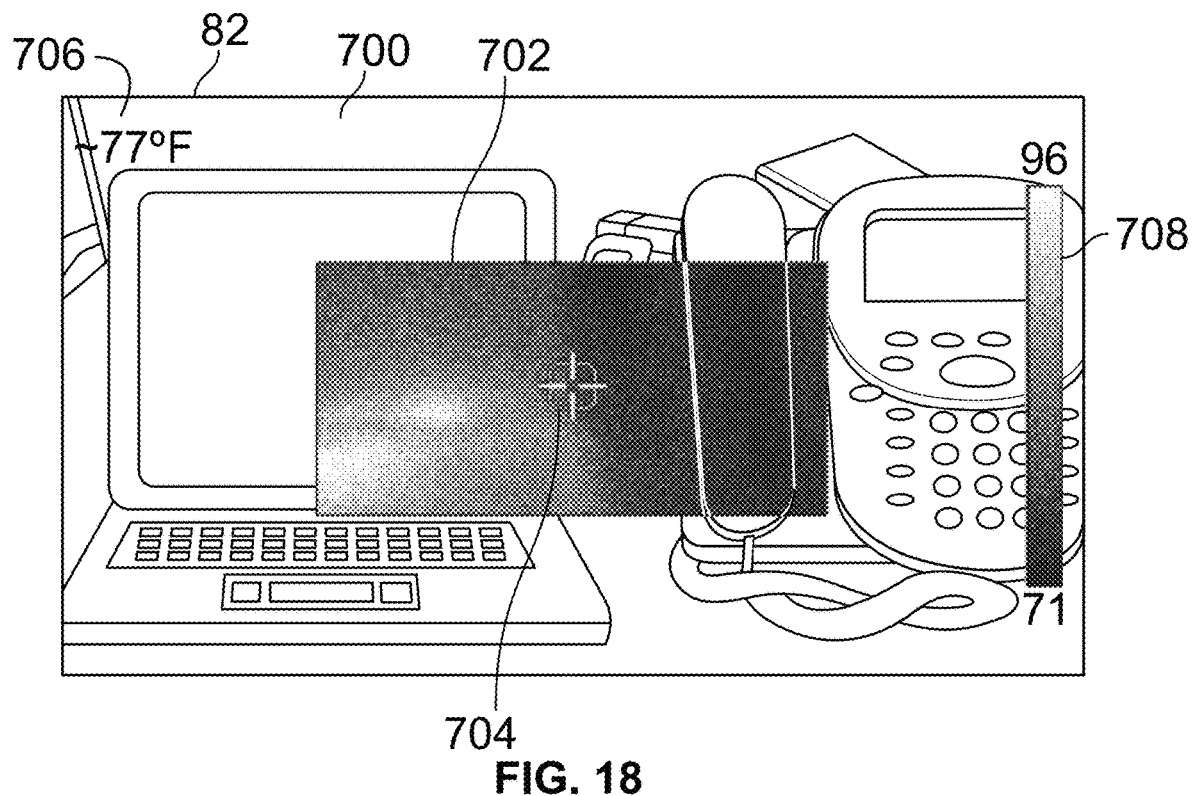

Next, FIG. 18 shows the display 82 displaying a first image 702 and a second image 700 in a picture-in-picture (P-I-P) mode. In the picture-in-picture mode, the first image 702 overlays only a portion of the second image 700. In the example implementation shown in FIG. 18, the first image 702 is a thermal image and a second image 700 is a visible light image. In an alternative implementation, the first image 702 is a visible light image and the second image 700 is a thermal image. The first image 700 and the second image 702 are aligned. The second image 702 is cropped so that the portion of the image 700 not covered by the image 702 is not blended with the image 702, whereas the portion of the image 702 covering a portion of the image 700 and that portion of the image 700 are blended.

As shown in FIG. 18, a target 704 can be overlaid upon the first image 702. In the implementation shown in FIG. 18, the target 704 is in the center (both vertically and horizontally) of the display 82. In an alternative implementation, the target 704 could be displayed off-center. In some implementations, the target 704 can be moved using the user controls 84. A temperature icon 706 is overlaid upon the first image 704. The temperature icon 706 can indicate a temperature detected at a portion of an image subject shown at and/or within the target 704. A color pallet range indicator 708 is also overlaid upon the first image 702. A color pallet upper temperature range limit is disposed on the display 82 above the color pallet range indicator 708, and a color pallet lower temperature range limit is disposed on the display 82 below the color pallet range indicator 708.

Figure 19:
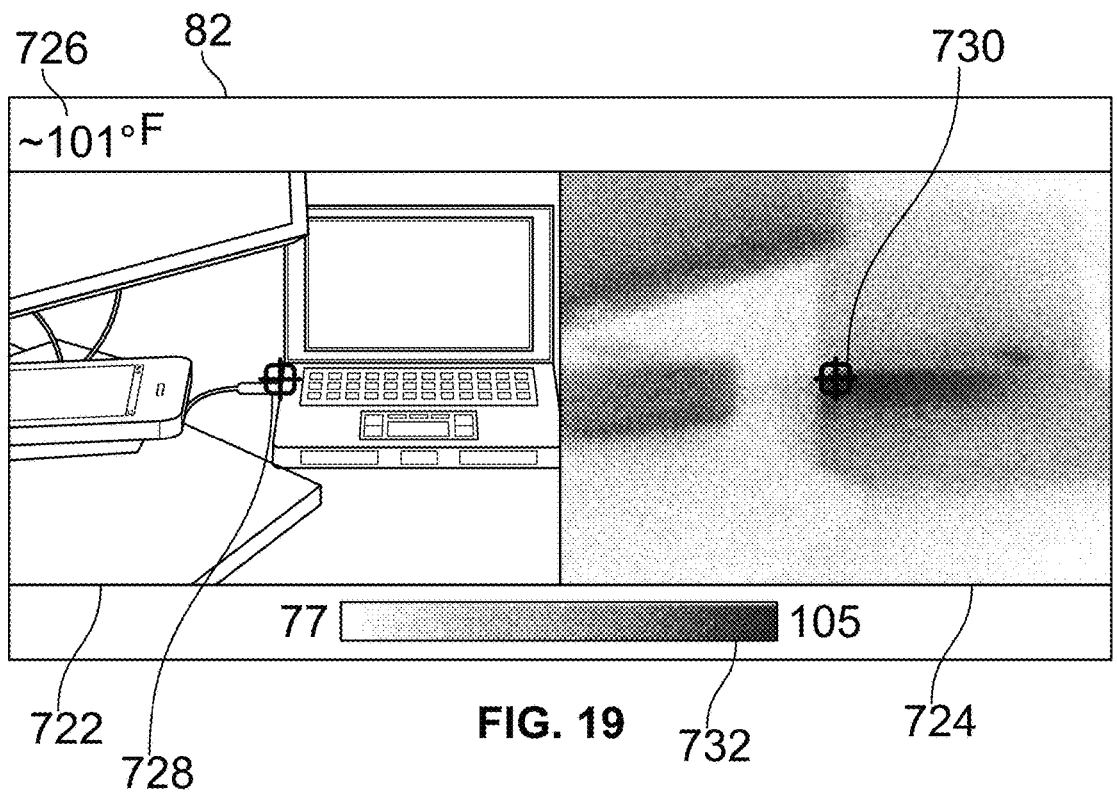

Next, FIG. 19 shows the display 82 displaying a first image 722 and a second image 724 in a split screen mode. In the split screen mode, the first image 722 and the second image 724 are adjacent to one another horizontally without any portion of the first image 722 overlaying any portion of the second image 724 and without any portion of the second image 724 overlaying any portion of the first image 722. In the example implementation shown in FIG. 19, the first image 722 is a visible light image and the second image 724 is a thermal image. In an alternative implementation, the first image 722 is a thermal image and the second image 724 is a visible light image. In another alternative implementation, the first image 722 is a visible light image and the second image 724 is a blended image based on the first image 722 and a thermal image associated with the first image 722. In yet another alternative implementation, the first image 722 is a thermal image and the second image 724 is a blended image based on the first image 722 and a visible light image associated with the first image 722.

As shown in FIG. 19, a target 728 is overlaid upon the first image 722 and a target 730 is overlaid upon the second image 724. In the implementation shown in FIG. 19, the target 728 is in the center (both vertically and horizontally) of the first image 722, and the target 730 is in the center (both vertically and horizontally) of the second image 724. In an alternative implementation, the targets 728, 730 could be displayed off-center of the first image 722 and the second image 724, respectively. In some implementations, the targets 728, 730 can be moved (independent of one another or dependent upon the other target being moved) using the user controls 84. A temperature icon 726 is displayed on the display 82. The temperature icon 726 can indicate a temperature detected at a portion of an image subject shown at and/or within the targets 728, 730. A color pallet range indicator 732 is displayed on the display 82. A color pallet upper temperature range limit is disposed on the display 82 on a right side of the color pallet range indicator 732, and a color pallet lower temperature range limit is disposed on the display 82 on a left side of the color pallet range indicator 732.

IV. Example Tags

FIG. 27 shows example tag files 790, 791, 792, 793, 794, 795 to represent examples of tag files that can be contained in the tags 79, 139 and/or within the memory 46. The tag files stored in the tags 79, 139 and/or within the memory 46 can include metadata regarding one or more image files and/or an image(s) represented by the one or more image files. In an example implementation, the image files that pertain to the tag files can be the original image files generated by the computing device 70, such as image files having a BMP extension. In that or another implementation, the image files that pertain to the tag files can be the image files converted from original image files generated by the computing device 70, such as converted image files having a JPG extension. Each of the tag files 790, 791, 792, 793, 794, 795 includes at least one image file name having a generic file extension "EXT" to represent any of a variety of applicable file extensions. Each of the tag files 790, 791, 792, 793, 794, 795 is shown as having a device serial number that the server 12 can use to associate the tag files 790, 791, 792, 793, 794, 795 and image files associated with the tag files 790, 791, 792, 793, 794, 795 with a user account at the server 12.

The tag file 790 is an example of a tag file that pertains to a thermal image file, a visible light image file, and a blended image file. The tag file 790 indicates a date and time the thermal image file and the visible light image file were generated. The blended image file could, but need not necessarily, have been generated on that same date and at that same time. In any event, the blended image file is based on the thermal image file and the visible light image file. Uploading an image file based on the tag file 790 can include uploading the thermal image file, the visible light image file, the blended image file indicated by the tag file 790, and the tag file 790.

The tag file 791 is an example of a tag file that pertains to a thermal image file and a visible light image file. The tag file 791 indicates a date and time the thermal image file and the visible light image file were generated. The tag file 791 includes blend data indicating an opacity setting of the computing device when the thermal image file and the visible light image file were generated. Uploading an image file based on the tag file 791 can include uploading the thermal image file and the visible light image file indicated by the tag file 791, and the tag file 791. The computing device 130 can generate a blended image matching a blended image shown at the computing device that generated the thermal image file and the visible light image file based on the thermal image file, the visible light image file and the blend data in tag file 791.

The tag file 792 is an example of a tag file that pertains to a thermal image file. The tag file 792 indicates a date and time the thermal image file was generated. The tag file 793 is an example of a tag file that pertains to a visible light image file. The tag file 793 indicates a date and time the visible light image file was generated. The tag file 794 is an example of a tag file that pertains to a blended image file. The tag file 794 indicates a date and time that can indicate when the blended image file was generated and/or a date and time when the thermal image file and the visible light image file were generated. Uploading an image file based on the tag file 792, 793 and/or 794 can include uploading the thermal image file, the visible light image file, and the blended image file indicated by the tag files 792, 793, and 794, and the tag files 792, 793, 794. The processor 72 can determine the tag files 792, 793, 794 are related to one another by having file names including at least a part of a common portion of unique files names of the thermal image file, the visible light image file and the blended image file.

The tag file 795 is an example of a tag file that pertains to a thermal image file. The tag file 795 indicates a date and time the thermal image file was generated. The tag file 795 includes blend data indicating an opacity setting of the computing device when the thermal image file was generated. Uploading an image file based on the tag file 795 can include uploading the thermal image file, the visible light image file indicated by the tag file 793, and the tag file 793. The computing device 130 can generate a blended image matching a blended image shown at the computing device that captured the thermal image file and the visible light image file based on the thermal image file indicated by the tag file 795, the visible light image file indicated by the tag file 793 and the blend data in tag file 795.

V. Conceptual Illustrations of Computing Devices

FIG. 8 to FIG. 11 are conceptual illustrations of the computing device 70. FIG. 8 shows a first view of the computing device 70 in accordance with an example implementation. As shown in FIG. 8, the computing device 70 includes the display 82, a housing 400, a power button 402, a no button 404, a menu button 406, a yes button 408, a left button 410, an up button 412, a right button 414, and a down button 416. For implementations in which the power supply 88 includes a battery, the computing device 70 can include a battery state-of-charge indicator 418. The battery state-of-charge indicator 418 can include a green LED to indicate the battery is charged at or above a certain charge level, such as 50%, 75% or 100%. The indicator 418 can include a RED LED to indicate the battery is being charged.

Control functions associated with the power button 402 include switching the computing device 70 to an on state from an off state, and switching the computing device to the off state from the on state. A control function associated with the no button 404, the yes button 408, the left button 410, the up button 412, the right button 414, and/or the down button 416 is navigating a menu displayed on the display 82. Control functions associate with the menu button 406 can include switching from the live mode (in which a live image based on currently generated images of the camera(s) 78, 80 is displayed) to a menu mode in which a navigable menu is displayed in place of a live image, and switching from the menu mode to the live mode.

The housing 400 can surround at least a portion of: the processor 72, the network interface 74, the memory 76, the cameras 78, 80, the display 82, the user controls 84, the light 86, the power supply 88, the data bus 90, and/or the power bus 92. The housing 400 can be referred to as an enclosure. The housing 400 can support a substrate. At least a portion of: the processor 72, the network interface 74, the memory 76, the cameras 78, 80, the display 82, the user controls 84, the light 86, the power supply 88, the data bus 90, and/or the power bus 92 can be mounted on or connect to the substrate. The housing 400 can be made from one or more materials. For example, the housing 400 can be made from a plastic material (e.g., acrylonitrile butadiene styrene (ABS)) and a thermoplastic elastomer used to form a grip on the housing 400.

Next, FIG. 9 and FIG. 10 are second and third views of the computing device 70 shown in FIG. 8. As shown in FIG. 9 and FIG. 10, the computing device 70 includes the housing 400, a camera trigger button 422, and a protective cover 424. The protective cover 424 can provide protection for a port, such as a USB port and/or a memory card slot. As an example, a USB port can include a micro USB port. As another example, the memory card slot can include a slot for receiving a microSD memory card. The memory 76 can include the memory card removably inserted into the memory card slot.

Next, FIG. 11 is a fourth view of the computing device 70 shown in FIG. 8. As shown in FIG. 11, the computing device 70 includes the housing 400, the camera trigger button 422, as well as a thermal imager window 426, a visible light window 428, and a light window 430. The thermal imager window 426 allows at least infrared light to pass through for detection by the camera 80. The visible light window 428 allows at least visible light to pass through for detection by the camera 78. Light emitted by the light 86 can pass through the light window 430.

The processor 72 can determine different operating modes for the computing device 70 based on a current operating mode of the computing device 70 and use of the camera trigger button 422. For example, when the computing device 70 is operating in the live mode and not capturing a video or image, a short press of the camera trigger button 422 causes the processor 72 capture an image from each of the cameras 78, 80. As another example, when the computing device 70 is operating in the live mode and not capturing a video or image, a long press of the camera trigger button 422 causes the processor 72 capture a video from each of the cameras 78, 80. As an example, a short press can be a press of the camera trigger button 422 for a length of time greater than 0.0 seconds and less than or equal to 1.5 seconds, and a short press can be a press of the camera trigger button 422 for more than 1.5 seconds. As yet another example, a short press or long press of the camera trigger button 422 while the cameras 78, 80 are capturing videos can cause the processor 72 to stop the cameras 78, 80 capturing the videos. The processor 72 can be configured to stop the cameras 78, 80 capturing the videos after a given length of time (e.g., 20 seconds) if the processor 72 does not detect use of the camera trigger button 422 during the first 20 seconds of capturing the videos.

Next, FIG. 14 and FIG. 15 are conceptual illustrations of the computing device 100. As shown in FIG. 14, the computing device 100 includes the display 110 and a housing 400. In View A of FIG. 14, the display 110 is displaying a menu 502. The menu 502 includes a next selector 504 for advancing to another menu or graphical user interface, and a back selector 506 to return to a prior menu or graphical user interface. The menu 502 includes a vehicle identifier 508 and check boxes 510 associated with selections that are selectable to cause the vehicle interface 108 to transmit VDM to a vehicle removably connected to the computing device 100, such as the vehicle 28. The selections associated with the check boxes 510 pertain to vehicle systems in the vehicle 28 and a selection to check whether a DTC is set in any system in the vehicle 28.

In View B of FIG. 14, the display 110 is displaying a screen output 520. The screen output 520 includes VDM content 522 of VDM received in response to transmitting VDM to the vehicle 28. As shown in FIG. 14, the VDM content can include a DTC and PID values, such as the coolant temperature, air conditioning system status, engine coolant level, and throttle position. The screen output 520 also includes a vehicle control request 524. A check box associated with the vehicle control request 524 is checked. A VDM to perform the vehicle control request 524 can be performed in response to selecting the next selector 504.

Turning to FIG. 15, View A shows the display 110 displaying a screen output 530. The screen output 530 includes VDM content 532 of VDM received in response to transmitting VDM to the vehicle 28. As shown in FIG. 15, the VDM content can include a DTC and PID values, such as the coolant temperature, air conditioning system status, engine coolant level, and throttle position. The screen output 530 also includes a vehicle control request 534. A VDM to perform the vehicle control request 534 can be performed in response to checking the checkbox associated with the vehicle control request 534 and then selecting the next selector 504.

View A of FIG. 15 also shows some example user controls that can be at least some of the user controls 140. Those user controls include a keypad 536, a four direction selector 538, reconfigurable selectors 540, a yes selector 542, a no selector 544, and a power button 546.

View B of FIG. 15 shows the display 110 displaying a screen output 550. The screen output 550 includes an upload service report selector 548. Selection of that selector and then the next selector 504 can cause the processor 132 to transmit a service report, such as a portion of the service report 966 shown in FIG. 25, to the server 12, 40.

VI. Opacity Settings

Next, FIG. 12 shows a table 370 indicating an opacity setting for an image captured by a first camera can change in steps of 25% by pressing a first or second button of the user controls 84. The opacity setting shown in table 370 can be used while the computing device 70 is operating in a mode for displaying a blended image based on a visible light image captured by the camera 78 and a thermal image captured by the camera 80. In this operating mode, a sum of the opacity setting for an image captured by the first camera and an opacity setting for an image captured by the second camera equal 100%, or the opacity value represents a percentage of the intensity detected for each pixel of the thermal image with the intensity detected for each pixel of the visible light image at 100% or another fixed percentage. In other words, the intensity of the visible light image within the blended image may not change when the opacity setting is changed. In an example implementation, the first camera is the camera 80 and the second camera is the camera 78. In an alternative implementation, the first camera is the camera 78 and the second camera is the camera 80.

In table 370, the left-most column indicates a current opacity setting for an image captured by the first camera. The middle column and the right-most column indicate the opacity setting for an image captured by the first camera after pressing the first button or the second button, respectively. As an example, the first button can be the up button 412 and the second button can be the down button 416, or vice versa. In another implementation, two other buttons of the user controls 84 could be the first and second buttons referenced in the table 370. For implementations based on table 370, the opacity setting does not wrap-around from 0% to 100% or from 100% to 0%.

FIG. 12 also shows a table 372 indicating an opacity setting for an image captured by a first camera can change in steps of 25% by pressing a first button of the user controls 84. The opacity setting shown in table 372 can be used while the computing device 70 is operating in a mode for displaying a blended image based on a visible light image captured by the camera 78 and a thermal image captured by the camera 80. In this operating mode, a sum of the opacity setting for an image captured by the first camera and an opacity setting for an image captured by the second camera equal 100%, or the opacity value represents a percentage of the intensity detected for each pixel of the thermal image with the intensity detected for each pixel of the visible light image at 100% or another fixed percentage. In an example implementation, the first camera is the camera 80 and the second camera is the camera 78. In an alternative implementation, the first camera is the camera 78 and the second camera is the camera 80.

In table 370, the left column indicates a current opacity setting for an image captured by the first camera. The right column indicates the opacity setting for an image captured by the first camera after pressing the first button. As an example, the first button can be the up button 412, the second button can be the down button 416, or another button of the user controls 84. For implementations based on table 372, the opacity setting can wrap-around from 0% to 100% or from 100% to 0%. In this way, a single button of the user controls 84 can be used to switch the opacity setting to any of the available opacity settings.

FIG. 12 also shows a table 374 indicating an opacity setting for an image captured by a first camera can change in steps of 20% or wrap-around from 0% to 100% or from 100% to 0% by pressing a first or second button of the user controls 84. The opacity setting shown in table 374 can be used while the computing device 70 is operating in a mode for displaying a blended image based on a visible light image captured by the camera 78 and a thermal image captured by the camera 80. In this operating mode, a sum of the opacity setting for an image captured by the first camera and an opacity setting for an image captured by the second camera equal 100%, or the opacity value represents a percentage of the intensity detected for each pixel of the thermal image with the intensity detected for each pixel of the visible light image at 100% or another fixed percentage. In an example implementation, the first camera is the camera 80 and the second camera is the camera 78. In an alternative implementation, the first camera is the camera 78 and the second camera is the camera 80.

In table 374, the left-most column indicates a current opacity setting for an image captured by the first camera. The middle column and the right-most column indicate the opacity setting for an image captured by the first camera after pressing the first button or the second button, respectively. As an example, the first button can be the up button 412 and the second button can be the down button 416, or vice versa. In another implementation, two other buttons of the user controls 84 could be the first and second buttons referenced in the table 374. FIG. 16 shows an example of blended images based on different opacity settings.

VII. Zoom Settings

Next, FIG. 12 shows a table 376 indicating a zoom setting for an image displayed on the display 82. The displayed image can include a blended image, such as a blended image generated from a thermal image and a visible light image. As an example, the blended image can be based on an opacity setting shown in the table 370, 374.

In table 376, the left column indicates a current zoom setting for the image displayed on the display 82. The right column indicates the zoom setting for the image displayed on the display 82 after pressing a first button. As an example, the first button can be the right button 414 or another button of the user controls 84. For implementations based on table 376, the zoom setting can wrap-around from 3× to 1×. In this way, a single button of the user controls 84 can be used to switch the zoom setting to any of the available zoom settings. The zoom settings shown in table 376 include 1×, 2×, and 3×. In alternative arrangement, the zoom settings adjustable using the first button can include two zoom setting or more than three zoom settings. Moreover, a zoom setting for the computing device 70 can include a non-integer zoom setting, such as 1.5×.

FIG. 12 also shows a table 378 indicating a zoom setting for an image displayed on the display 82. The displayed image can include a blended image, such as a blended image generated from a thermal image and a visible light image. As an example, the blended image can be based on an opacity setting shown in the table 370, 374.

In table 378, the left-most column indicates a current zoom setting for the image displayed on the display 82. The middle column and the right-most column indicate the zoom setting for an image displayed on the display 82 after pressing a first button or a second button, respectively. As an example, the first button can be the left button 410 and the second button can be the right button 414, or vice versa. In another implementation, two other buttons of the user controls 84 could be the first and second buttons referenced in the table 378. For implementations based on table 378, the zoom setting does not wrap-around from 1× to 3× or from 3× to 1×. The zoom settings shown in table 378 include 1×, 2×, and 3×. In alternative arrangement, the zoom settings adjustable using the first and second buttons can include two zoom setting or more than three zoom settings. FIG. 17 shows an example of blended images based on different zoom settings.

VIII. Example Web Application Screen Shots

FIG. 20 to FIG. 25 show example web application screen shots displayable on a display, such as the display 138 of the computing device 130. In particular, the screen shots shown in those figures can include screen shots served by the server 12, 40. These screen shots can be referred to as web pages. In accordance with the example implementations, a web page served by the server 12, 40 can include portions of one or more of the example screen shots alone or in combination with other web page components.

First, FIG. 20 shows a screen shot 800. The screen shot 800 shows a profile web page 810 for a user that has an account set up for his or her computing device 70. Similar to other web pages that will be discussed in this description, the web page 810 includes the following view selectors: a Social Feed view selector 802, a My Files view selector 804, a Search view selector 806, and a My Profile view selector 836. Each of those view selectors is individually selectable using the user controls 140 and/or the display 138 (e.g., a touch screen display). Selecting one of the view selectors when not currently selected on a web page associated with that view selector can result in displaying a web page associated with that view selector. Examples of such web pages are discussed below.

The web page 810 includes a user profile 808 for a user named John Doe. As shown in FIG. 20, the user profile 808 can include the user's name, a profile image, tool settings and preferences, social feed information (e.g., a quantity of other users following the user and a quantity of users the user is following), and information regarding skills and qualities of the user. Other information that can be displayed on a web page showing user profile information can include the user's address and information about the computing device 70 that automatically uploads images to server 12, 40 for accessing by the computing device 130. The information regarding the computing device 70 can include a serial number of the computing device, an authorization code specific to the computing device, a personal identification number associated with the computing device, and/or a user-defined name for the computing device.

Figure 21:
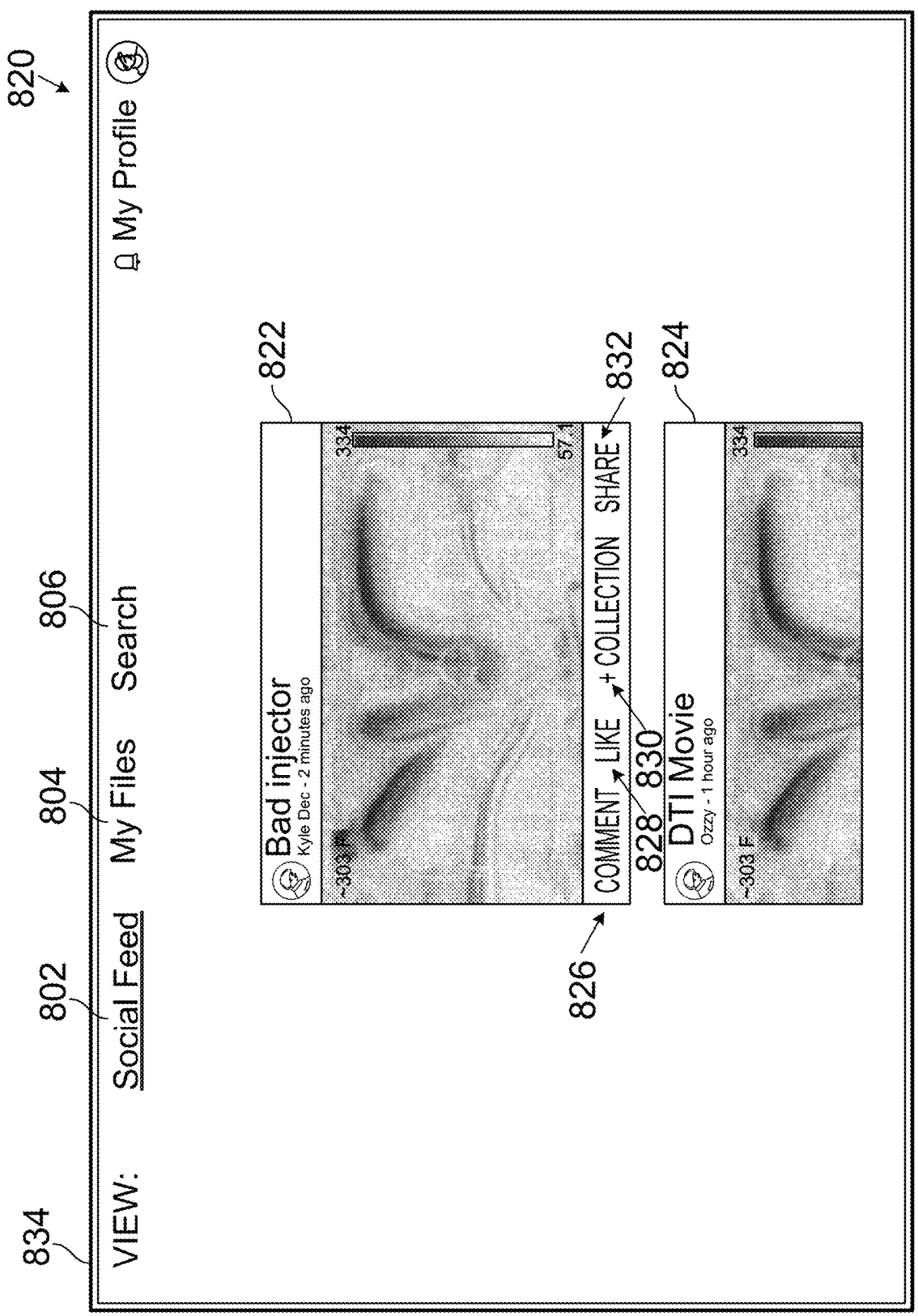

Next, FIG. 21 shows a screen shot 820. The screen shot 820 shows a social feed web page 834 for the user named John Doe. That user's profile image is shown in the upper right corner of the web page 834. The web page 834 shows the social feed view selector 802 is highlighted using underlining. The web page 834 can be displayed on the display 138 in response to the social feed view selector 802 being selected on a different web page displayed on the display 138. Since the server 12, 40 receives image files automatically uploaded from computing device 70, a social feed web page can include images, such as blended images 822, 824, other users of the server 12, 40 uploaded to the server 40 and shared with the user named John Doe. The blended image 822 includes feedback selectors, such as a comment selector 826 that provides the user with ability to comment on the blended image and/or ask a question regarding the blended image, a like selector 828 to indicate a favorable impression of the blended image 822 or otherwise, a +collection selector 830 that provides the user with the ability to add the blended image 822 to the user's collection of image files, and a share selector 832 that is selectable to cause the server 12, 40 to share the blended image 822 with individuals and groups that the user John Doe authorized the server 12, 40 to share the user's image files.

Figure 22:
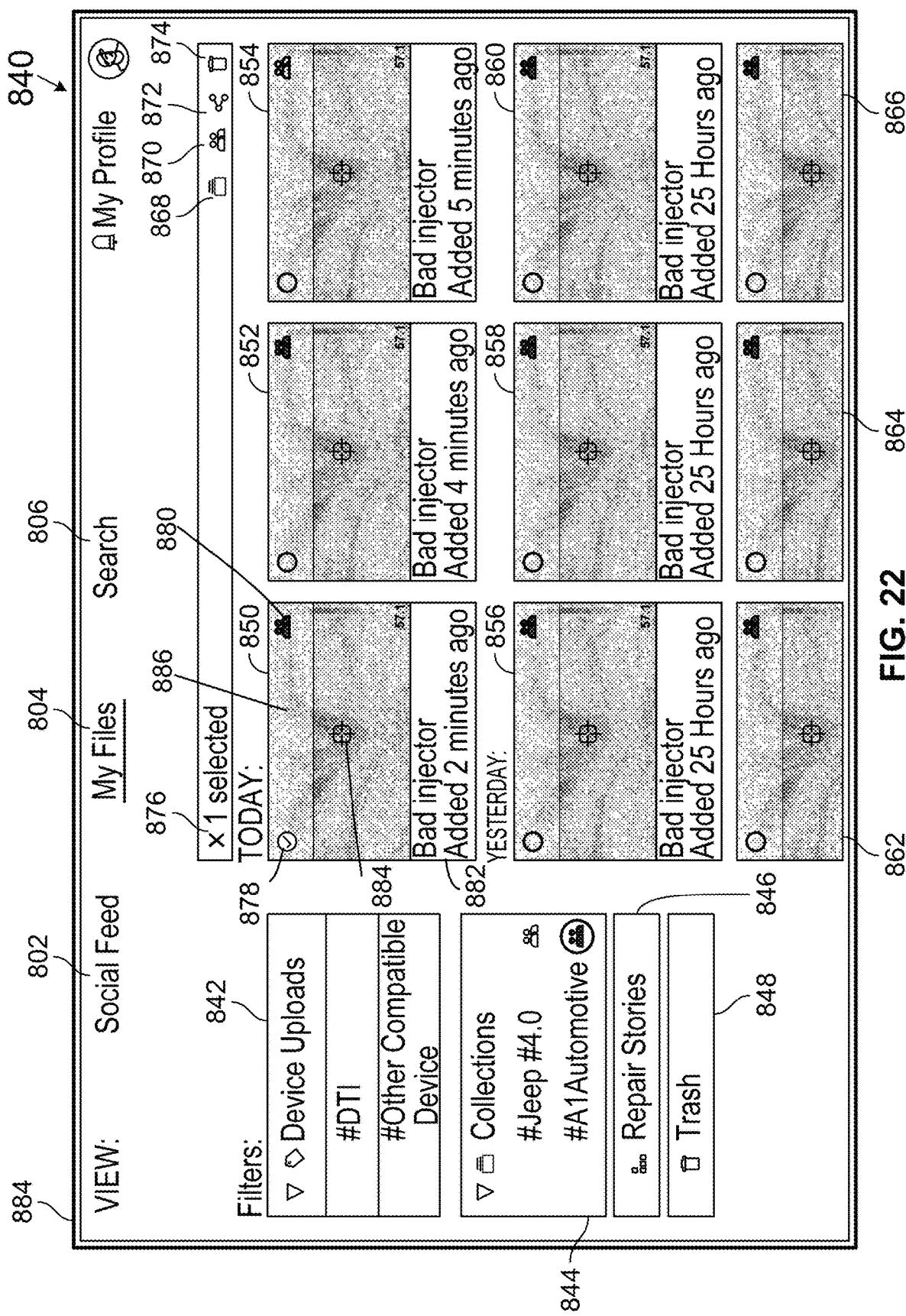

Next, FIG. 22 shows a screen shot 840. The screen shot 840 shows a My Files web page 884 for the user named John Doe. That user's profile image is shown in the upper right corner of the web page 884. The web page 884 shows the My Files view selector 804 is highlighted using underlining. The web page 884 can be displayed on the display 138 in response to the My Files view selector 804 being selected on a different web page displayed on the display 138. Instead of an individual user, a profile pertaining to images captured by the computing device can be a group profile, such as a group of individuals that work at a repair shop, such as the repair shop "Embedded Creek Auto" shown in a screen shot 950 in FIG. 25. In that case, the repair shop may be the owner of the computing device 18, 20, 70, 100.

The web page 884 includes at least some images based on image file(s) uploaded to the server 12, 40 for an account of the user indicated in the upper right hand corner and/or based on image file(s) shared with the user. The web page 884 can display the images captured by the user as, or as part of, a gallery. The web page 884 can include a horizontal and/or vertical scroll bar selectable to reveal other images or portions of images not shown in the screen shot.

The web page 884 includes a filter field 842 at which tags identifying particular devices can be entered. As shown in the figure, the filter field 842 includes a tag "#DTI" and a tag "#Other Compatible Device." DTI within the first of these tags is an abbreviation for "digital thermal imager." The web page 884 includes a filter field 844 at which tags identifying particular collections of image files can be entered. As shown in the figure, the filter field 844 includes a tag "#Jeep" and a tag "#4.0" in a common row, and a tag "#A1Automotive" in a separate row. The tags #Jeep and #4.0 pertain to a collection of image files pertaining to vehicles built under the JEEP® vehicle manufacturer name having engines with a displacement of four liters.

The web page 884 shows images 850, 852, 854, 85, 858, 860, 862, 864, 866, or more simply images 850 to 866. Each of the images is shown as having an image selector, a sharing icon, a text description box, and a target. For the image 850, those items are labeled as follows respectively, the image selector 878, the sharing icon 880, the text description box 882, and the target 884. The image selector 878 and the sharing icon 880 are located within an icon box 886. As an example, the image selectors in the images 850 to 866 can indicate an individual image is selected by displaying a check mark (e.g., √) within the image selector, as shown in the image selector 878. The sharing icon within an image can indicate whether the image is part of a collection. As an example, a solid black sharing icon can indicate the image is part of a currently selected collection, such as the #A1Automotive collection and a solid white sharing icon can indicate the image is not part of the currently selected collection.

In accordance with an example implementation, each of the images 850 to 866 is associated with at least one of the tags #DTI, #Other Compatible Device, #A1Automotive, and/or the combination of tags #Jeep and #4.0. In accordance with another example implementation, each of the images 850 to 866 is associated with the tags #DTI and #Other Compatible Device, and the collection associated with the tag "A1Automotive is shown, by a circle around the group icon, as being a currently selected collection. A different set of images can be displayed on a web page if a different set of tags is entered into the filter field 842 and/or the filter field 844.

The targets shown in the images 850 to 866, such as the target 884, can be associated with a temperature detected at a portion of an image subject shown at and/or within the target. The detected temperature can be indicated by a temperature icon (not shown in FIG. 22) overlaid upon the image including the respective target.

The web page 884 includes a repair stories icon 846 and a delete icon 848. The repair stories icon 846 is selectable to display a web page or web page element showing a service report (such as a diagnostic thermal imager report shown in FIG. 25) and/or a search field for entering search criteria for locating the service report, a repair story, and/or a service report including the repair story. A repair story can include a series of images that are linked to together based on a single repair or multiple related repairs performed to a particular vehicle. The images can include a series of blended images. The linking of the blended images can be based on tag files associated with those blended images having tags indicating the particular vehicle and a common date. The delete icon 848 is selectable to delete the currently selected image(s). The currently selected image(s) could be shown on a web page shown in response to selection of the My Files view selector, a web page showing a repair story, a web page showing a service report, or another web page including at least one image.

The web page 884 includes a collection icon 868, a sharing icon 870, a send icon 872, and a delete icon 874. The collection icon 868 is selectable to add any currently selected images to be added to a currently selected collection if the selected images are not currently a part of the selected collection, and/or to remove any currently selected image(s) to be removed from the currently selected collection. The sharing icon 870 is selectable to classify any currently selected image(s) as shareable images to users that have an account at the server 12, 40 and the user has identified as being in the user's group of users if the selected images are not currently classified as shareable, and/or to classify any currently selected images that is classified as shareable to be classified as not shareable. The send icon 872 is selectable to display a web page and/or web page element for generating a communication (e.g., an e-mail or MMS message) to send the currently selected image(s). The delete icon 874 is selectable to delete the currently selected image(s).

Figure 23:
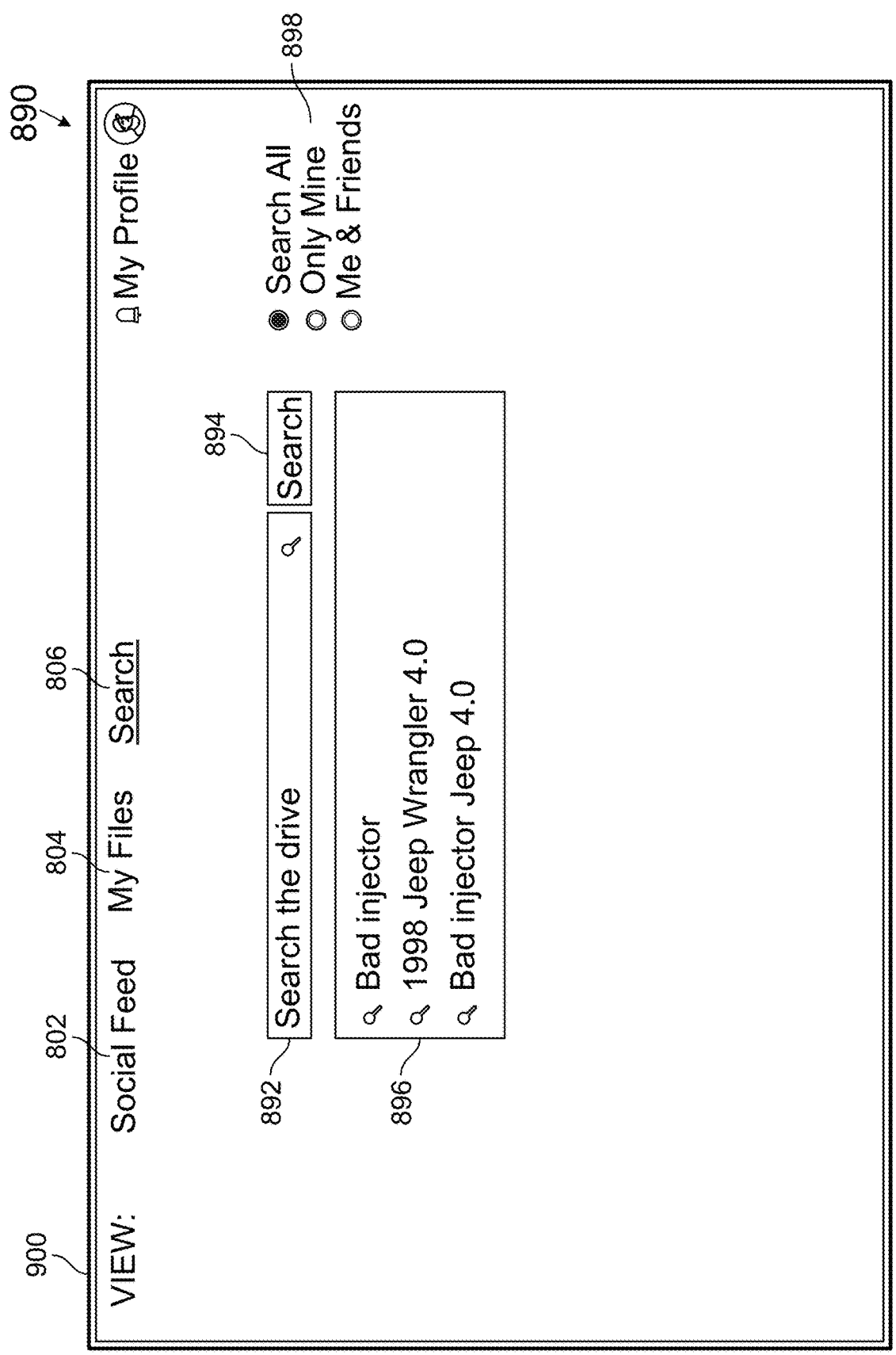

Next, FIG. 23 shows a screen shot 890. The screen shot 890 shows a search web page 900 for the user named John Doe. That user's profile image is shown in the upper right corner of the web page 900. The web page 900 shows the search view selector 806 is highlighted using underlining. The web page 900 can be displayed on the display 138 in response to the search view selector 806 being selected on a different web page displayed on the display 138.

The screen shot 890 shows: (1) a search field 892 in which text can be entered, (2) a search request icon 894, (3) a search history box 896 to show prior searches carried out by the server 12, 40, and (4) a supplemental search selector 898. Text entered into the search field 892 can represent tags or possible tags. A "possible tag" is text that could be included in a tag file, but has not yet been included in a tag file for an image. The supplemental search selector 898 provides a way to further define an image search based on users having accounts at the server 12, 40. For instance, the supplemental search selector 898 can include a "search all" selector to indicate searching for images by all users having accounts at the server 12, 40, an "only mine" selector to indicate searching for images by the user indicated by user profile, and/or a "Me & Friends" selector to indicate searching for images by the user indicated by the user profile and one or more other users that have an account at the server and have shared images with the user indicated by the user profile. In an alternative arrangement, the supplement search selector 898 can include a text box to indicate one or more other users of the server as a way to indicate searching for images by the particular one or more other users. Text entered into the search field 892 can be identified as separate tags by a delimiter such as a comma. For instance, the prior search shown as 1998 Jeep Wrangler 4.0 could have been entered into the search text box as the following three tags and two delimiters: #1998, #Jeep Wrangler, and #4.0.

Figure 24:
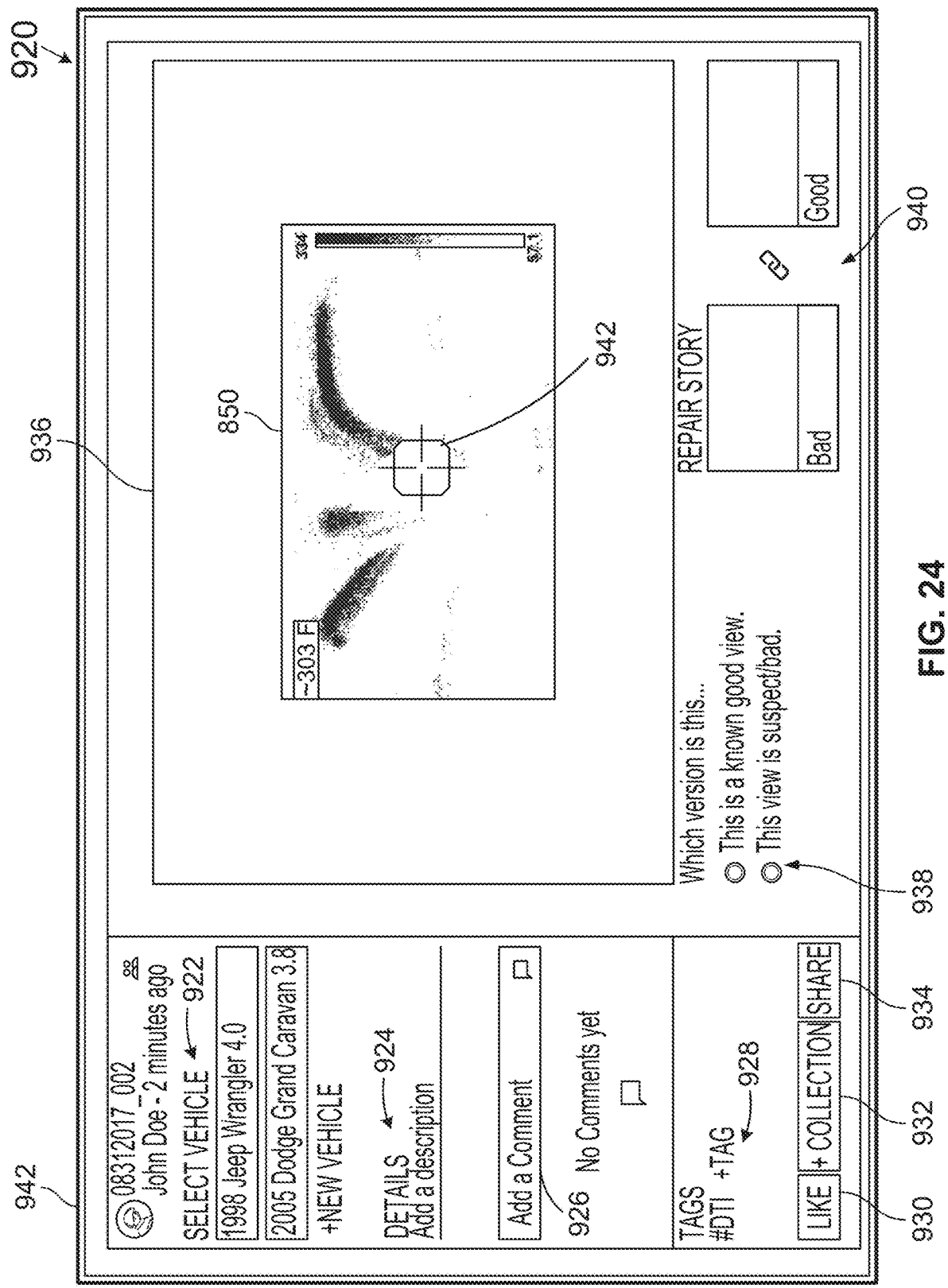

Next, FIG. 24 shows a screen shot 920. The screen shot 920 shows a web page 942 for the user named John Doe. That user's profile image is shown in the upper left corner of the screen shot 920. The web page 942 can be displayed on the display 138 in response to the selection of an image displayed on a different web page displayed on the display 138. As an example, the web page 942 can be displayed in response to selection of the image 850 shown in the search web page 900 shown in FIG. 23. In FIG. 24, the image 850 is displayed in an image window 936. The image window 936 can include one or more other images selected via a search web page from which the image 850 was selected.

The web page 942 includes one or more vehicle selector fields 922 for entering one or more vehicle identifiers and/or for selecting one or more vehicle identifiers. A vehicle identifier selected via the vehicle selector fields 922 can be used to insert tags into a tag file associated with the image 850 and/or any other image(s) shown in the image window 936. For instance, the processor 132 can add a vehicle model year tag "#1998", a vehicle make tag "#Jeep," a vehicle model tag "#Wrangler", and an engine tag "#4.0" to a tag file associated with the image 850 in response to selection of a vehicle "1998 Jeep Wrangler 4.0" from the vehicle selector fields 922. A further vehicle selector field to enter another vehicle identifier can be displayed in response to selecting a "+NEW VEHICLE" selector displayed in proximity to the vehicle selector fields 922.

The web page 942 includes a description field 924 for entering a description of the image(s) shown in the image window 936. The web page 942 includes a comment(s) field 926 for entering comments regarding the image(s) shown in the image window 936. As an example, the comment could include the text "Bad Injector." The web page 942 includes a tags field 928 to show tag(s) of tag file(s) associated with the image(s) in the image window 936 and/or for adding a new tag to tag file(s) associated with the image(s) in the image window 936.

The web page 942 can include a "like" selector 930 selectable to indicate the user likes the image(s) shown in the image window 936. The web page 942 can include a "±Collection" selector 932 selectable to initiate adding the image(s) shown in the image window 936 to a collection of images associated with the user. The web page 942 includes a "Share" icon selectable to initiate sharing the image(s) shown in the image window 936 with one or more other users having an account at the server 12, 40. The web page 942 includes a good/bad image qualifier selector 938 selectable to indicate the image(s) shown in the image window 936 is/are image(s) showing a vehicle component operating without malfunction or the image(s) show a vehicle component having a malfunction and/or suspected to have a malfunction. The web page 942 includes a repair story selector 940.

Next, FIG. 25 shows a screen shot 950. The screen shot 950 shows a search web page 964 for the user named John Doe. That user's profile image is shown in the upper right corner of the web page 964. The web page 964 shows the social feed view selector 902 is highlighted using underlining. The web page 964 can be displayed on the display 138 in response to the social feed view selector 806 being selected on a different web page displayed on the display 138.

The web page 964 shows shop information 952 regarding a repair shop referred to as Embedded Creek Auto. This repair shop could be one of followers of the user and/or a followed user of the user indicated within the quantity of following and followers on the web page 810. The web page 964 shows report information 954 regarding a vehicle serviced at the repair shop. The report information 954 indicates a date and YMME of a vehicle.

The web page 964 includes a report, such as a diagnostic thermal imager report, 966 regarding a vehicle identified by the report information 954. The report 966 includes vehicle owner information 956 and vehicle information 958. The vehicle information includes a VIN associated with the vehicle identified by the report information 954.

The web page 964 also includes images 960 and 962. The images 960, 962 are blended images. The blended images 960, 962 can be associated with a tag file(s) including tag(s) identifying the YMME or some portion of the YMME of the vehicle identified by the report information 954. The image 960 is annotated by an annotation 968. The image 962 is annotated by an annotation 970. The processor 132 can output the report 966 to a printer operatively connected to the processor 132 to cause the printer to print the report 966. The processor 132 can output the report to the network interface 134 within a communication to be sent to yet another computing device. As an example, that communication can include an e-mail communication or a multimedia messaging service (MMS) message.

Figure 26:
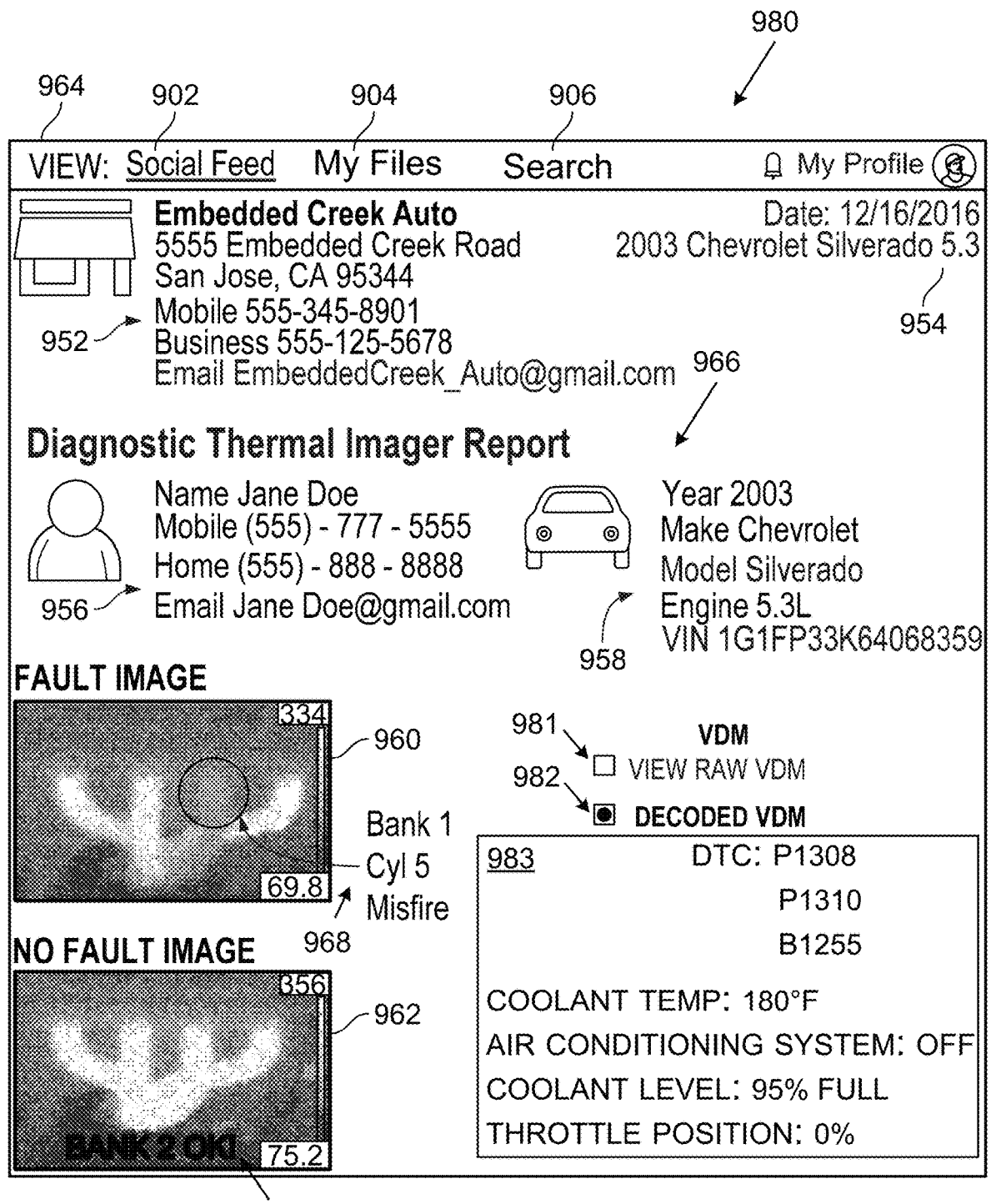

Next, FIG. 26 shows a screen shot 980. The screen shot 980 includes the content shown in the screen shot 950 and includes selectors pertaining to VDM the computing device 100 obtains from the vehicle 28. As shown in FIG. 26, the screen shot 980 includes a view raw VDM selector 981 and a decoded VDM selector 982. The decoded VDM selector 982 is shown as being selected and VDM content 983 decoded from the VDM received by the computing device 100 are shown in the report 966. In response to determining the view raw VDM selector 981 is selected to be active, the processor 132 can cause the report 966 to show the raw VDM received by the computing device 100 from the vehicle 28, such as the VDM 380 shown in FIG. 13.

IX. Example Operation

Figure 28:
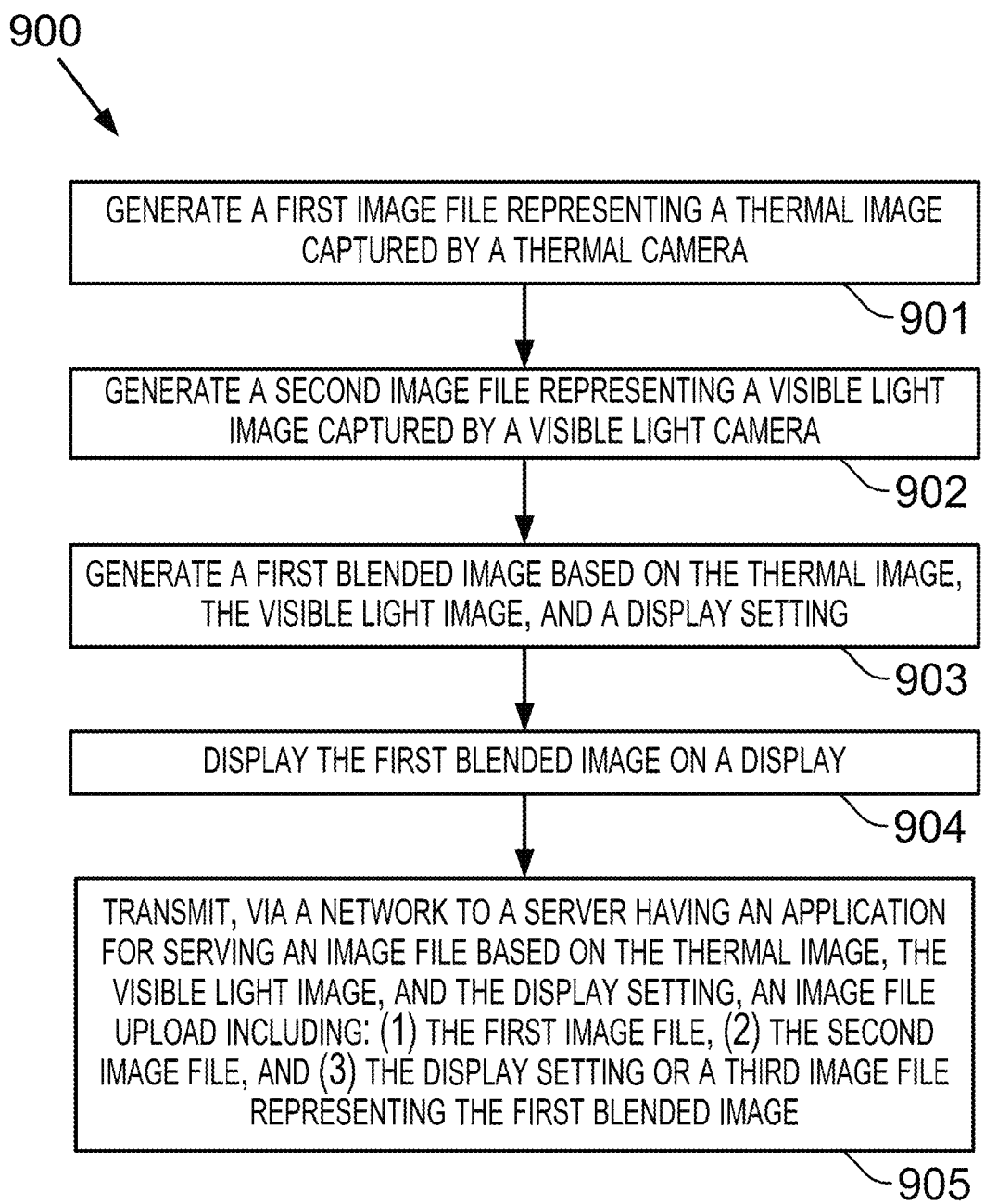
FIG. 28 and FIG. 29 are flowcharts depicting sets of functions that can be carried out in accordance with example implementations.

Next, FIG. 28 shows a flowchart depicting a set of functions 900 (or more simply "the set 900") that can be carried out in accordance with the example implementations described in this description. The set 900 includes the functions shown in blocks labeled with whole numbers 901 through 905. The following description of the set 900 includes references to elements shown in other figures described in this description, but the functions of the set 900 are not limited to being carried out only by the referenced elements. A variety of methods can be performed using all of the functions shown in the set 900 or any proper subset of the functions shown in the set 900. Any of those methods can be performed with other functions such as one or more of the other functions described in this description. A processor can perform or cause a function of the set 900 to be performed. That processor can include one or more processors.

Block 901 includes generating a first image file representing a thermal image captured by a thermal camera. In an example implementation, generating the first image file can occur in response to the processor 72 determining the computing device 70 is operating in the live mode and a user control 84, such as the trigger button 422, is pressed to cause the camera 80 to capture a thermal image. In an example implementation, the processor 72 generates the first image file by converting another image file representing the thermal image to the first image file. As an example, the other image file can include a bitmap formatted image and the first image file can include a JPEG formatted image file. In that implementation, the processor 72 can first store raw data generated by the thermal camera as a raw image file, and then convert the raw image file into the bitmap formatted image.

Next, block 902 includes generating a second image files representing a visible light image captured by a visible light camera. In an example implementation, generating the second image file can occur in response to the processor 72 determining the computing device 70 is operating in the live mode and a user control 84, such as the trigger button 422, is pressed to cause the camera 78 to capture a visible light image. In an example implementation, the processor 72 generates the second image file by converting another image file representing the visible light image to the second image file. As an example, the other image file can include a bitmap formatted image and the second image file can include a JPEG formatted image file. In that implementation, the processor 72 can first store raw data generated by the visible light camera as a raw image file, and then convert the raw image file into the bitmap formatted image.

The use of the user control 84 to capture the thermal image at block 901 and the user of the user control 84 to capture the visible light image is the same use of the user control 84. Capturing the thermal image at block 901 and the visible light image at block 902 at the same time and/or in response to the same trigger event (e.g., pressing of the trigger button 422) can form a basis for relating the first image file representing the thermal image to the second image file representing the visible light image.

Next, block 903 includes generating a first blended image based on the thermal image, the visible light image and a display setting. The display setting can include one or more display settings. In an example implementation, the display setting can include one or more default display settings. In that or in another example implementation, the display setting can include one or more display settings selected by use of the user controls 84.

In an example implementation, the display setting includes an opacity setting. The opacity setting can pertain to the thermal image of the first file. As an example, the opacity setting for the thermal image can, but need not necessarily, be a value within the range 0% to 100% inclusive. Generating the first blended image with a 0% opacity setting for the thermal image can include generating the first blended image without any influence of the thermal image. Generating the first blended image with a 100% opacity setting for the thermal image can include generating the thermal image without any influence of the visible light image. Generating the first blended image in which 0%<opacity setting<100% for the thermal image can include determining blended pixels based on pixels of the thermal image, pixels of the visible light image, and the opacity setting. As an example, the processor 72 can, but need not necessarily, blend pixels of the thermal image and the visible light image using an alpha blending process disclosed in the i.MX 7Solo Applications Processor Reference Manual, document number IMX7SRM, Rev. 0.1, dated August 2016, by NXP Semiconductors.

In that or another example implementation, the display setting includes a zoom setting, such as 1×, 2×, or 3×. Generating the first blended image based on the zoom setting can include upscaling or downscaling the thermal image and/or the visible light image and/or cropping the thermal image and/or the visible light image.

Next, block 904 includes displaying the first blended image on the display 82. In accordance with an example implementation in which the display setting includes a zoom setting, displaying the first blended image includes displaying the first blended image at a zoom level matching the zoom setting, such as the zoom setting of 1× at which the image 630 is displayed on the display 82, the zoom setting of 2× at which the image 632 is displayed on the display 82, or the zoom setting of 3× at which the image 634 is displayed on the display 82, all of which are shown in FIG. 17.

In accordance with an example implementation in which the display setting includes an opacity setting for the thermal image as value within the range 0% to 100% inclusive, displaying the first blended image with a 0% opacity setting for the thermal image can include displaying the visible light image without any influence of the thermal image. Displaying the first blended image with a 100% opacity setting for the thermal image can include displaying the thermal image without any influence of the visible light image. Displaying the first blended image with an 0<opacity setting<100% for the thermal image can include displaying blended pixels determined based on pixels of the thermal image, pixels of the visible light image, and the opacity setting. As an example, the processor 72 can, but need not necessarily, blend pixels of the thermal image and the visible light image using an alpha blending process disclosed in the i.MX 7Solo Applications Processor Reference Manual noted above.

Moreover, the processor 72 can perform software blending for an icon and/or menu. The software blending for the icon and/or menu can be performed for an icon and/or menu to be overlaid upon an image to be displayed or an icon and/or menu to be displayed on the display 82 directly without overlaying the icon and/or menu on an image. As an example, the software blending performed by the processor 72 can be performed using the Alpha Blending algorithm described in paragraph 8.1.3 and throughout the emWin Graphic Library with Graphical User Interface, User & Reference Guide, Document UM03001, Software Version V5.40, Document Revision 0, dated Mar. 6, 2017, by Segger Microcontroller GmbH & Co. KG, Hilden, Germany, or other software blending currently known or to be developed.

Next, block 905 includes transmitting via the network interface 74 to the server 12, 40 an image file upload. The image file upload includes: (i) the first image file, (ii) the second image file, and (iii) a third image file representing the first blended image, or the display setting for generating a second blended image based on the thermal image, the visible light image, and the display setting. In an alternative implementation, the image file upload includes an image file representing the first blended image and a tag file including at least one tag pertaining to the first blended image.

In accordance with an example implementation, the method can further include making, by the at least one processor, a first determination that indicates the network interface is operatively coupled to a network; and making, by the at least one processor, a second determination that indicates a computing device is associated with an account at the server. The computing device includes: (i) the at least one processor, (ii) the thermal camera, (iii) the visible light camera, (iv) the display, and (v) the network interface. Transmitting the image file upload is conditioned on the at least one processor making the first determination and making the second determination.

In accordance with foregoing example, generating, by the at least one processor, a tag file including a tag pertaining to at least the first image file and/or the second image file. The file upload includes the tag file. The tag file can include: (i) an identifier indicative of the computing device, and/or (ii) the display setting. Additionally or alternatively, the first image file and the second image files are files having a .JPG file type extension or a .JPEG file type extension, and/or wherein the tag file is a file having an .XML file type extension.

In accordance with another example implementation, the display setting includes an opacity setting the at least one processor determines from use of a user control operatively coupled to the at least one processor.

In accordance with another example implementation, a resolution of the visible light camera is greater than a resolution of the thermal camera. The first image file includes an upscaled version of the thermal image captured by the thermal camera and the second image file includes a downscaled version of the visible light image captured by the visible light camera.

In accordance with another example implementation, generating the first image file includes converting a first uncompressed image file to the first image file, and generating the second image file includes converting a second uncompressed image file to the second image file. The first uncompressed image file represents the thermal image. The second uncompressed image file represents the visible light image. The first image file and the second image file are compressed image files. As an example, the first uncompressed image file and the second uncompressed image file are image files having a .BMP file type extension, and the first image file and the second image file are files having a .JPG file type extension or a .JPEG file type extension.

In accordance with another example implementation, the display setting includes a zoom setting, an opacity setting, a picture-in-picture setting, or a split screen setting. Furthermore, the method can include displaying, by the at least one processor on the display, a first target centered vertically and horizontally upon the first blended image, and displaying, by the at least one processor on the display, a temperature, detected by the thermal camera, of an object shown within the first target centered vertically and horizontally upon the first blended image. Furthermore still, the method can include (i) determining, by the at least one processor, a selection of an off-center location of the first blended image; (ii) displaying by the at least one processor on the display, the first target at the off-center location of the first blended image instead of at a vertical and horizontal center of the first blended image, and (iii) displaying, by the at least one processor on the display, a temperature, detected by the thermal camera, of an object shown within the first target at the off-center location of the first blended image.

In accordance with another example implementation, the display setting includes a split screen setting. Furthermore, generating the first blended image based on the thermal image, the visible light image, and the display setting includes generating the first blended image based on the thermal image, the visible light image, and a thermal image opacity setting of one hundred percent. The method can further include generating, by the at least one processor, a second blended image based on the thermal image, the visible light image, and a thermal image opacity setting of zero percent. Displaying the first blended image includes displaying the first blended image adjacent to the second blended image without any overlap of the first blended image and the second blended image.

In accordance with another example implementation, the display setting includes an opacity setting and a zoom setting greater than 1.0. Moreover, opacity of the thermal image overlaid upon the visible light image is based on the opacity setting. Displaying the first blended image includes displaying the thermal image overlaid upon the visible light image with an opacity of the thermal image set to the opacity setting and displaying both the thermal image and the visible light image at the zoom setting and a field of view of the both the thermal image and the visible light image aligned.

In accordance with another example implementation, the first image file includes a first video file representing the thermal image and at least one other thermal image captured by the thermal camera. Furthermore, the second image file includes a second video file representing the visible light image and at least one other visible light image captured by the visible light camera. Furthermore still, the third image file includes a third video file representing the first blended image and at least one other thermal image based on a respective thermal image captured by the thermal camera, at least one other visible light image based on a respective visible light image captured by the visible light image, and the display setting.

Figure 29:
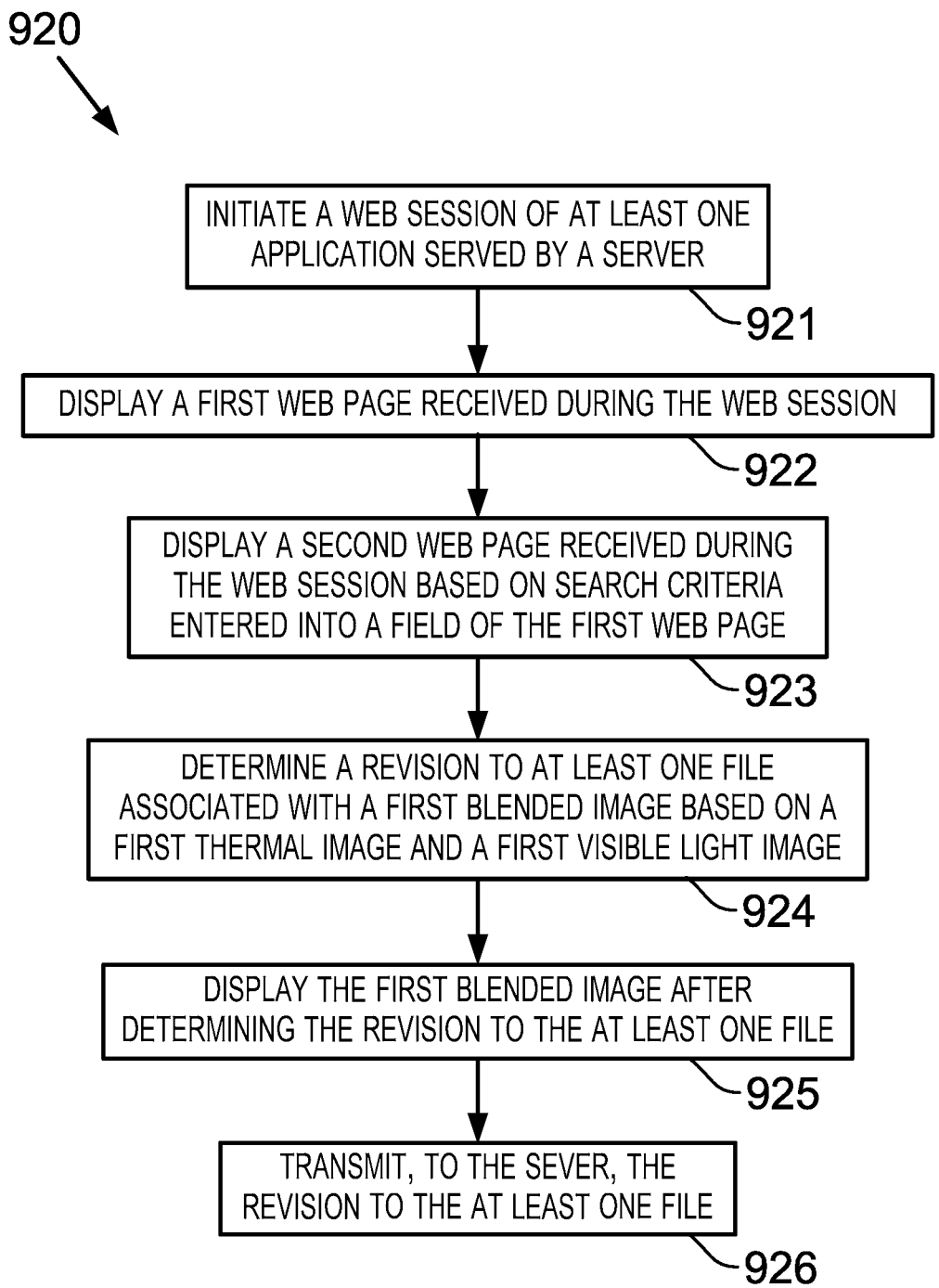

Next, FIG. 29 shows a flowchart depicting a set of functions 920 (or more simply "the set 920") that can be carried out in accordance with the example implementations described in this description. The set 920 includes the functions shown in blocks labeled with whole numbers 921 through 926. The following description of the set 920 includes references to elements shown in other figures described in this description, but the functions of the set 920 are not limited to being carried out only by the referenced elements. A variety of methods can be performed using all of the functions shown in the set 920 or any proper subset of the functions shown in the set 920. Any of those methods can be performed with other functions such as one or more of the other functions described in this description. A processor can perform or cause a function of the set 920 to be performed. That processor can include one or more processors.

Block 921 includes initiating a web session of at least one application served by a server. The processor 132 can initiate the web session with the server 12, 40.

Next, block 922 includes displaying a first web page received during the web session. In an example implementation, the first web page includes a field for entering search criteria for locating at least one file associated with a first blended image based on a first thermal image and a first visible light image. As an example, the first web page can include the search field 892. In accordance with that example, the first web page can, but need not necessarily, include the search request icon 894 and/or the search history box 896. The processor 132 can display the first web page on the display 138.

Next, block 923 includes displaying a second web page received during the web session based on search criteria entered into the field of the first web page. As an example, the second web page can include a web page include any content like the example content shown in FIG. 24 to FIG. 26. The processor 132 can display the second web page on the display 138.

Next, block 924 includes determining a revision to at least one file associated with the first blended image based on the first thermal image and the first visible light image.

Next, block 925 includes displaying the first blended image after determining the revision to the at least one file. The processor 132 can display the first blended image on the display 138.

Next, block 926 includes transmitting, to the server, the revision to the at least one file. The processor 132 can transmit the revision using the network interface 134.

In some implementations, the at least one file associated with the first blended image includes a tag file having a first tag, and the revision to the at least one file associated with the first blended image includes adding a second tag to the tag file.

In accordance with an example, the first tag includes at least a portion of a VIN associated with a vehicle having at least one vehicle component shown in the first blended image. In accordance with the foregoing example, the method can further include decoding the VIN to determine at least one of the following: a year indicated by the VIN, a vehicle make indicated by the VIN, or a vehicle model indicated by the VIN. The second tag includes at least one of the following: the year indicated by the VIN, the vehicle make indicated by the VIN, or the vehicle model indicated by the VIN.

Furthermore, in accordance with the foregoing example, the at least one file associated with the first blended image includes a first blended image file representing the first blended image, the first tag includes a user identifier of a first user, and the second tag includes data indicating the first blended image file is shareable to a group of users including at least one user other than the first user.

Furthermore still, in accordance with the foregoing example, displaying the second web page includes displaying the first blended image and at least a second blended image associated with the search criteria. The second blended image is associated with a tag file including a tag the second image file belongs to a collection of images. Furthermore, the second tag includes data indicating the first blended image file belongs to the collection of images.

Furthermore still, in accordance with the foregoing example, the at least one file further includes a blended image file representing the first blended image. The first tag includes data identifying a vehicle, the second tag includes data indicating the blended image file is an attachment of a service report regarding the vehicle, and displaying the first blended image after determining the revision includes displaying the first blended image within the service report.

Moreover, the at least one file can include: (i) a service report file representing a service report, and (ii) a first blended image file representing the first blended image. Displaying the second web page includes displaying the service report and the first blended image within the service report. The revision to the at least one file associated with the first blended image includes a visible annotation to be displayed on and/or in proximity to the first blended image. Displaying the first blended image after determining the revision includes displaying the first blended image within the service report and the visible annotation on and/or in proximity to the first blended image.

Additionally or alternatively, the server includes a first server and a second server and the at least one application includes a first application served by the first server and a second application served by the second server. In this implementation, the method can further include receiving, by the network interface, the first blended image file from the first server; and receiving, by the network interface, the service report file from the second server.

In accordance with another example implementation, displaying the second web page includes displaying: (i) the first blended image, (ii) a first group identifier associated with a first group of multiple users of the at least one application, and (iii) an icon indicating the first blended image is not shareable to the first group of users. The first group identifier indicates the first group of users is currently selected. The revision to the at least one file includes a request to change the first blended image from being not shareable to the first group of users to being shareable to the first group of users. Displaying the first blended image after determining the revision includes displaying: (i) the first blended image, (ii) a first group identifier associated with a first group of multiple users of the at least one application, and (iii) an icon indicating the first blended image is shareable to the first group of users.

In accordance with another example implementation, the at least one file includes a first blended image file representing the first blended image. Displaying the second web page includes displaying the first blended image represented by the first blended image file. The input entered into the second web page includes a visible annotation to the first blended image. The revision to the at least one file includes adding, to the first blended image file, the visible annotation to the first blended image.

In accordance with another example implementation, the at least one file associated with the first blended image includes a video file. The video file includes data representing the first blended image.

In accordance with another example implementation, the at least one file includes: (i) a service report file representing a service report, and (ii) a first blended image file representing the first blended image. The input entered into the web page is a request to attach the first blended image file to the service report file and/or to add the first blended image within the service report. Displaying the first blended image after determining the revision includes displaying the first blended image within the service report.

In accordance with another example implementation, the at least one file associated with the first blended image includes a first thermal image file representing the first thermal image, a first visible light image file representing the first visible light image file, and a tag file including blend data indicating how the first blended image was generated based on the first thermal image represented by the first thermal image file and the first visible light image represented by the first visible light image file. In this example implementation, the method can include generating, by the at least one processor, a second blended image based on the first thermal image file, the first visible light image file, and the blend data. Displaying the first blended image after determining the revision includes displaying the second blended image rather than the first blended image. Furthermore, the blend data can include an opacity value for the first thermal image and/or an opacity value for the first visible light image. Furthermore still, the blend data can include a zoom setting.

In accordance with another example implementation, the method includes displaying, on the display prior to generating the first image file and the second image file, a target on (i) an output of the thermal camera, (ii) an output of the visible light camera, or (iii) an output based on the output of the thermal camera and the output of the visible light camera, and determining, by the at least one processor, a temperature of a portion of an object shown on the display within the target meets or exceeds a temperature threshold. Generating the first image file and the second image file occurs automatically in response to determining the temperature meets or exceeds the temperature threshold. Furthermore, in that implementation, the method can include displaying, on the display, a temperature icon indicative of the temperature. The thermal image, the visible light image and/or the first blended image can include the temperature icon.

X. Definitions and Incorporation by Reference

A "thermal image" is an image captured by a thermal camera.

A "visible light image" is an image captured by a visible light camera.

A "blended image" is an image based on at least a portion of a first image and a portion of a second image. A blended image can, but need not necessarily, include an image based on at least a portion of a thermal image and a portion of a visible light image. A blended image can include an image based solely on a visible light image when an opacity setting for a related thermal image is set to 0%. A blended image can include an image based solely on a thermal image when an opacity setting for a related visible light image is set to 100%.

An "image file" is a computer-readable file including data representing an image.

A "thermal image file" is a computer-readable file including data representing a thermal image.

A "visible light image file" is a computer-readable file including data representing a visible light image.

A "blended image file" is a computer-readable file including data representing a blended image.

The term "data" within this description can be used interchangeably with the term "information" or similar terms, such as "content." The data described herein can be transmitted and received via a communication. As an example, a communication described herein can occur directly from a transmitting device (e.g., a transmitter) to a receiving device (e.g., a receiver). As another example, a communication described herein can occur indirectly from the transmitter to a receiver via one or more intermediary network devices, such as an access point, an antenna, a base station, a modem, a relay, a router, a switch, or some other network device. Transmitting a communication can include transmitting the communication over an air interface (e.g., using radio signals (i.e., wirelessly)). Transmitting a communication can include transmitting the communication over a wire (e.g., a single wire, a twisted pair of wires, a fiber optic cable, a coaxial cable, a wiring harness, a power line, a printed circuit, a CAT5 cable, or CAT6 cable). The wire can be referred to as a "conductor" or by another term. As an example, transmitting a communication over the conductor can occur electrically or optically.

A "DTC" is a diagnostic trouble code. A DTC can be manufacturer specific or industry specific, such as a DTC defined by the SAE® J2012 standard for Diagnostic Trouble Code Definitions, dated December 2016, or a DTC defined by the ISO® 15031-6 standard for diagnostic trouble code definitions, dated August 2015. A DTC can include a sub-code. For instance, a DTC can indicate that a sensor is out-of-range. A sub-code can indicate why the sensor is out-of-range, such as a sub-code indicating the sensor is shorted to ground, a sub-code indicating the sensor is open-circuited, or a sub-code indicating the sensor is shorted to voltage. Unless explicitly stated otherwise, any discussion in this description of a DTC can include a DTC that includes or does not include a sub-code.

In this description, the articles "a," "an," and "the" are used to introduce elements or functions of the example implementations. The intent of using those articles is that there is one or more of the introduced elements or functions. The word "next" is used to transition from paragraphs or aspects described in the description, rather than to indicate an order of occurrence of any functions of a method.

In this description, the intent of using the term "and/or" within a list of at least two elements or functions and the intent of using the terms "at least one of," "at least one of the following," "one or more of," or "one or more of the following" immediately preceding a list of at least two components or functions is to cover each implementation including a listed component or function independently and each implementation including a combination of the listed components or functions. For example, an implementation described as including "A, B, and/or C," or "at least one of A, B, or C," or "at least one of the following: A, B or C," or "one or more of A, B, or C," or "one or more of the following: A, B, or C" is intended to cover each of the following possible implementations: (i) an implementation including A, but not B and not C, (ii) an implementation including B, but not A and not C, (iii) an implementation including C, but not A and not B, (iv) an implementation including A and B, but not C, (v) an implementation including A and C, but not B, (v) an implementation including B and C, but not A, and (vi) an implementation including A, B, and C. For the implementations including component or function A, the implementations can include one A or multiple A. For the implementations including component or function B, the implementations can include one B or multiple B. For the implementations including component or function C, the implementations can include one C or multiple C. The use of ordinal numbers such as "first," "second," "third" and so on is to distinguish respective elements rather than to denote a particular order of those elements unless the context of using those terms explicitly indicates otherwise. The use of the symbol "$" as prefix to a number indicates the number is a hexadecimal number.

This application incorporates by reference U.S. patent application Ser. No. 16/020,976, which was filed on Jun. 27, 2018, is entitled "Method and system for displaying images captured by a computing device including a visible light camera and a thermal camera."

This application incorporates by reference U.S. patent application Ser. No. 16/020,867, which was filed on Jun. 27, 2018, is entitled "Gain Switching Techniques for Thermal Cameras."

This application incorporates by reference U.S. patent application Ser. No. 16/020,694, which was filed on Jun. 27, 2018, is entitled "Methods and Systems for Image Processing and Display."

XI. Conclusions and Enumerated Example Implementations

It should be understood that the arrangements described herein and/or shown in the drawings are for purposes of example only. As such, those skilled in the art will appreciate that other arrangements and elements (e.g., machines, interfaces, functions, orders, and/or groupings of functions) can be used instead, and some elements can be omitted altogether according to the desired results. Furthermore, various functions described and/or shown in the drawings as being performed by one or more elements can be carried out by a processor executing CRPI or by a combination of hardware, firmware, and/or software. For purposes of this description, execution of CRPI contained in a memory to perform some function can include executing all of the program instructions of those CRPI or only a portion of those CRPI.

While various aspects and implementations are described herein, other aspects and implementations will be apparent to those skilled in the art. The various aspects and implementations disclosed herein are for purposes of illustration and are not intended to be limiting, with the true scope being indicated by the claims, along with the full scope of equivalents to which such claims are entitled. It is also to be understood that the terminology used herein for the purpose of describing particular implementations only, and is not intended to be limiting.

Embodiments of the present disclosure may thus relate to one of the enumerated example embodiments (EEEs) listed below.

EEE 1 is a method comprising: (1) initiating, by at least one processor of a computing device, a web session of at least one application served by a server; (2) displaying, by a display operatively coupled to the at least one processor, a first web page received during the web session, wherein the first web page includes a field for entering search criteria for locating at least one file associated with a first blended image based on a first thermal image and a first visible light image; (3) displaying, by the display, a second web page received during the web session based on search criteria entered into the field; (4) determining, by the at least one processor based on an input entered into the second web page, a revision to the at least one file associated with the first blended image; (5) displaying, by the display, the first blended image after determining the revision to the at least one file associated with the first blended image; and (6) transmitting, by the at least one processor to the server using a network interface operatively coupled to the at least one processor, the revision to at least one file associated with the first blended image.

EEE 2 is the method of EEE 1, wherein the at least one file associated with the first blended image includes a tag file having a first tag; and wherein the revision to the at least one file associated with the first blended image includes adding a second tag to the tag file.

EEE 3 is the method of EEE 2, wherein the first tag includes at least a portion of a vehicle identifier number (VIN) associated with a vehicle having at least one vehicle component shown in the first blended image, the method further comprising: decoding the VIN to determine at least one of the following: a year indicated by the VIN, a vehicle make indicated by the VIN, or a vehicle model indicated by the VIN, and wherein the second tag includes at least one of the following: the year indicated by the VIN, the vehicle make indicated by the VIN, or the vehicle model indicated by the VIN.

EEE 4 is the method of EEE 2, wherein the at least one file further includes a blended image file representing the first blended image, wherein the first tag includes data identifying a vehicle, wherein the second tag includes data indicating the blended image file is an attachment of a service report regarding the vehicle, and wherein displaying the first blended image after determining the revision includes displaying the first blended image within the service report.

EEE 5 is the method of EEE 4, wherein the at least one file includes: (i) a service report file representing a service report, and (ii) a first blended image file representing the first blended image, wherein displaying the second web page includes displaying the service report and the first blended image within the service report, wherein the revision to the at least one file associated with the first blended image includes a visible annotation to be displayed on and/or in proximity to the first blended image, and wherein displaying the first blended image after determining the revision includes displaying the first blended image within the service report and the visible annotation on and/or in proximity to the first blended image.

EEE 6 is the method of EEE 4 or 5, wherein the server includes a first server and a second server; wherein the at least one application includes a first application served by the first server and a second application served by the second server, wherein the method further includes: receiving, by the network interface, the first blended image file from the first server; and receiving, by the network interface, the service report file from the second server.

EEE 7 is the method of any one of EEEs 2 to 6, wherein the at least one file associated with the first blended image includes a first blended image file representing the first blended image, wherein the first tag includes a user identifier of a first user, and wherein the second tag includes data indicating the first blended image file is shareable to a group of users including at least one user other than the first user.

EEE 8 is the method of any one of EEEs 2 to 7, wherein displaying the second web page includes displaying the first blended image, wherein displaying the second web page includes displaying at least a second blended image associated with the search criteria, wherein the second blended image is associated with a tag file including a tag the second image file belongs to a collection of images, wherein the second tag includes data indicating the first blended image file belongs to the collection of images.

EEE 9 is the method of any one of EEEs 1 to 8, wherein displaying the second web page includes displaying: (i) the first blended image, (ii) a first group identifier associated with a first group of multiple users of the at least one application, and (iii) an icon indicating the first blended image is not shareable to the first group of users, wherein the first group identifier indicates the first group of users is currently selected, wherein the revision to the at least one file includes a request to change the first blended image from being not shareable to the first group of users to being shareable to the first group of users, and wherein displaying the first blended image after determining the revision includes displaying: (i) the first blended image, (ii) a first group identifier associated with a first group of multiple users of the at least one application, and (iii) an icon indicating the first blended image is shareable to the first group of users.

EEE 10 is the method of any one of EEEs 1 to 9, wherein the at least one file includes a first blended image file representing the first blended image, wherein displaying the second web page includes displaying the first blended image represented by the first blended image file, wherein the input entered into the second web page includes a visible annotation to the first blended image, and wherein the revision to the at least one file includes adding, to the first blended image file, the visible annotation to the first blended image.

EEE 11 is the method of any one of EEEs 1 to 10, wherein the at least one file associated with the first blended image includes a video file, and wherein the video file includes data representing the first blended image.

EEE 12 is the method of any one of EEEs 1 to 11, wherein the at least one file includes: (i) a service report file representing a service report, and (ii) a first blended image file representing the first blended image, wherein the input entered into the web page is a request to attach the first blended image file to the service report file and/or to add the first blended image within the service report, and wherein displaying the first blended image after determining the revision includes displaying the first blended image within the service report.

EEE 13 is the method of any one of EEEs 1 to 12, wherein the at least one file associated with the first blended image includes a first thermal image file representing the first thermal image, a first visible light image file representing the first visible light image file, and a tag file including blend data indicating how the first blended image was generated based on the first thermal image represented by the first thermal image file and the first visible light image represented by the first visible light image file, wherein the method further comprises: generating, by the at least one processor, a second blended image based on the first thermal image file, the first visible light image file, and the blend data, wherein displaying the first blended image after determining the revision includes displaying the second blended image rather than the first blended image.

EEE 14 is the method of EEE 13, wherein the blend data includes an opacity value for the first thermal image and/or an opacity value for the first visible light image.

EEE 15 is the method of EEE 14, wherein the blend data further includes a zoom setting.

EEE 16 is a system comprising: at least one processor; and a non-transitory computer memory storing computer-readable program instructions, wherein the computer-readable program instructions are executable by the at least one processor to: (1) initiate, by the at least one processor of a computing device, a web session of at least one application served by a server; (2) display, by a display operatively coupled to the at least one processor, a first web page received during the web session, wherein the first web page includes a field for entering search criteria for locating at least one file associated with a first blended image based on a first thermal image and a first visible light image; (3) display, by the display, a second web page received during the web session based on search criteria entered into the field; (4) determine, based on an input entered into the second web page, a revision to the at least one file associated with the first blended image; (5) display, by the display, the first blended image after determining the revision to the at least one file associated with the first blended image; and (6) transmit, to the server using a network interface operatively coupled to the at least one processor, the revision to at least one file associated with the first blended image.

EEE 17 is a system comprising: at least one processor; and a non-transitory computer memory storing computer-readable program instructions, wherein the computer-readable program instructions are executable by the at least one processor for performing a set of functions, the set of functions comprising a method in accordance with any one of EEEs 1 to 15.

EEE 18 is a non-transitory computer-readable memory having stored thereon instructions, that when executed by a computing device, cause the computing device to perform functions comprising: (1) initiating, by at least one processor of a computing device, a web session of at least one application served by a server; (2) displaying, by a display operatively coupled to the at least one processor, a first web page received during the web session, wherein the first web page includes a field for entering search criteria for locating at least one file associated with a first blended image based on a first thermal image and a first visible light image; (3) displaying, by the display, a second web page received during the web session based on search criteria entered into the field; (4) determining, by the at least one processor based on an input entered into the second web page, a revision to the at least one file associated with the first blended image; (5) displaying, by the display, the first blended image after determining the revision to the at least one file associated with the first blended image; and (6) transmitting, by the at least one processor to the server using a network interface operatively coupled to the at least one processor, the revision to at least one file associated with the first blended image.

EEE 19 is a computer-readable medium storing program instructions, that when executed by a computing device, cause a set of functions to be performed, the set of functions comprising a method in accordance with any one of EEEs 1 to 15.

EEE 20 is a method comprising: (1) generating, by at least one processor, a first image file representing a thermal image captured by a thermal camera operatively coupled to the at least one processor; (2) generating, by the at least one processor, a second image file representing a visible light image captured by a visible light camera operatively coupled to the at least one processor; (3) generating, by the at least one processor, a first blended image based on the thermal image, the visible light image, and a display setting; (4) displaying, by the at least one processor on a display operatively coupled to the at least one processor, the first blended image; and (5) transmitting, by the at least one processor via a network interface to a server having an application for serving an image file generated by the at least one processor, an image file upload, wherein the image file upload includes: (i) the first image file, (ii) the second image file, and (iii) a third image file representing the first blended image, or the display setting for generating a second blended image based on the thermal image, the visible light image, and the display setting.

EEE 21 is the method of EEE 20, further comprising: making, by the at least one processor, a first determination that indicates the network interface is operatively coupled to a network; and making, by the at least one processor, a second determination that indicates a computing device is associated with an account at the server, wherein the computing device includes: (i) the at least one processor, (ii) the thermal camera, (iii) the visible light camera, (iv) the display, and (v) the network interface, and wherein transmitting the image file upload is conditioned on the at least one processor making the first determination and making the second determination.

EEE 22 is the method of EEE 21, further comprising: generating, by the at least one processor, a tag file including a tag pertaining to at least the first image file and/or the second image file, wherein the file upload includes the tag file.

EEE 23 is the method of EEE 22, wherein the tag file includes: (i) an identifier indicative of the computing device, and/or (ii) the display setting.

EEE 24 is the method of any one of EEEs 22 to 23, wherein the first image file and the second image files are files having a .JPG file type extension or a .JPEG file type extension, and/or wherein the tag file is a file having an .XML file type extension.

EEE 25 is the method of any one of EEEs 20 to 24, wherein the display setting includes an opacity setting the at least one processor determines from use of a user control operatively coupled to the at least one processor.

EEE 26 is the method of any one of EEEs 20 to 25, wherein a resolution of the visible light camera is greater than a resolution of the thermal camera, wherein the first image file includes an upscaled version of the thermal image captured by the thermal camera, wherein the second image file includes a downscaled version of the visible light image captured by the visible light camera.

EEE 27 is the method of any one of EEEs 20 to 26, wherein generating the first image file includes converting a first uncompressed image file to the first image file, wherein generating the second image file includes converting a second uncompressed image file to the second image file, wherein the first uncompressed image file represents the thermal image, wherein the second uncompressed image file represents the visible light image, and wherein the first image file and the second image file are compressed image files.

EEE 28 is the method of EEE 27, wherein the first uncompressed image file and the second uncompressed image file are image files having a .BMP file type extension, and wherein the first image file and the second image file are files having a JPG file type extension or a JPEG file type extension EEE 29 is the method of any one of EEE 20 to 28, wherein the display setting includes a zoom setting, an opacity setting, a picture-in-picture setting, or a split screen setting.

EEE 30 is the method of EEE 29, further comprising: displaying, by the at least one processor on the display, a first target centered vertically and horizontally upon the first blended image; and displaying, by the at least one processor on the display, a temperature, detected by the thermal camera, of an object shown within the first target centered vertically and horizontally upon the first blended image.

EEE 31 is the method of EEE 30, further comprising: determining, by the at least one processor, a selection of an off-center location of the first blended image, displaying by the at least one processor on the display, the first target at the off-center location of the first blended image instead of at a vertical and horizontal center of the first blended image; and displaying, by the at least one processor on the display, a temperature, detected by the thermal camera, of an object shown within the first target at the off-center location of the first blended image.

EEE 32 is the method of any one of EEE 20 to 31, wherein the display setting include a split screen setting, wherein generating the first blended image based on the thermal image, the visible light image, and the display setting includes generating the first blended image based on the thermal image, the visible light image, and a thermal image opacity setting of one hundred percent; wherein the method further comprises: generating, by the at least one processor, a second blended image based on the thermal image, the visible light image, and a thermal image opacity setting of zero percent, wherein displaying the first blended image includes displaying the first blended image adjacent to the second blended image without any overlap of the first blended image and the second blended image.

EEE 33 is the method of any one of EEE 20 to 32, wherein the display setting includes an opacity setting and a zoom setting greater than 1.0, wherein an opacity of the thermal image overlaid upon the visible light image is based on the opacity setting, and wherein displaying the first blended image includes displaying the thermal image overlaid upon the visible light image with an opacity of the thermal image set to the opacity setting and displaying both the thermal image and the visible light image at the zoom setting and a field of view of the both the thermal image and the visible light image aligned.

EEE 34 is the method of any one of EEE 20 to 33, wherein the first image file includes a first video file representing the thermal image and at least one other thermal image captured by the thermal camera, wherein the second image file includes a second video file representing the visible light image and at least one other visible light image captured by the visible light camera, and wherein the third image file includes a third video file representing the first blended image and at least one other thermal image based on a respective thermal image captured by the thermal camera, at least one other visible light image based on a respective visible light image captured by the visible light image, and the display setting.

EEE 35 is the method of any one of EEE 20 to 34, further comprising: displaying, on the display prior to generating the first image file and the second image file, a target on (i) an output of the thermal camera, (ii) an output of the visible light camera, or (iii) an output based on the output of the thermal camera and the output of the visible light camera; and determining, by the at least one processor, a temperature of a portion of an object shown on the display within the target meets or exceeds a temperature threshold, wherein generating the first image file and the second image file occurs automatically in response to determining the temperature meets or exceeds the temperature threshold.

EEE 36 is the method of EEE 35, further comprising: displaying, on the display, a temperature icon indicative of the temperature, wherein the thermal image, the visible light image and/or the first blended image includes the temperature icon.

EEE 37 is a system comprising: at least one processor; and a non-transitory computer memory storing computer-readable program instructions, wherein the computer-readable program instructions are executable by the at least one processor to: (1) generate, by at least one processor, a first image file representing a thermal image captured by a thermal camera operatively coupled to the at least one processor; (2) generate, by the at least one processor, a second image file representing a visible light image captured by a visible light camera operatively coupled to the at least one processor; (3) generate, by the at least one processor, a first blended image based on the thermal image, the visible light image, and a display setting; (4) display, by the at least one processor on a display operatively coupled to the at least one processor, the first blended image; and (5) transmit, by the at least one processor via a network interface to a server having an application for serving an image file generated by the at least one processor, an image file upload, wherein the image file upload includes: (i) the first image file, (ii) the second image file, and (iii) a third image file representing the first blended image, or the display setting for generating a second blended image based on the thermal image, the visible light image, and the display setting.

EEE 38 is a system comprising: at least one processor; and a non-transitory computer memory storing computer-readable program instructions, wherein the computer-readable program instructions are executable by the at least one processor for performing a set of functions, the set of functions comprising a method in accordance with any one of EEEs 20 to 36.

EEE 39 is a non-transitory computer-readable memory having stored thereon instructions, that when executed by at least one processor of a computing device, cause the computing device to perform functions comprising: (1) generating a first image file representing a thermal image captured by a thermal camera operatively coupled to the at least one processor; (2) generating a second image file representing a visible light image captured by a visible light camera operatively coupled to the at least one processor; (3) generating a first blended image based on the thermal image, the visible light image, and a display setting; (4) displaying, on a display operatively coupled to the at least one processor, the first blended image; and (5) transmitting, via a network interface to a server having an application for serving an image file generated by the at least one processor, an image file upload, wherein the image file upload includes: (i) the first image file, (ii) the second image file, and (iii) a third image file representing the first blended image, or the display setting for generating a second blended image based on the thermal image, the visible light image, and the display setting.

EEE 40 is a computer-readable medium storing program instructions, that when executed by a computing device, cause a set of functions to be performed, the set of functions comprising a method in accordance with any one of EEEs 20 to 36.

We claim:

1. A method comprising:
   generating, by one or more processors, a first image file representing a thermal image captured by a thermal camera operatively coupled to the one or more processors;
   generating, by the one or more processors, a second image file representing a visible light image captured by a visible light camera operatively coupled to the one or more processors;
   generating, by the one or more processors, a first blended image based on the thermal image, the visible light image, and one or more user-selectable display settings;
   displaying, on a display operatively coupled to the one or more processors, the first blended image according to the one or more user-selectable display settings;
   generating, by the one or more processors, a tag file including a tag pertaining to both the first image file and the second image file, wherein the tag pertaining to both the first image file and the second image file includes one or more tags corresponding to at least a portion of a vehicle identifier; and
   transmitting, by the one or more processors via a network interface to a server, an image file upload, wherein the image file upload includes: (i) the first image file, (ii) the second image file, (iii) the one or more user-selectable display settings, and (iv) the tag file, whereby the server can generate a second blended image based on the thermal image, the visible light image, and the one or more user-selectable display settings used to display the first blended image.

2. The method of claim 1, further comprising:
   making, by the one or more processors, a first determination that indicates the network interface is operatively coupled to a network; and
   making, by the one or more processors, a second determination that indicates a computing device is associated with an account at the server,
   wherein the computing device includes: (i) the one or more processors, (ii) the thermal camera, (iii) the visible light camera, (iv) the display, and (v) the network interface, and
   wherein transmitting the image file upload is conditioned on the one or more processors making the first determination and making the second determination.

3. The method of claim 2, wherein the tag file further includes one or more from among: (i) an identifier indicative of the computing device, (ii) the one or more user-selectable display settings, (iii) a date identifier, (iv) a time-of-day identifier, or (v) a user identifier of a person using the computing device.

4. The method of claim 1,
   wherein the first image file and the second image file are formatted as JPG files, or JPEG files, and optionally,
   wherein the tag file has an .XML file type extension.

5. The method of claim 1, wherein the one or more user-selectable display settings include an opacity setting the one or more processors determines from use of a user control operatively coupled to the one or more processors.

6. The method of claim 1, wherein:
   a resolution of the visible light camera is greater than a resolution of the thermal camera,
   the display has a particular resolution,
   the method further comprises:
      upscaling the thermal image from a first resolution less than the particular resolution to the particular resolution, and
      downscaling the visible light image from a second resolution greater than the particular resolution to the particular resolution or cropping the visible light image to match the particular resolution,
   the first image file includes an upscaled version of the thermal image,
   the second image file includes the downscaled or cropped visible light image, and optionally,
   the method further comprises cropping the thermal image after upscaling the thermal image.

7. The method of claim 1,
   wherein generating the first image file includes converting a first uncompressed image file to the first image file,
   wherein generating the second image file includes converting a second uncompressed image file to the second image file,
   wherein the first uncompressed image file represents the thermal image,
   wherein the second uncompressed image file represents the visible light image, and
   wherein the first image file and the second image file are compressed image files.

8. The method of claim 7,
   wherein the first uncompressed image file and the second uncompressed image file are formatted as BMP files, and
   wherein the first image file and second image file are formatted as JPG files or JPEG files.

9. The method of claim 1,
   wherein the one or more user-selectable display settings include a zoom setting, an opacity, setting, a picture-in-picture setting, or a split screen setting.

10. The method of claim 9, further comprising:
displaying, by the one or more processors on the display, a first target centered vertically and horizontally upon the first blended image; and
displaying, by the one or more processors on the display, a temperature, detected by the thermal camera, of an object shown within the first target centered vertically and horizontally upon the first blended image.

11. The method of claim 10, further comprising:
determining, by the one or more processors, a selection of an off-center location of the first blended image,
displaying by the one or more processors on the display, the first target at the off-center location of the first blended image instead of at a vertical and horizontal center of the first blended image; and
displaying, by the one or more processors on the display, a temperature, detected by the thermal camera, of an object shown within the first target at the off-center location of the first blended image.

12. The method of claim 1,
wherein the one or more user-selectable display settings include a split screen setting,
wherein generating the first blended image based on the thermal image, the visible light image, and the one or more user-selectable display settings includes generating the first blended image based on the thermal image, the visible light image, and a thermal image opacity setting of one hundred percent;
wherein the method further comprises:
generating, by the one or more processors, a second blended image based on the thermal image, the visible light image, and the one or more user-selectable display settings, wherein generating the second blended image includes generating the second blended image based on the thermal image, the visible light image, and a thermal image opacity setting of zero percent, and
wherein displaying the first blended image includes displaying the first blended image adjacent to the second blended image without any overlap of the first blended image and the second blended image.

13. The method of claim 1,
wherein the one or more user-selectable display settings include an opacity setting and a zoom setting greater than 1.0,
wherein an opacity of the thermal image overlaid upon the visible light image is based on the opacity setting, and
wherein displaying the first blended image includes displaying the thermal image overlaid upon the visible light image with an opacity of the thermal image set to the opacity setting and displaying both the thermal image and the visible light image at the zoom setting and a field of view of both the thermal image and the visible light image aligned.

14. The method of claim 1,
generating, by the one or more processors, a third image file,
wherein the first image file includes a first video file representing the thermal image and at least one other thermal image captured by the thermal camera,
wherein the second image file includes a second video file representing the visible light image and at least one other visible light image captured by the visible light camera, and
wherein the third image file includes a third video file representing the first blended image and at least one other thermal image based on a respective thermal image captured by the thermal camera, at least one other visible light image based on a respective visible light image captured by the visible light image, and the one or more user-selectable display settings.

15. The method of claim 1, further comprising:
displaying, on the display prior to generating the first image file and the second image file, a target on (i) an output of the thermal camera, (ii) an output of the visible light camera, or (iii) an output based on the output of the thermal camera and the output of the visible light camera; and
determining, by the one or more processors, a temperature of a portion of an object shown on the display within the target meets or exceeds a temperature threshold,
wherein generating the first image file and the second image file occurs automatically in response to determining the temperature meets or exceeds the temperature threshold.

16. The method of claim 15, further comprising:
displaying, on the display, a temperature icon indicative of the temperature,
wherein the thermal image, the visible light image and/or the first blended image includes the temperature icon.

17. A system comprising:
one or more processors; and
a non-transitory computer memory storing computer-readable program instructions, wherein the computer-readable program instructions are executable by the one or more processors to:
generate, by the one or more processors, a first image file representing a thermal image captured by a thermal camera operatively coupled to the one or more processors;
generate, by the one or more processors, a second image file representing a visible light image captured by a visible light camera operatively coupled to the one or more processors;
generate, by the one or more processors, a first blended image based on the thermal image, the visible light image, and one or more user-selectable display settings;
generate, by the one or more processors, a tag file including a tag pertaining to both the first image file and the second image file, wherein the tag pertaining to both the first image file and the second image file includes one or more tags corresponding to at least a portion of a vehicle identifier;
display, on a display operatively coupled to the one or more processors, the first blended image; and
transmit, by the one or more processors via a network interface to a server, an image file upload, wherein the image file upload includes: (i) the first image file, (ii) the second image file, (iii) the one or more user-selectable display settings, and (iv) the tag file, whereby the server can generate a second blended image based on the thermal image, the visible light image, and the one or more user-selectable display settings used to display the first blended image.

18. A non-transitory computer-readable memory having stored thereon instructions, that when executed by one or more processors of a computing device, cause the computing device to perform functions comprising:
generating a first image file representing a thermal image captured by a thermal camera operatively coupled to the one or more processors;
generating a second image file representing a visible light image captured by a visible light camera operatively coupled to the one or more processors;

generating a first blended image based on the thermal image, the visible light image, and one or more user-selectable display settings;

generating a tag file including a tag pertaining to both the first image file and the second image file, wherein the tag pertaining to both the first image file and the second image file includes one or more tags corresponding to at least a portion of a vehicle identifier;

displaying, on a display operatively coupled to the one or more processors, the first blended image; and transmitting, via a network interface to a server having an application for serving an image file generated by the one or more processors, an image file upload, wherein the image file upload includes: (i) the first image file, (ii) the second image file, (iii) the one or more user-selectable display settings, and (iv) the tag file, whereby the server can generate a second blended image based on the thermal image, the visible light image, and the one or more user-selectable display settings used to display the first blended image.

19. A method according to claim 1, wherein:
the server includes a first processor, and
the method further comprises generating, by the first processor, a second blended image based on first image file, the second image file, and the one or more user-selectable display settings.

20. A method according to claim 19,
wherein the one or more user-selectable display settings include blend data indicative of an opacity setting used to display the first blended image.

21. A method according to claim 19, further comprising:
initiating a web session of at least one application served by the server;
displaying, on a display of a computing device, a web page including the second blended image.

22. A method according to claim 21, further comprising:
adding, by the computing device, one or more additional tags to the tag file, and optionally,
wherein the tag pertaining to both the first image file and the second image file includes one or more from among: (i) an identifier indicative of the computing device, (ii) the one or more user-selectable display settings, (iii) a date identifier, (iv) a time-of-day identifier, (v) a vehicle identifier, or (vi) a user identifier of a person using the computing device.

23. A method according to claim 22, wherein the one or more additional tags includes one or more from among:
a tag indicative of a vehicle identification number,
a tag indicative of a vehicle year identifier,
a tag indicative of a vehicle make identifier,
a tag indicative of a vehicle model identifier,
a tag indicative of a share setting for the second blended image,
a tag indicative of an opacity setting used to display the first blended image, or
a tag indicative of a blended image file showing the second blended image belonging to a collection of images, or
a tag indicative of the blended image file showing the second blended image being an attachment to a service report regarding the vehicle.

24. A method according to claim 21, further comprising:
adding, by the computing device, a comment associated with the second blended image, wherein the comment indicates one or more from among: (i) a description of a vehicle component shown in the second blended image, or (ii) whether the second blended image is indicative of a vehicle component operating without malfunction or with a malfunction.

25. A method according to claim 21, wherein:
the web page including the second blended image further includes a service report corresponding to a vehicle,
the service report includes the second blended image and one or more from among: shop information regarding a repair shop at which a repair to the vehicle was performed, or information regarding an owner of the vehicle, and optionally,
the service report includes one or more vehicle data messages output by the vehicle.

26. The system of claim 17, further comprising:
a camera trigger button operatively coupled to the one or more processors; and
a user control operatively coupled to the one or more processors,
wherein the computer-readable program instructions are further executable by the one or more processors to:
generate a third image file in response to a selection of the camera trigger button;
determine, in response to a selection of the user control, that an image represented by the third image file shows a textual representation of a vehicle identification number or a coded representation of the vehicle identification number; and
determine at least the portion of the vehicle identification number by performing optical character recognition on the textual representation of the vehicle identification number or by decoding the coded representation of the vehicle identification number.

27. The system of claim 26, wherein:
the computer-readable program instructions are further executable by the one or more processors to decode the vehicle identification number to determine at least a vehicle year identifier, a vehicle make identifier, and a vehicle model identifier, and
the one or more tags include a tag indicative of the vehicle year identifier, a tag indicative of the vehicle make identifier, and a tag indicative of the vehicle model identifier.

28. The system of claim 17, further comprising:
a camera trigger button operatively coupled to the one or more processors; and
a user control operatively coupled to the one or more processors,
wherein the computer-readable program instructions are further executable by the one or more processors to:
generate a third image file in response to a selection of the camera trigger button;
determine, in response to a selection of the user control, that an image represented by the third image file shows a license plate attached to a vehicle; and
determine at least the portion of the vehicle identifier by performing optical character recognition on the image represented by the third image file.

29. The system of claim 17, wherein the thermal image captured by the thermal camera and the visible light image captured by the visible light camera were captured at a same time on a same date.

30. The system of claim 17, wherein the thermal image captured by the thermal camera and the visible light image captured by the visible light camera were captured in response to a same trigger.

* * * * *

UNITED STATES PATENT AND TRADEMARK OFFICE
CERTIFICATE OF CORRECTION

| | |
|---|---|
| PATENT NO. | : 11,070,763 B2 |
| APPLICATION NO. | : 16/020970 |
| DATED | : July 20, 2021 |
| INVENTOR(S) | : Robert Hoevenaar et al. |

It is certified that error appears in the above-identified patent and that said Letters Patent is hereby corrected as shown below:

On the Title Page

Item (72):
Delete "Shelvy Township, MI (US)"
Insert --Shelby Township, MI (US)--.

Signed and Sealed this
Fifteenth Day of March, 2022

Drew Hirshfeld
*Performing the Functions and Duties of the
Under Secretary of Commerce for Intellectual Property and
Director of the United States Patent and Trademark Office*